(12) United States Patent
Lynch et al.

(10) Patent No.: US 11,849,561 B2
(45) Date of Patent: Dec. 19, 2023

(54) DATA CENTER SECURITY SYSTEMS AND DEVICES

(71) Applicant: InVue Security Products Inc., Charlotte, NC (US)

(72) Inventors: Laura Abbott Lynch, Charlotte, NC (US); Christopher J Fawcett, Charlotte, NC (US); Tony Plunk, Tega Cay, SC (US); Ashwin Jadhav, Indian Trail, NC (US); Elliott Jernigan, Indian Trail, NC (US); Orion Millaway, Huntersville, NC (US)

(73) Assignee: In Vue Security Products Inc., Charlotte, NC (US)

( * ) Notice: Subject to any disclaimer, the term of this patent is extended or adjusted under 35 U.S.C. 154(b) by 0 days.

(21) Appl. No.: 18/094,017

(22) Filed: Jan. 6, 2023

(65) Prior Publication Data
US 2023/0199999 A1    Jun. 22, 2023

Related U.S. Application Data

(63) Continuation of application No. PCT/US2022/053621, filed on Dec. 21, 2022.

(60) Provisional application No. 63/292,879, filed on Dec. 22, 2021, provisional application No. 63/292,870, filed on Dec. 22, 2021.

(51) Int. Cl.
H05K 7/14    (2006.01)

(52) U.S. Cl.
CPC .................. *H05K 7/1495* (2013.01)

(58) Field of Classification Search
CPC .................................................. H05K 7/1495
See application file for complete search history.

(56) References Cited

U.S. PATENT DOCUMENTS

| | | | |
|---|---|---|---|
| 5,509,528 A | 4/1996 | Weisburn |
| 5,598,728 A | 2/1997 | Lax |
| 5,636,737 A | 6/1997 | Marsilio |
| 5,760,689 A | 6/1998 | Holmgren |
| 5,762,187 A | 6/1998 | Belden, Jr. et al. |

(Continued)

FOREIGN PATENT DOCUMENTS

| | | |
|---|---|---|
| WO | 2020/225713 A1 | 11/2020 |
| WO | 2022/027021 A1 | 2/2022 |
| WO | 2022/146821 A1 | 7/2022 |

OTHER PUBLICATIONS

U.S. Appl. No. 63/059,280, filed Jul. 31, 2020.
(Continued)

*Primary Examiner* — Mukundbhai G Patel
(74) *Attorney, Agent, or Firm* — InVue Security Products Inc.

(57) ABSTRACT

Embodiments of the present invention are directed to systems, devices, and methods for data centers. In one example, a lockable enclosure for a data drive. The lockable enclosure includes a housing configured to house data drive circuitry and a port coupled to the housing and configured to connect to an external data device for transferring data from or to the data drive circuitry. The lockable enclosure also includes a sliding mechanism movable relative to the housing and configured to move within the housing between a position whereby the port is accessible to a position whereby the port is inaccessible.

20 Claims, 42 Drawing Sheets

(56) References Cited

U.S. PATENT DOCUMENTS

| | | |
|---|---|---|
| 5,782,350 A | 7/1998 | Weisburn et al. |
| 5,984,388 A | 11/1999 | Bacon |
| 6,354,435 B1 | 3/2002 | Belden, Jr. et al. |
| 6,412,631 B2 | 7/2002 | Belden, Jr. |
| 6,422,387 B1 | 7/2002 | Sedon et al. |
| 6,474,470 B2 | 11/2002 | Byrne et al. |
| 6,497,125 B1 | 12/2002 | Necchi |
| 6,561,347 B1 | 5/2003 | Lax |
| 6,598,742 B1 | 7/2003 | Belden, Jr. et al. |
| 6,601,701 B1 | 8/2003 | Belden, Jr. et al. |
| 6,601,702 B2 | 8/2003 | Byrne et al. |
| 6,626,290 B2 | 9/2003 | Byrne et al. |
| 6,666,330 B2 | 12/2003 | Sedon et al. |
| 6,688,463 B2 | 2/2004 | Peterson et al. |
| 6,832,498 B2 | 12/2004 | Belden, Jr. et al. |
| 6,926,164 B1 | 8/2005 | Broadhead et al. |
| 6,938,758 B2 | 9/2005 | Marsilio et al. |
| 6,966,438 B2 | 11/2005 | Belden, Jr. et al. |
| 7,066,325 B2 | 6/2006 | Bird et al. |
| 7,100,402 B2 | 9/2006 | Holmgren |
| 7,140,489 B2 | 11/2006 | Lax et al. |
| 7,194,879 B2 | 3/2007 | Sedon et al. |
| 7,243,800 B1 | 7/2007 | Feibelman |
| 7,257,971 B2 | 8/2007 | Lax et al. |
| 7,260,962 B2 | 8/2007 | Lax et al. |
| 7,334,731 B1 * | 2/2008 | McLean .................. G06K 19/07 235/443 |
| 7,344,025 B2 | 3/2008 | Belden, Jr. et al. |
| 7,380,711 B2 | 6/2008 | Simon et al. |
| 7,484,389 B2 | 2/2009 | Sedon et al. |
| 7,552,822 B2 | 6/2009 | Belden, Jr. et al. |
| 7,581,418 B2 | 9/2009 | Sedon et al. |
| 7,581,419 B2 | 9/2009 | Belden, Jr. et al. |
| 7,598,861 B2 | 10/2009 | Belden, Jr. et al. |
| 7,610,782 B2 | 11/2009 | Lax et al. |
| 7,614,265 B2 | 11/2009 | Belden, Jr. et al. |
| 7,665,603 B2 | 2/2010 | Leesberg |
| 7,722,369 B2 * | 5/2010 | Bushby .............. H01R 13/6397 439/135 |
| 7,737,843 B2 | 6/2010 | Belden, Jr. et al. |
| 7,737,844 B2 | 6/2010 | Scott et al. |
| 7,837,051 B2 | 11/2010 | Broadhead et al. |
| 7,870,766 B2 | 1/2011 | Sedon et al. |
| 7,924,154 B2 | 4/2011 | Belden, Jr. et al. |
| 7,963,131 B2 | 6/2011 | Zhang et al. |
| 7,966,851 B2 | 6/2011 | Sedon et al. |
| 7,992,711 B2 | 8/2011 | Belden, Jr. et al. |
| 7,999,672 B1 | 8/2011 | Feibelman |
| 8,016,147 B2 | 9/2011 | Broadhead et al. |
| 8,207,849 B2 | 6/2012 | Belden, Jr. et al. |
| 8,276,410 B2 | 10/2012 | Sedon et al. |
| 8,286,565 B2 | 10/2012 | Valiulis et al. |
| 8,807,335 B2 | 8/2014 | Nilsson |
| 8,887,907 B2 | 11/2014 | Will et al. |
| 9,583,860 B1 | 2/2017 | DeWitte |
| 11,361,635 B2 | 6/2022 | Baker et al. |
| 2008/0282276 A1 | 11/2008 | Ezawa et al. |
| 2010/0091443 A1 | 4/2010 | Lam et al. |
| 2010/0277861 A1 | 11/2010 | Roesher et al. |
| 2011/0013372 A1 | 1/2011 | Menow et al. |
| 2012/0228290 A1 | 9/2012 | Conti |
| 2014/0145571 A1 | 5/2014 | Morse et al. |
| 2015/0278552 A1 | 10/2015 | Chen et al. |
| 2018/0197579 A1 | 7/2018 | Chen et al. |
| 2019/0101963 A1 | 4/2019 | Chang et al. |
| 2019/0107868 A1 | 4/2019 | Hung |
| 2020/0379522 A1 | 12/2020 | Andre et al. |
| 2022/0166785 A1 | 5/2022 | Grant et al. |
| 2022/0408576 A1 | 12/2022 | Fawcett et al. |

OTHER PUBLICATIONS

U.S. Appl. No. 63/187,747, filed May 12, 2021.
U.S. Appl. No. 63/131,887, filed Dec. 30, 2020.
The International Search Report and The Written Opinion from corresponding International Application No. PCT/US22/34273, dated Oct. 12, 2022 (10 pages).
The International Search Report and The Written Opinion from corresponding International Application No. PCT/US22/53621, dated Jun. 16, 2023 (5 pages).

* cited by examiner

FRONT    BACK

DATA CENTER SECURITY SYSTEMS AND DEVICES

CROSS REFERENCE TO RELATED APPLICATIONS

This application is a continuation of International Application No. PCT/US2022/53621, filed Dec. 21, 2022, and claims the benefit of priority to U.S. Provisional Application No. 63/292,870, filed Dec. 22, 2021, and U.S. Provisional Application No. 63/292,879, filed on Dec. 22, 2021, the entire contents of each of which are hereby incorporated by reference.

FIELD OF THE INVENTION

Embodiments of the present invention relates generally to access management, electronic locks, systems, devices, and methods for data centers.

BRIEF SUMMARY

Embodiments of the present invention are directed towards systems, lockable enclosures, and methods for securing data drives. In one embodiment, a lockable enclosure for a data drive is provided. The lockable enclosure includes a housing configured to house data drive circuitry and a port coupled to the housing and configured to connect to an external data device for transferring data from or to the data drive circuitry. The lockable enclosure further includes a mechanism movable relative to the housing and configured to move within the housing between a first position whereby the port is accessible to a second position whereby the port is inaccessible.

In another embodiment, a method is provides for securing a data drive. The method includes providing a housing configured to house data drive circuitry, the housing comprising a port coupled to the housing. The method also includes connecting an external data device to the port for transferring data from or to the data drive circuitry, and moving a mechanism relative to the housing between a first position whereby the port is accessible to a second position whereby the port is inaccessible.

In another embodiment, a lockable enclosure includes a housing configured to house a data drive and a tray contained within the housing and configured to receive the data drive. The tray is configured to move within the housing between a first position whereby the data drive is accessible to a second position whereby the tray and the data drive are secured within the housing.

DETAILED DESCRIPTION OF EMBODIMENTS OF THE INVENTION

Figure 1A:
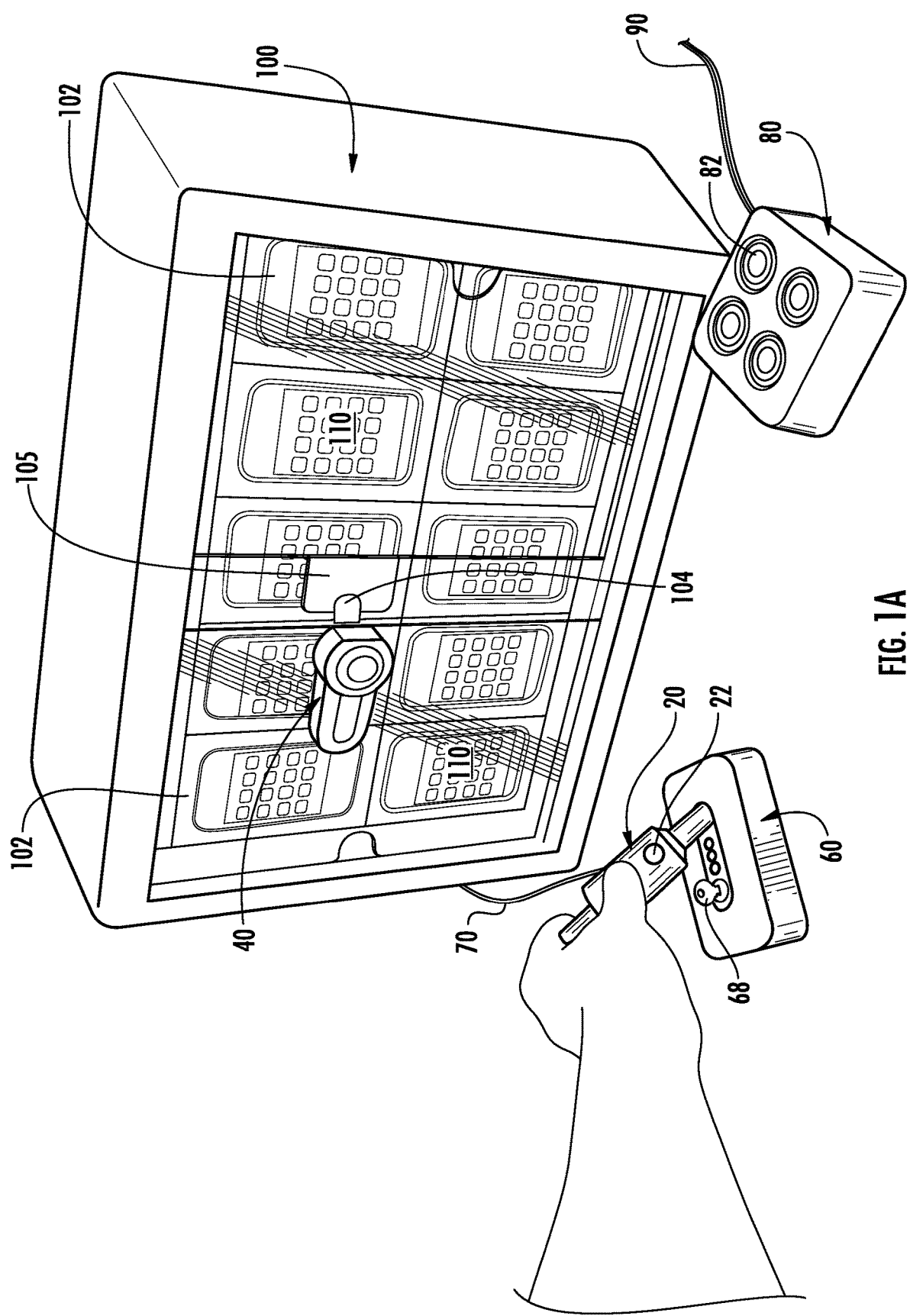
FIG. 1A shows an embodiment of a security system and method including a programmable electronic key, a security device, a programming station and a charging station according to an embodiment of the invention.

Referring now to the accompanying drawing figures wherein like reference numerals denote like elements throughout the various views, one or more embodiments of a security system and method for data centers are shown. In the embodiments shown and described herein, the system and method include an electronic key and a security device. Security devices suitable for use with the electronic keys include, but are not limited to, security devices for various types of fixtures, such as server racks for storing various types and quantities of computer and/or network equipment or components, such as for example, servers, computers, hard drives, media storage, routers, hubs, network switches, etc. The server rack may define an enclosure that is configured to secure various computer and/or network equipment or components that is only configured to be accessed by authorized personnel, such as described in the following embodiments. Of course, embodiments of the present invention are applicable to any number of security devices for securing various items from theft. Embodiments of the present invention may provide security devices for protecting equipment from theft in a data center environment that may include valuable data as well as providing various data regarding accesses or attempted accesses to the equipment. Moreover, although some embodiments disclosed herein are directed to use of security devices with cabinets, it is understood that any variety of fixtures may be used that are configured to house or otherwise secure items to be secured.

An embodiment of a system and method according to the invention is illustrated in FIGS. 1A-9B. The embodiment of the security system and method depicted comprises a programmable electronic key 20, which is also referred to herein as a security key or an electronic key, and a security device 40 that is configured to be operated by the key. The system and method may further comprise an optional programming or authorization station, indicated generally at 60, that is operable for programming the key 20 with a security code, which is also referred to herein as a Security Disarm Code (SDC). The term SDC is not intended to be limiting, as it may be any code configured to be used to determine whether the key 20 is authorized to control the security device 40. In addition to programming station 60, the system and method may further comprise an optional charging station, indicated generally at 80, that is operable for initially charging and/or subsequently recharging a power source disposed within the key 20. For example, security key 20 and security device 40 may each be programmed with the same SDC into a respective permanent memory. The security key 20 may be provisioned with a single-use (e.g., non-rechargeable) power source, such as a conventional or extended-life battery, or alternatively, the key may be provisioned with a multiple-use (e.g., rechargeable) power source, such as a conventional capacitor or rechargeable battery. In either instance, the power source may be permanent, semi-permanent (e.g., replaceable), or rechargeable, as desired. In the latter instance, charging station 80 is provided to initially charge and/or to subsequently recharge the power source provided within the security key 20. Furthermore, key 20 and/or security device 40 may be provided with only a transient memory, such that the SDC must be programmed (or reprogrammed) at predetermined time intervals. In this instance, programming station 60 is provided to initially program and/or to subsequently reprogram the SDC into the key 20. As will be described, key 20 is operable to initially program and/or to subsequently reprogram the security device 40 with the SDC. Key 20 is then further operable to operate the security device 40 using power transferred to the security device and/or data communicated with the device, as will be described.

In one embodiment of the system and method illustrated in FIGS. 1A-9B, programmable electronic key 20 is configured to be programmed with a unique SDC by the programming station 60. A programming station 60 suitable for use with the present invention is shown and described in detail in the commonly owned U.S. Pat. No. 7,737,844 entitled PROGRAMMING STATION FOR A SECURITY SYSTEM FOR PROTECTING MERCHANDISE, the disclosure of which is incorporated herein by reference in its entirety. As illustrated in FIG. 1A and best shown in enlarged FIG. 1B, the key 20 is presented to the programming station 60 and communication therebetween is initiated, for example by pressing a control button 22 provided on the exterior of the key. Communication between the programming station 60 and the key may be accomplished directly, for example, by one or more electrical contacts, or indirectly, for example by wireless communication. Any form of wireless communication capable of transferring data between the programming station 60 and key 20 is also possible, including without limitation optical transmission, acoustic transmission, or magnetic induction. In the embodiments shown and described herein, communication between programming station 60 and key 20 is accomplished by wireless optical transmission, and more particularly, by cooperating infrared (IR) transceivers provided in the programming station and the key. The components and method of IR communication between programming station 60 and key 20 is described in greater detail in the aforementioned U.S. Pat. No. 7,737,844, and accordingly, will not be repeated here. For the purpose of describing the present invention, it is sufficient that the programming station comprises at least a logic control circuit for generating or being provided with a SDC, a memory for storing the SDC, and a communications system suitable for interacting with the programmable electronic key 20 in the manner described herein to program the key with the SDC.

Figure 1B:
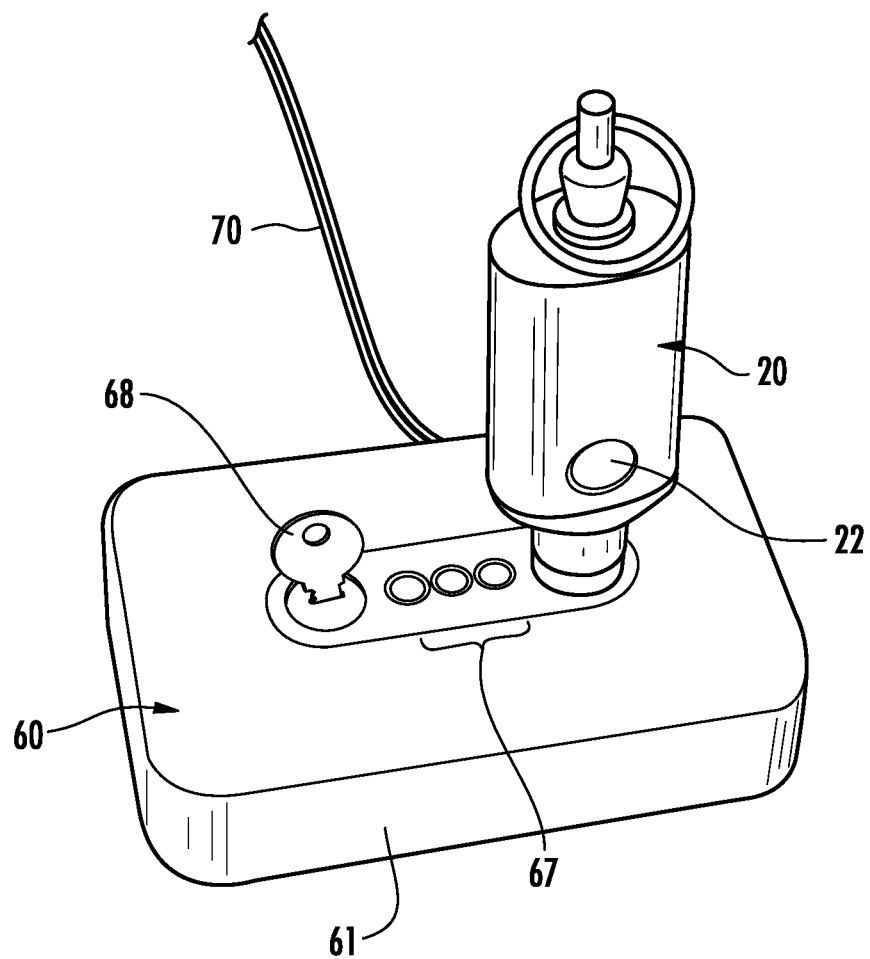
FIG. 1B is an enlarged view showing the programmable electronic key of FIG. 1A positioned on the programming station of FIG. 1A to be programmed with a security code.

As shown in FIG. 1B, programming station 60 comprises a housing 61 configured to contain the logic control circuit that generates the SDC, the memory that stores the SDC, and a communications system, namely an optical transceiver, for wirelessly communicating the SDC to a cooperating optical transceiver disposed within the key 20. In use, the logic control circuit generates the SDC, which may be a predetermined (e.g., "factory preset") security code, a serial number, or which may be a security code that is randomly generated by the logic control circuit of the programming station 60 at the time a first key 20 is presented to the station for programming. In the latter instance, the logic control circuit further comprises a random number generator for producing the unique SDC. A series of visual indicators, for example light-emitting diodes (LEDs) 67 may be provided on the exterior of the housing 61 for indicating the operating status of the programming station. Use of the programming station 60 may further require authorization, such as with a mechanical lock mechanism, for example, a conventional key and tumbler lock 68, for preventing use of the programming station by an unauthorized person. Alternatively, the programming station 60 may require various other forms of authentication, such as a pin code, biometric identification, facial recognition, etc. in order to activate the key 20 or otherwise gain access to the key. As shown herein, the programming station 60 may be operatively connected to an external power source by a power cord 70 having at least one conductor. Alternatively, the programming station 60 may comprise an internal power source, for example an extended-life replaceable battery or a rechargeable battery, for providing power to the logic control circuit and the LEDs 67.

In one example embodiment, the logic control circuit of the programming station 60 performs an electronic exchange of data with a logic control circuit of the key 20, commonly referred to as a "handshake communication protocol." The handshake communication protocol determines whether the key is an authorized key that has not been programmed previously, or is an authorized key that is being presented to the programming station a subsequent time to refresh the SDC. In the event that the handshake communication protocol fails, the programming station 60 will not provide the SDC to the unauthorized device attempting to obtain the SDC, for example an infrared reader on a counterfeit key. When the handshake communication protocol succeeds, programming station 60 permits the SDC randomly generated by the logic control circuit and/or stored in the memory of the station to be transmitted by the optical transceiver to the cooperating optical transceiver disposed within the key 20. As will be readily apparent to those skilled in the art, the SDC may be transmitted from the programming station 60 to the security key 20 alternatively by any other suitable means, including without limitation, electrical contacts or electromechanical, electromagnetic or magnetic conductors, as desired.

Figure 2:
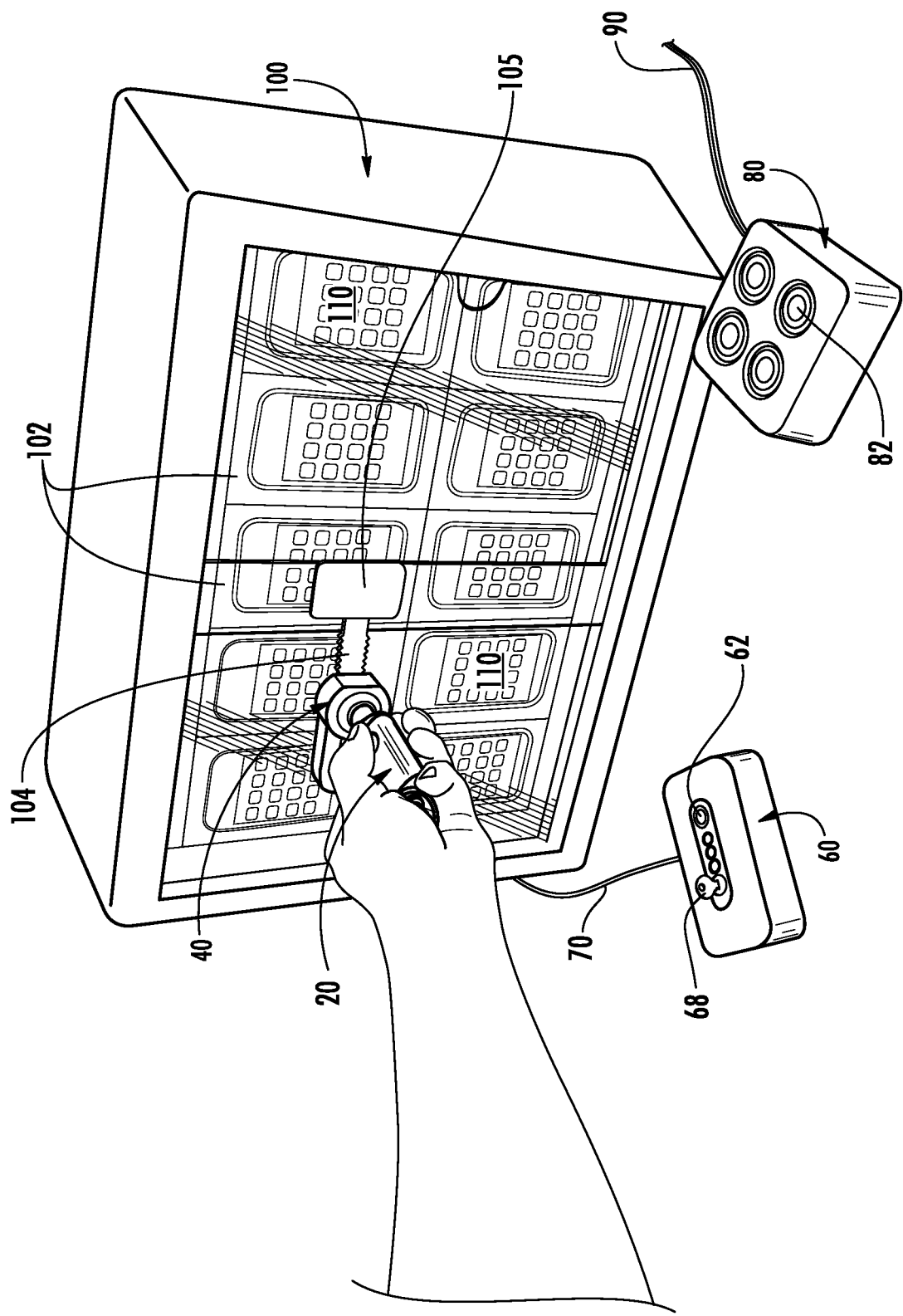
FIG. 2 further shows the system and method of FIG. 1A with the programmable electronic key positioned to operate the security device.

As illustrated in FIG. 2, the security key 20 programmed with the SDC is then positioned to operatively engage the security device 40. In the embodiments shown and described herein, the security device is a conventional cabinet lock that has been modified to be unlocked by the programmable electronic key 20. Preferably, the security device 40 is a "passive" device. As used herein, the term passive is intended to mean that the security device 40 does not have an internal power source sufficient to perform any functions (e.g., lock and/or unlock a mechanical lock mechanism). Significant cost savings are obtained by a retailer when the security device 40 is passive since the expense of an internal power source is confined to the security key 20, and one such key is able to operate multiple security devices. If desired, the security device 40 may also be provided with a temporary power source (e.g., capacitor or limited-life battery) having sufficient power to activate an alarm, for example a piezoelectric audible alarm, that is actuated by a sensor, for example a contact, proximity or limit switch, in response to a security breach. The temporary power source may also be sufficient to communicate data, for example a SDC, from the security device 40 to the security key 20 to authenticate the security device and thereby authorize the key to provide power to the security device. With this embodiment of the present invention, the mechanical lock mechanism is operated by electrical power that is transferred from the key 20 to the security device 40 via electrical contacts, as will be described.

The security device 40 further comprises a logic control circuit, similar to the logic control circuit disposed within the key 20, adapted to perform a handshake communication protocol with the logic control circuit of the key in essentially the same manner as that between the programming station 60 and the key. In essence, the logic control circuit of the key 20 and the logic control circuit of the security device 40 communicate with each other to determine whether the security device is an authorized device that does not have a security code, or is a device having a proper (e.g., matching) SDC. The key 20 may be configured to initially transfer power to the security device 40 in the event the security device is a passive device to allow the security device to communicate with the key. In the event the handshake communication protocol fails (e.g., the device is not authorized or the device has a non-matching SDC), the key 20 will not program the device 40 with the SDC, and consequently, the security device will not operate. If the security device 40 was previously programmed with a different SDC, the device will no longer communicate with the security key 20. In the event the handshake communication protocol is successful, the security key 20 permits the SDC stored in the key to be transmitted by the optical transceiver disposed within the key to a cooperating optical transceiver disposed within the security device 40 to program the device with the SDC. As will be readily apparent to those skilled in the art, the SDC may be transmitted from the security key 20 to the security device 40 alternatively by any other suitable means, including without limitation, via one or more electrical contacts, or via electromechanical, electromagnetic or magnetic conductors, as desired. Furthermore, the SDC may be transmitted by inductive transfer of data from the programmable electronic key 20 to the programmable security device 40.

On the other hand, when the handshake communication protocol is successful and the security device 40 is an authorized device having the same (e.g., matching) SDC, the mechanical lock mechanism of the security device 40 may operate using power from the key 20, either power that had been previously transferred by the key and stored by the security device and/or by power transmitted by the key to the security device. In the embodiment of FIGS. 1A-9B, electrical contacts disposed on the security key 20 electrically couple with cooperating electrical contacts on the security device 40 to transfer power from the internal battery of the key to the security device. Power may be transferred directly to the mechanical lock mechanism, or alternatively, may be transferred to a power circuit disposed within the security device 40 that operates the mechanical lock mechanism of the security device and may be configured to store the power for subsequent operation of the lock mechanism. In the embodiment of FIGS. 1A-9B, the cabinet lock 40 is affixed to one of the pair of adjacent and overlapping sliding doors 102 of a conventional cabinet 100. The cabinet 100 typically contains various types of equipment 110. The doors 102 overlap medially between the ends of the cabinet 100 and the cabinet lock 40 is secured on an elongate locking arm 104 of a lock bracket 105 affixed to the inner door. In the illustrated example, the key 20 transfers power to an electric motor, such as a DC stepper motor, solenoid, or the like, that unlocks the lock mechanism of the cabinet lock 40 so that the cabinet lock can be removed from the arm 104 of the bracket 105 and the doors moved (e.g., slid) relative to one another to access the equipment 110 stored within the cabinet 100. As shown, the arm 104 of the bracket 105 is provided with one-way ratchet teeth 106 and the cabinet lock 40 is provided with a complimentary ratchet pawls (not shown) in a conventional manner so that the key 20 is not required to lock the cabinet lock 40 onto the inner door 102 of the cabinet 100. If desired, however, the cabinet lock 40 can be configured to require use of the key 20 to both unlock and lock the cabinet lock.

It will be readily apparent to those skilled in the art that the cabinet lock illustrated herein is but one of numerous types of passive security devices 40 that can be configured to be operated by a programmable electronic key 20 according to the present invention. In any of the aforementioned embodiments, the security device 40 may further comprise an electronic lock mechanism, such as a conventional proximity, limit or contact switch, including an associated monitoring circuit that activates an alarm in response to the switch being actuated or the integrity of a sense loop monitored by the monitoring circuit being compromised. In such embodiments the security device 40 comprises a logic control circuit, or the equivalent, including a memory for storing a SDC, and a communication system for initially receiving the SDC from the security key 20 and subsequently communicating with the key to authenticate the SDC of the key.

Figure 3A:
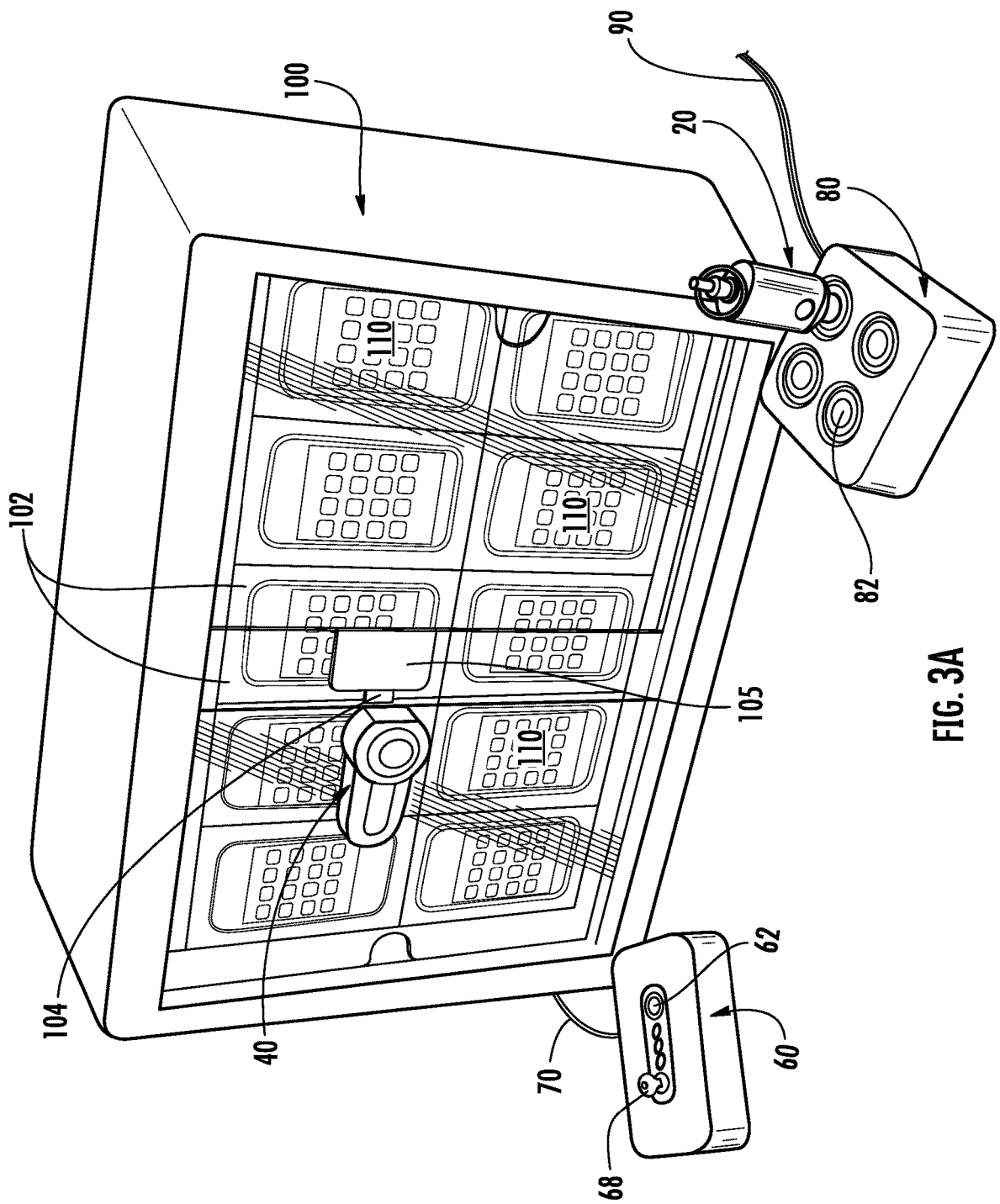
FIG. 3A further shows the system and method of FIG. 1A with the programmable electronic key disposed on the charging station.
Figure 3B:
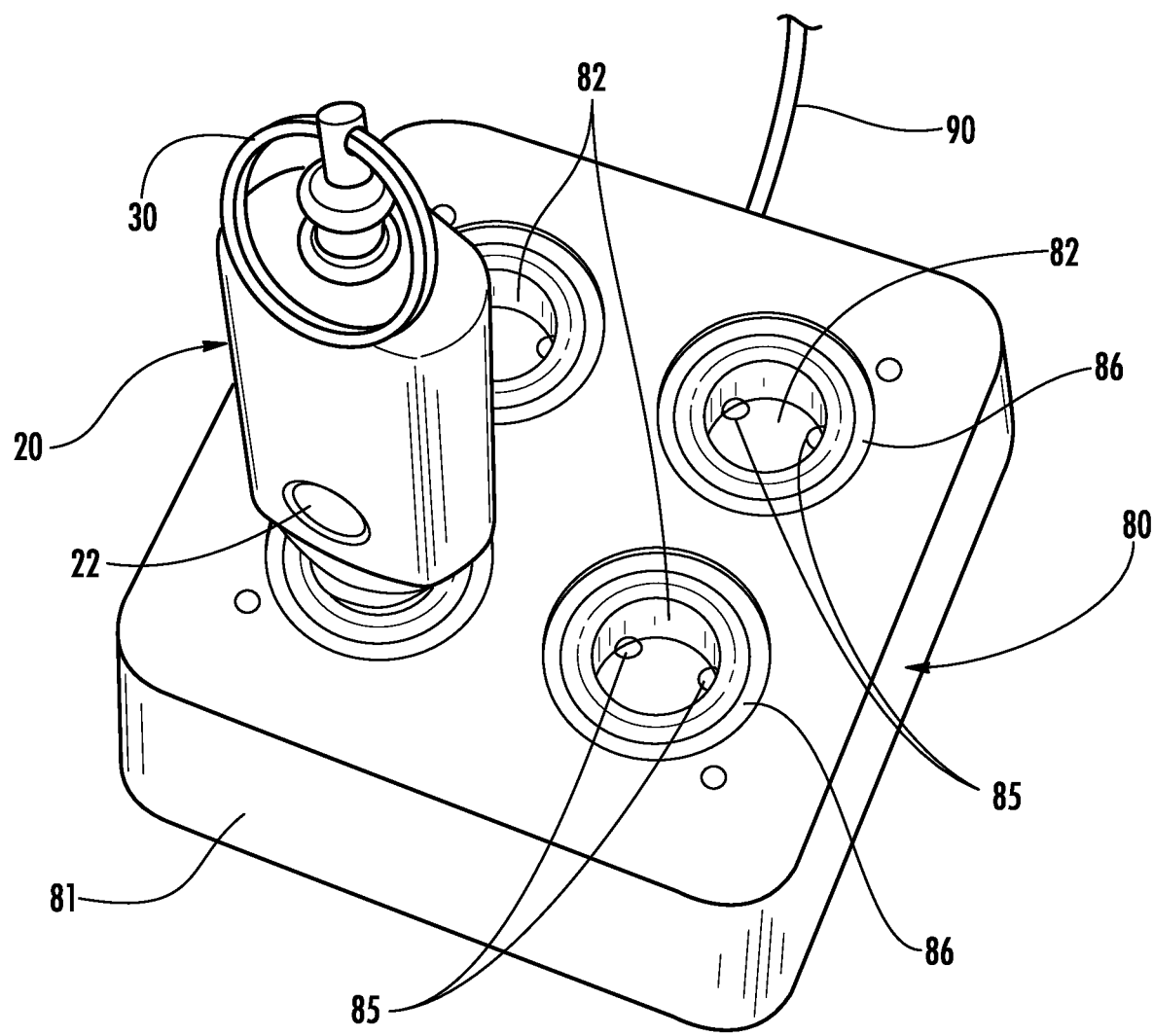
FIG. 3B is an enlarged view showing the programmable electronic key of FIG. 1A positioned on the charging station of FIG. 1A to recharge a power source disposed within the key.

As illustrated in FIG. 3A and shown enlarged in FIG. 3B, the security system and method further comprises charging station 80 for initially charging and subsequently recharging a rechargeable battery disposed within the security key 20. The charging station 80 comprises at least one charging port 82 sized and shaped to receive a key 20 to be charged or recharged. As will be described in greater detail with reference to FIGS. 9A and 9B, each charging port 82 comprises at least one magnet 85 for securely positioning and retaining the key 20 within the charging port 82 in electrical contact with the charging station 80. If desired, the charging station 80 may comprise an internal power source, for example, an extended-life replaceable battery or a rechargeable battery, for providing power to up to four keys 20 positioned within respective charging ports 82. Alternatively, and as shown herein, charging station 80 may be operatively connected to an external power source by a power cord 90 having at least one conductor. In some embodiments the programming station 60 and charging station 80 may be integrated into a single component.

In some embodiments, the electronic key 20, 120 may include additional authentication requirements prior to being used by a user, which may be useful for chain of custody. For example, the electronic key 20, 120 may require various other forms of authentication, such as a pin code, biometric identification, button presses, facial recognition, etc. in order to activate the key or otherwise gain access to the key. In some cases, the authentication using the key 20, 120 itself may be used in combination with authentication of the key using the programming station 60. For example, a keycode entered by the user at the programming station 60 may be used to initially check out a key 20, 120. However, the user may be further required to present his or her fingerprint to the key 20, 120 (or other authentication using the key itself) before the key is capable of being used to control or communicate with a security device 40. The user may be required to present his or her fingerprint to the key 20, 120 within a predetermined time window in order to authorize the key for use. Otherwise, the user may be required to return to the programming station 60 to start the check out process over. The key 20, 120 may be configured to store the user's fingerprint in memory and/or access attempts for auditing purposes. The data could be communicated to one or more remote devices 250 in some embodiments. In addition, key 20, 120 may be configured to detect and/or record unauthorized access attempts based on another user attempting to use the key that does not match the stored fingerprint. In lieu of biometric identification, other forms of authentication could be used, such as for example, a "morse code" number of button presses on the key 20, 120. Thus, the user is able to use the key 20, 120 only if the button presses matches a predetermined sequence stored by the key.

According to other embodiments, a plurality of keys 20, 120 may be required in order to control or communicate with a security device 40. In this regard, the security device 40 may include different modes of operation, e.g., (i) a single mode where a single key 20, 120 is needed to operate a single security device or (ii) a dual mode where more than one key is needed to operate a single security device. The security device 40 may be hardcoded with the desired mode of operation, while in other cases mechanical switches or the like could be used to change the mode of operation of the security device. In some embodiments, the key 20, 120 is configured to provide information regarding the mode of operation regardless of the type of security device 40. For example, the key 20, 120 may be configured to communicate the desired mode to the security device 40. In this way, the key 20, 120 may communicate a dual-mode operation to the security device 40, which would require more than one user to present an authorized key to the security device before the security device may be operated. There may be master keys 20, 120 in some cases that are configured to bypass any security devices 40 that require multiple user authentication. In one embodiment, a user identification code and an SDC is needed prior to controlling the security device 40 using a key 20, 120. For instance, a user may be required to check out a key 20, 120 using a programming station 60, which would then program the key with the required modes of operation and security devices 40 that the user is able to access. In some cases, the dual-mode setting overrides any single mode of operation. Namely, a key 20, 120 required to operate in dual mode would override any single mode setting in the lock and vice versa.

In other embodiments, multiple security devices 40 may be configured to secure a single fixture. For example, in some applications, safety or additional authorization may be required prior to granting access to a fixture. One example of this is a hasp for securing access to circuit breakers where the hasp is configured to be used with a plurality of security devices 40, such as padlocks configured to operate with key 20, 120. In this instance, a plurality of security devices 40 may be desired to be used to ensure safety of the technicians, since all security devices would need to be unlocked prior to granted access to the fixture. Typically technicians have no awareness of when the security device 40 has been removed or added. However, using keys 20, 120 would allow for sequencing and recording of accesses to the security devices 40. For instance, the time stamp of the time the security device 40 was accessed and by whom could be recorded. Moreover, access to the fixture may be combined with other authorization techniques disclosed herein, such as biometric identification on the key 20, 120 and/or multiple modes of operation of the security device and/or key. In some cases, various levels of alerts may be configured to be provided to the technicians, such as via remote devices 250, to the technician's keys 20, 120 and/or other portable device.

An available feature of a security system and method according to the invention is that the logic control circuit of the programmable electronic key 20 may include a time-out function. More particularly, the ability of the key 20 to transfer data and power to the security device 40 is deactivated after a predetermined time period. By way of example, the logic control circuit may be deactivated after about eight hours from the time the key was programmed or last refreshed by the programming station 60. Thus, an authorized sales associate typically must program or refresh the key 20 assigned to him at the beginning of each work shift. Furthermore, the charging station 80 may be configured to deactivate the logic control circuit of the key 20 (and thereby prevent use of the SDC) when the key is positioned within a charging port 82. In this manner, the charging station 80 can be made available to an authorized sales associate in an unsecured location without risk that a charged key 20 could be removed from the charging station and used to maliciously disarm and/or unlock a security device 40. The security key 20 would then have to be programmed or refreshed with the SDC by the programming station 60, which is typically monitored or maintained at a secure location, in order to reactivate the logic control circuit of the key. If desired, the charging station 80 may alternatively require a matching handshake communication protocol with the programmable electronic key 20 in the same manner as the security device 40 and the key.

Figure 4:
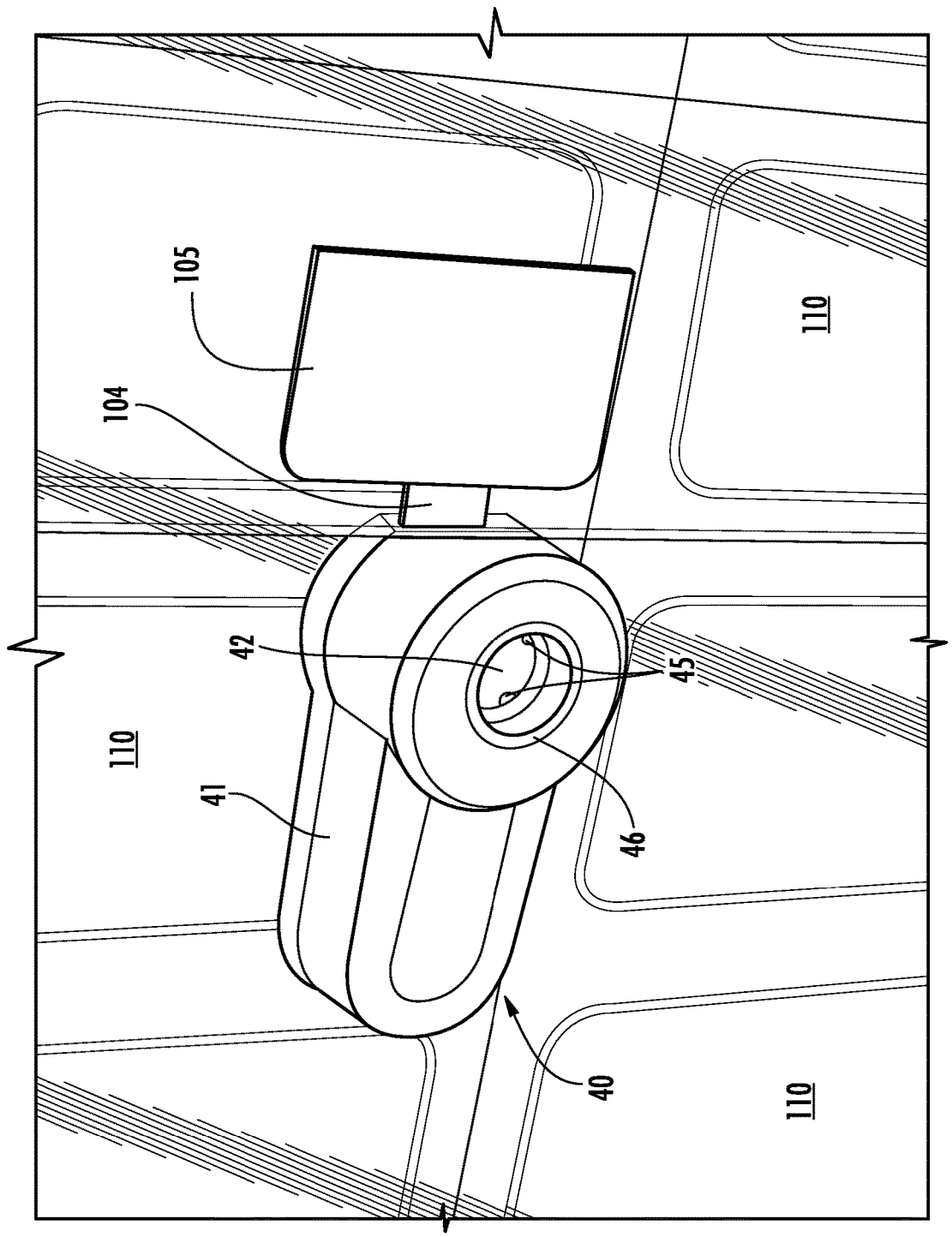
FIG. 4 is an enlarged view showing the security device of the system and method of FIG. 1A.
Figure 5:
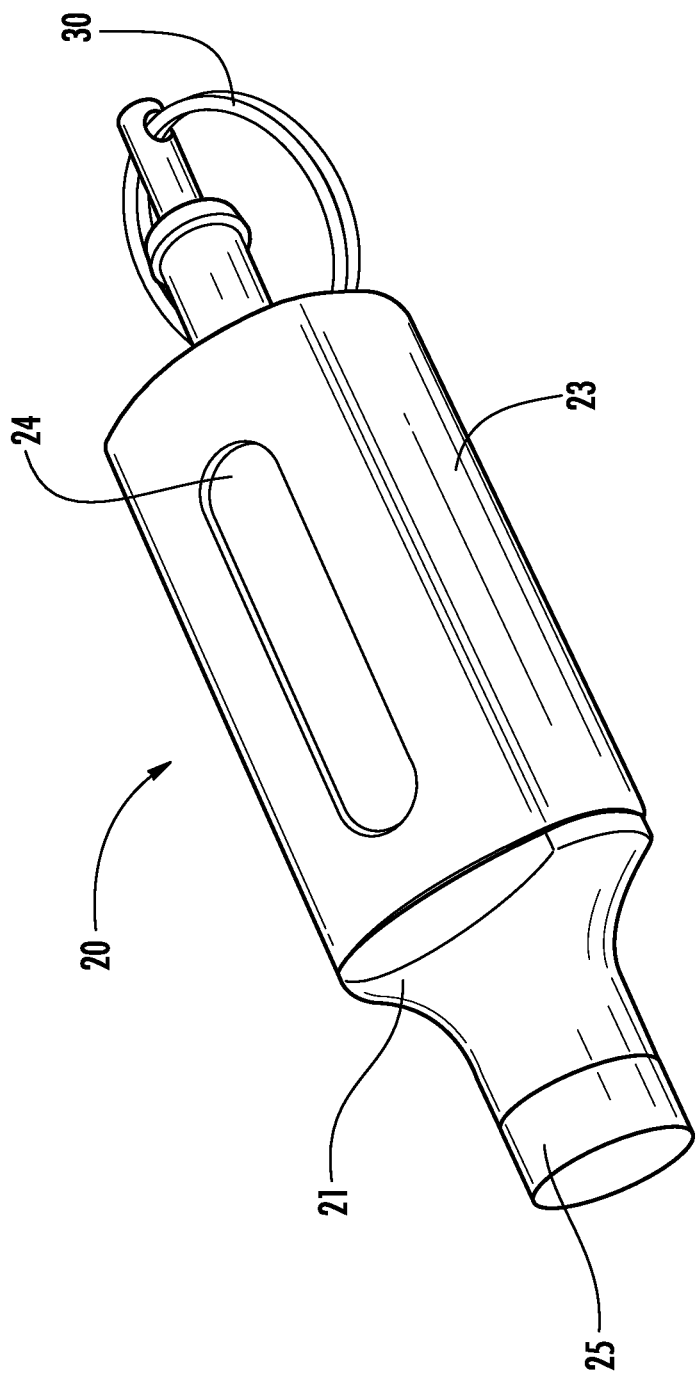
FIG. 5 is an enlarged view showing the programmable electronic key of the system and method of FIG. 1A in greater detail.

FIG. 4 is an enlarged view showing the embodiment of the security device 40 in greater detail. As previously mentioned, a security device 40 according to the present invention may utilize electrical power to lock and/or unlock a mechanical lock mechanism, and optionally, further includes an electronic lock mechanism, such as an alarm or a security "handshake." At the same time, the security device 40 must be a passive device in the sense that it does not have an internal power source sufficient to operate (e.g., actuate the mechanical lock mechanism). As a result, the security device 40 must be configured to receive at least power, and in some cases, both power and data from an external source, such as the security key 20 shown and described herein. The embodiment of the security device depicted in FIG. 4 is a cabinet lock 40 configured to be securely affixed to the locking arm 104 of a conventional cabinet lock bracket 105, as previously described. The cabinet lock 40 comprises a logic control circuit for performing a security handshake communication protocol with the logic control circuit of the security key 20 and for being programmed with the SDC by the key. In other embodiments, the cabinet lock 40 may be configured to transmit the SDC to the security key 20 to authenticate the security device and thereby authorize the key to transfer power to the cabinet lock. As previously mentioned, the data (e.g., handshake communication protocol and SDC) may be transferred (e.g., transmitted and received) by electrical contacts, optical transmission, acoustic transmission or magnetic induction, for example.

The cabinet lock 40 comprises a housing 41 sized and shaped to contain a logic control circuit (not shown) and an internal mechanical lock mechanism (not shown). A transfer port 42 formed in the housing 41 is sized and shaped to receive a transfer probe of the security key 20, as will be described. At least one magnet 45 is disposed within the transfer port 42 for securely positioning and retaining the transfer probe of the key 20 in electrical contact with electrical contacts of the mechanical lock mechanism, and if desired, in electrical contact with the logic control circuit of the cabinet lock 40. In the embodiment shown and described in FIGS. 1A-9B, data is transferred from the security key 20 to the cabinet lock 40 by wireless communication, such as by infrared (IR) optical transmission, as shown and described in the commonly owned U.S. Pat. No. 7,737,843 entitled PROGRAMMABLE ALARM MODULE AND SYSTEM FOR PROTECTING MERCHANDISE, the disclosure of which is incorporated herein by reference in its entirety. Power is transferred from the security key 20 to the cabinet lock 40 through electrical contacts disposed on the transfer probe of the key and corresponding electrical contacts disposed within the transfer port 42 of the cabinet lock. For example, the transfer port 42 may comprise a metallic outer ring 46 that forms one electrical contact, while at least one of the magnets 45 form another electrical contact to complete an electrical circuit with the electrical contacts disposed on the transfer probe of the key 20. Regardless, electrical contacts transfer power from the key 20 to the mechanical lock mechanism disposed within the housing 41. As previously mentioned, the power transferred from the key 20 is used to operate the mechanical lock mechanism, for example utilizing an electric motor, DC stepper motor, solenoid, or the like, to unlock the mechanism so that the cabinet lock 40 can be removed from the locking arm 104 of the lock bracket 105.

FIGS. 5-8 show an embodiment of a security key, also referred to herein as a programmable electronic key, 20 according to the present invention. As previously mentioned, the security key 20 is configured to transfer both data and power to a security device 40 that comprises an electronic lock mechanism and a mechanical lock mechanism, as previously described. Accordingly, the programmable electronic key 20 must be an "active" device in the sense that it has an internal power source sufficient to operate the mechanical lock mechanism of the security device 40. As a result, the programmable electronic key 20 may be configured to transfer both data and power from an internal source disposed within the key, for example a logic control circuit and a battery. The embodiment of the programmable electronic key 20 depicted in FIGS. 5-8 is a security key configured to be received within the transfer port 42 of the cabinet lock 40 shown in FIG. 4, as well as within the programming port 62 of the programming station 60 (FIG. 2; FIG. 3A) and the charging port 82 of the charging station 80 (FIG. 3B; FIG. 9A; FIG. 9B). The programmable electronic key 20 comprises a logic control circuit for performing a handshake communication protocol with the logic control circuit of the programming station 60 and for receiving the SDC from the programming station, as previously described. The logic control circuit of the programmable electronic key 20 further performs a handshake communication protocol with the logic control circuit of the security device 40 and transfers the SDC to the device or permits operation of the device, as previously described. As previously mentioned, the data (e.g., handshake communication protocol and SDC) may be transferred by direct electrical contacts, optical transmission, acoustic transmission or magnetic induction.

Figure 6:
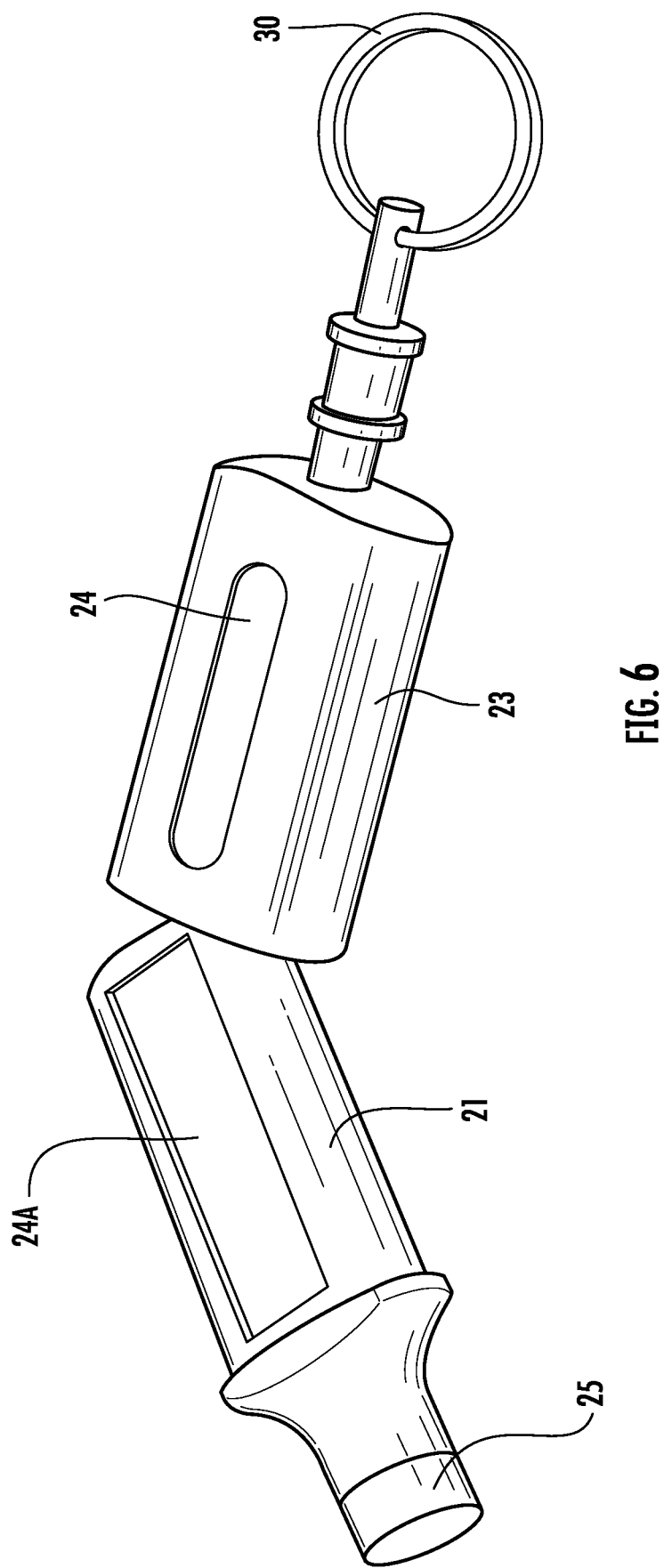
FIG. 6 is an exploded view of the programmable electronic key of FIG. 5.
Figure 7A:
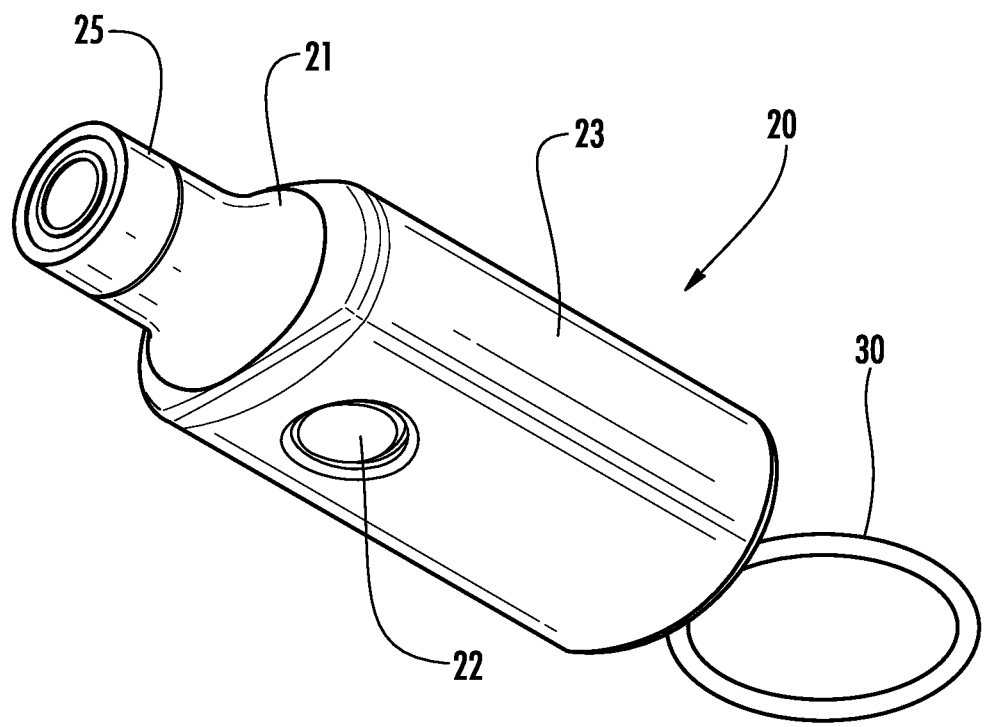
FIG. 7A is a perspective view of the programmable electronic key of FIG. 5.
Figure 7B:
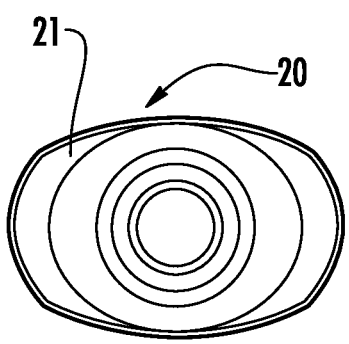
FIG. 7B is an end view of the programmable electronic key of FIG. 5.

As illustrated in FIG. 6, the programmable electronic key 20 comprises a housing 21 and an outer sleeve 23 that is removably disposed on the housing. The housing 21 contains the internal components of the key 20, including without limitation the logic control circuit, memory, communication system and battery, as will be described. A window 24 may be formed through the outer sleeve 23 for viewing indicia 24A that uniquely identifies the key 20, or alternatively, indicates a particular server rack for use with the key. The outer sleeve 23 is removably disposed on the housing 21 so that the indicia 24A may be altered or removed and replaced with different indicia. The programmable electronic key 20 may further comprise a detachable "quick-release" type key chain ring 30. An opening 26 (FIG. 8) is formed through the outer sleeve 23 and a key chain ring port 28 is formed in the housing 21 for receiving the key chain ring 30. The programmable electronic key 20 further comprises a transfer probe 25 located at an end of the housing 21 opposite the key chain ring port 28 for transferring data and power to the security device 40, as previously described. The transfer probe 25 also transmits and receives the handshake communication protocol and the SDC from the programming station 60, as previously described, and receives power from the charging station 80, as will be described in greater detail with reference to FIG. 9A and FIG. 9B.

Figure 8:
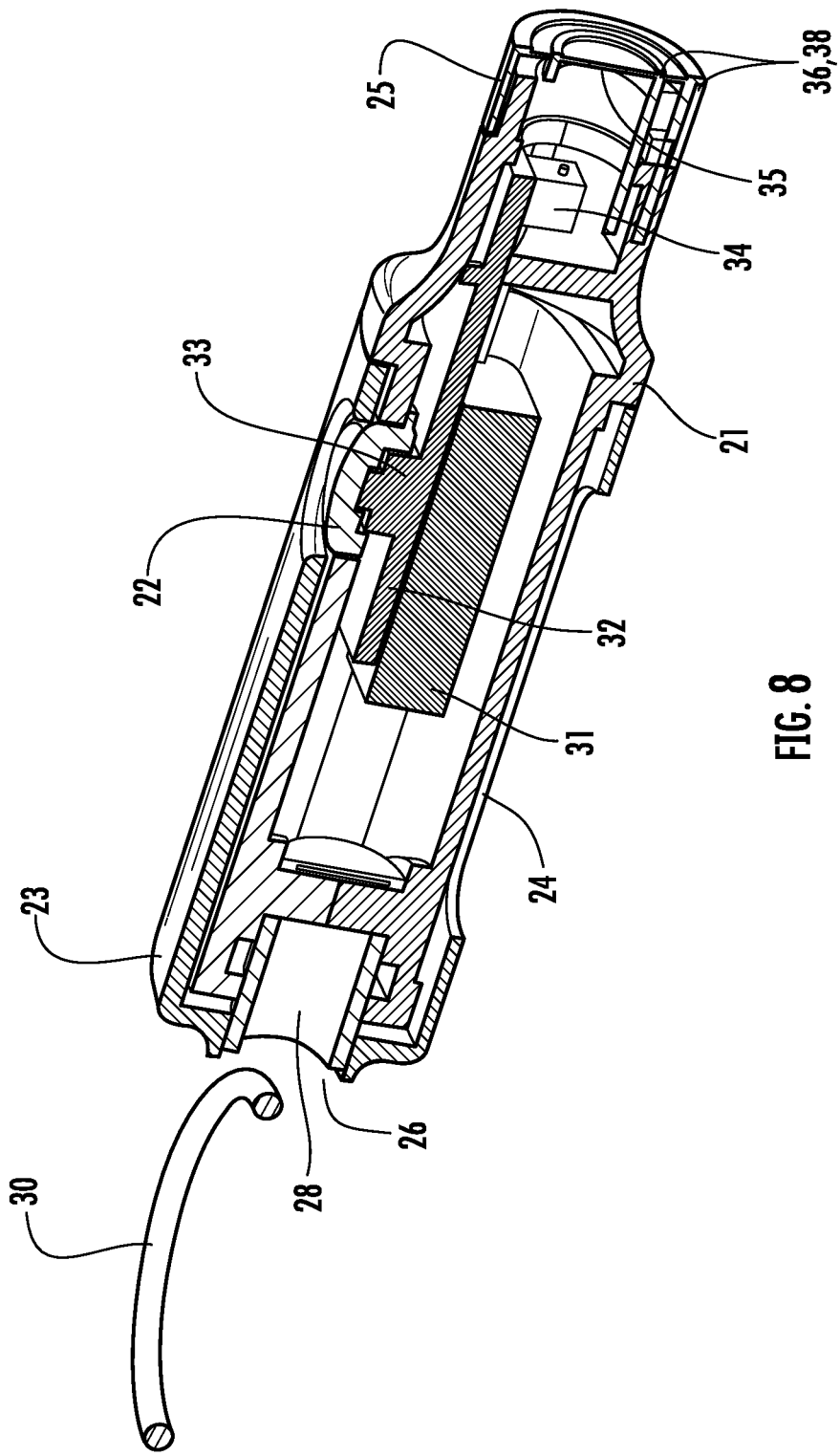
FIG. 8 is a perspective view showing a lengthwise cross-section of the programmable electronic key of FIG. 5.
Figure 9A:
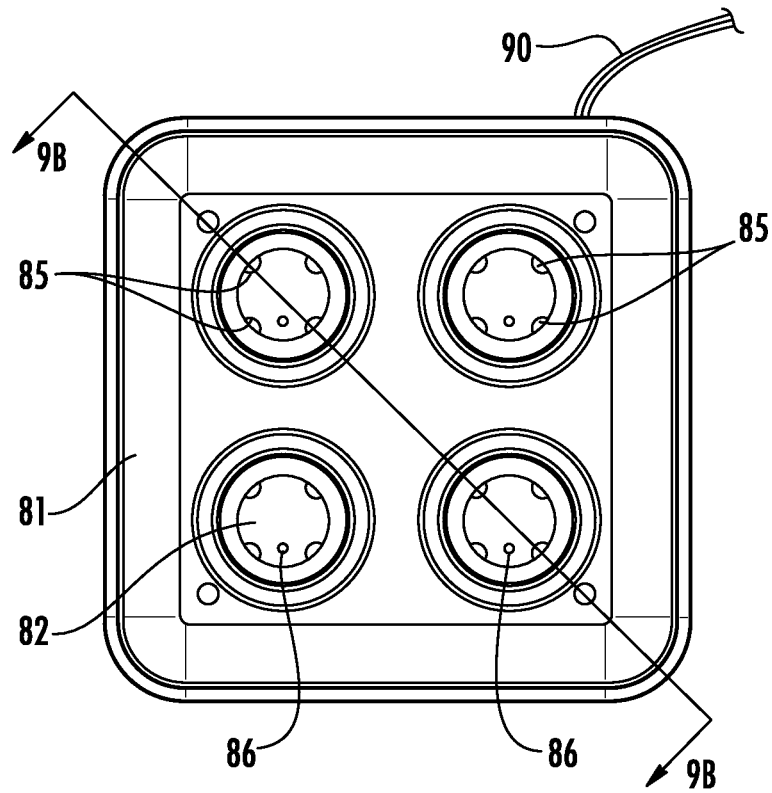
FIG. 9A is a top view showing the charging station of the system and method of FIG. 1A.
Figure 9B:
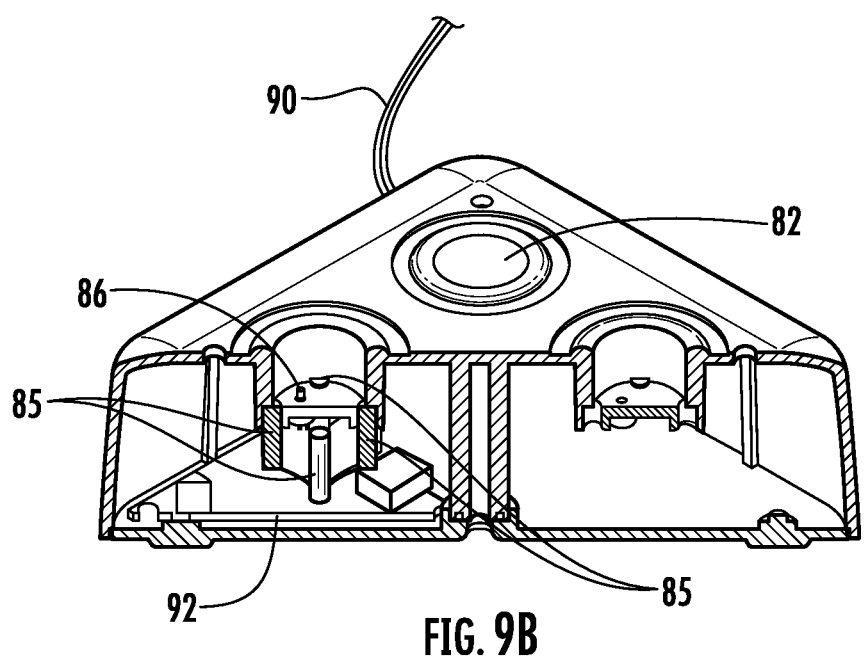
FIG. 9B is a perspective view showing a diagonal cross-section of the charging station of FIG. 9A taken along the line 9B-9B.
Figure 10:
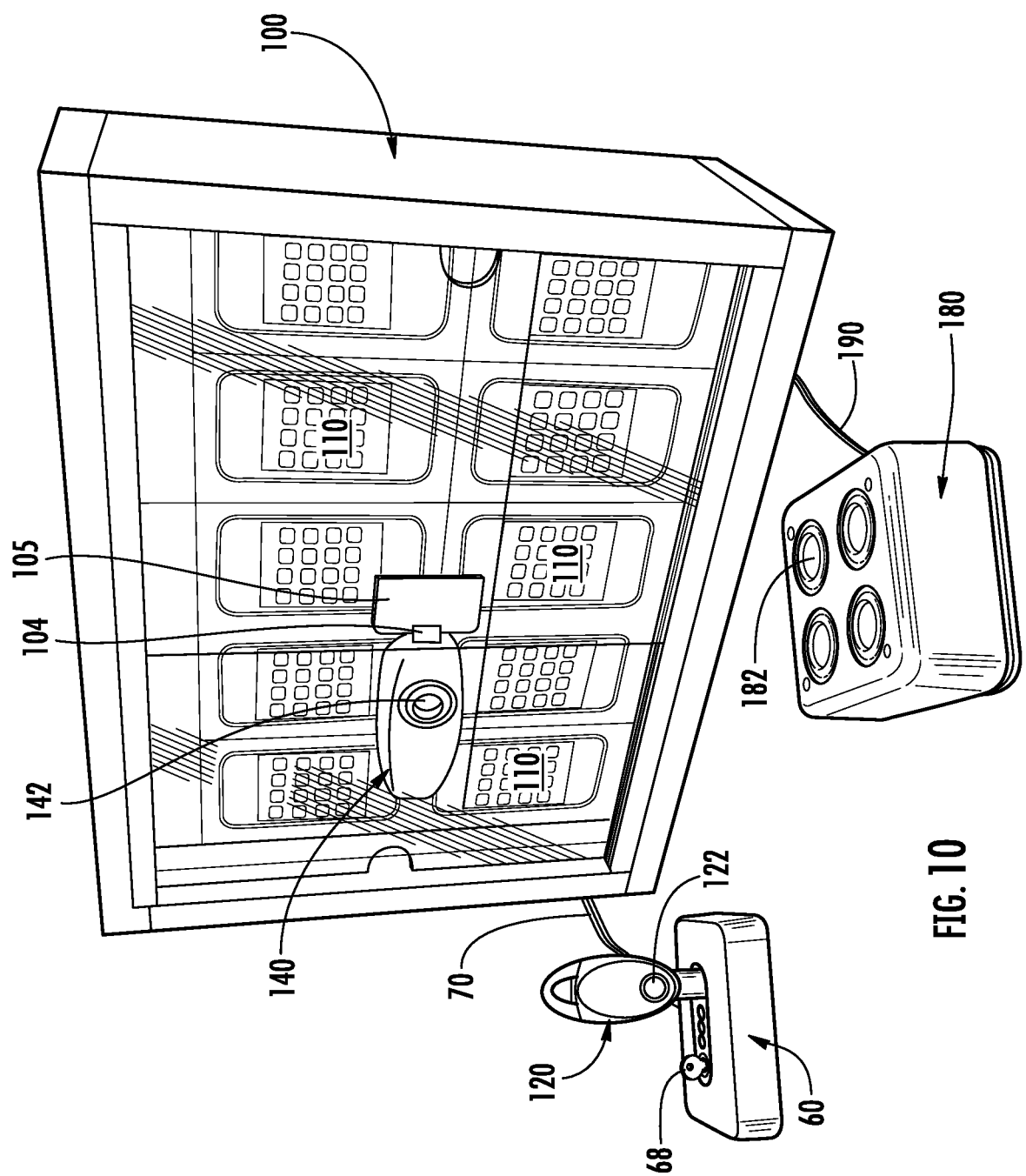
FIG. 10 shows another embodiment of a security system and method including a programmable electronic key, a security device, a programming station and a charging station according to an embodiment of the invention.

As best shown in FIG. 8, an internal battery 31 and a logic control circuit, or printed circuit board (PCB) 32 are disposed within the housing 21 of the programmable electronic key 20. Battery 31 may be a conventional extended-life replaceable battery, but preferably, is a rechargeable battery suitable for use with the charging station 80. The logic control circuit 32 is operatively coupled and electrically connected to a switch 33 that is actuated by the control button 22 provided on the exterior of the key 20 through the outer sleeve 23. Control button 22 in conjunction with switch 33 controls certain operations of the logic control circuit 32, and in particular, transmission of the data to the security device 40. In that regard, the logic control circuit 32 is further operatively coupled and electrically connected to a communication system 34 for transmitting and receiving the handshake communication protocol and SDC data. In the embodiment shown and described herein, the communication system 34 is a wireless infrared (IR) transceiver for optical transmission of data between the programmable electronic key 20 and the programming station 60, as well as between the key 20 and the security device 40. As a result, the transfer probe 25 of the key 20 is provided with an optically transparent or translucent filter window 35 for emitting and collecting optical transmissions between the key 20 and the programming station 60, or alternatively, between the key 20 and the security device 40, as required. Transfer probe 25 further comprises a pair of bi-directional power transfer electrical contacts 36, 38 made of an electrically conductive material for transferring power to the security device 40 and for receiving power from the charging station 80, as required. Accordingly, electrical contacts 36, 38 are electrically connected to battery 31, and are operatively coupled and electrically connected to logic control circuit 32 in any suitable manner, for example by conductive insulated wires or plated conductors.

An important aspect of a programmable electronic key 20 according to the present invention, especially when used for use in conjunction with a security device 40 as described herein, is that the key does not require a physical force to be exerted by a user on the key to operate the mechanical lock mechanism of the security device. By extension, no physical force is exerted by the key on the mechanical lock mechanism. As a result, the key cannot be unintentionally broken off in the lock, as often occurs with conventional mechanical key and lock mechanisms. Furthermore, neither the key nor and the mechanical lock mechanism suffer from excessive wear as likewise often occurs with conventional mechanical key and lock mechanisms. In addition, there is no required orientation of the transfer probe 25 of the programmable electronic key 20 relative to the charging port 82 of the charging station 80 or the transfer port 42 of the security device 40. Accordingly, any wear of the electrical contacts on the transfer probe 25, the charging port 82 or the transfer port 42 is minimized. As a further advantage, an authorized person is not required to position the transfer probe 25 of the programmable electronic key 20 in a particular orientation relative to the transfer port 42 of the security device 40 and thereafter exert a compressive and/or torsional force on the key to operate the mechanical lock mechanism of the device.

FIG. 9A and FIG. 9B show charging station 80 in greater detail. As previously mentioned, the charging station 80 recharges the internal battery 31 of the programmable electronic key 20, and if desired, deactivates the data transfer and/or power transfer capability of the key until the key is reprogrammed with the SDC by the programming station 60. Regardless, the charging station 80 comprises a housing 81 for containing the internal components of the charging station. The exterior of the housing 81 has at least one, and preferably, a plurality of charging ports 82 formed therein that are sized and shaped to receive the transfer probe 25 of the security key 20, as previously described. At least one magnet 85 is disposed within each charging port 82 for securely positioning and retaining the transfer probe 25 in electrical contact with the charging station 80. More particularly, the electrical contacts 36, 38 of the key 20 are retained within the charging port 82 in electrical contact with the magnets 85 and a resilient "pogo" pin 86 made of a conductive material to complete an electrical circuit between the charging station 80 and the battery 31 of the key.

As best shown in FIG. 9B, housing 81 is sized and shaped to contain a logic control circuit, or printed circuit board (PCB) 92 that is operatively coupled and electrically connected to the magnets 85 and the pogo pin 86 of each charging port 82. The pogo pin 86 is depressible to complete an electrical circuit as the magnets 85 position and retain the electrical contacts 36, 38 within the charging port 82. In particular, magnets 85 make electrical contact with the outer ring electrical contact 36 of the transfer probe 25 of key 20, while pogo pin 86 makes electrical contact with inner ring electrical contact 38 of the transfer probe. When the pogo pin 86 is depressed and the electrical circuit between the charging station 80 and the key 20 is completed, the charging station recharges the internal battery 31 of the key. As previously mentioned, charging station 80 may comprise an internal power source, for example, an extended-life replaceable battery or a rechargeable battery, for providing power to the key(s) 20 positioned within the charging port(s) 82. Alternatively, and as shown herein, the logic control circuit 92 of the charging station 80 is electrically connected to an external power source by a power cord 90 having at least one conductor. Furthermore, logic control circuit 92 may be operable for deactivating the data transfer and power transfer functions of the programmable electronic key 20, or alternatively, for activating the "time-out" feature of the key until it is reprogrammed or refreshed by the programming station 60.

FIGS. 10-17B show another embodiment of a security system and method including a programmable key, a security device, a programming station, and a charging station according to various embodiments of the present invention. In this embodiment, the system and method comprise at least a programmable electronic key (also referred to herein as a security key) with inductive transfer, indicated generally at 120, and a security device with inductive transfer, indicated generally at 140, that is operated by the key 120. The programmable electronic key 120 is useable with any security device or locking device, such as various types of server racks as discussed above, with inductive transfer capability that requires power transferred from the key to the device by induction, or alternatively, requires data transferred between the key and the device and power transferred from the key to the device by induction. Moreover, the electronic key 120 may include the same or similar functionality of the key 20 discussed herein.

Figure 11:
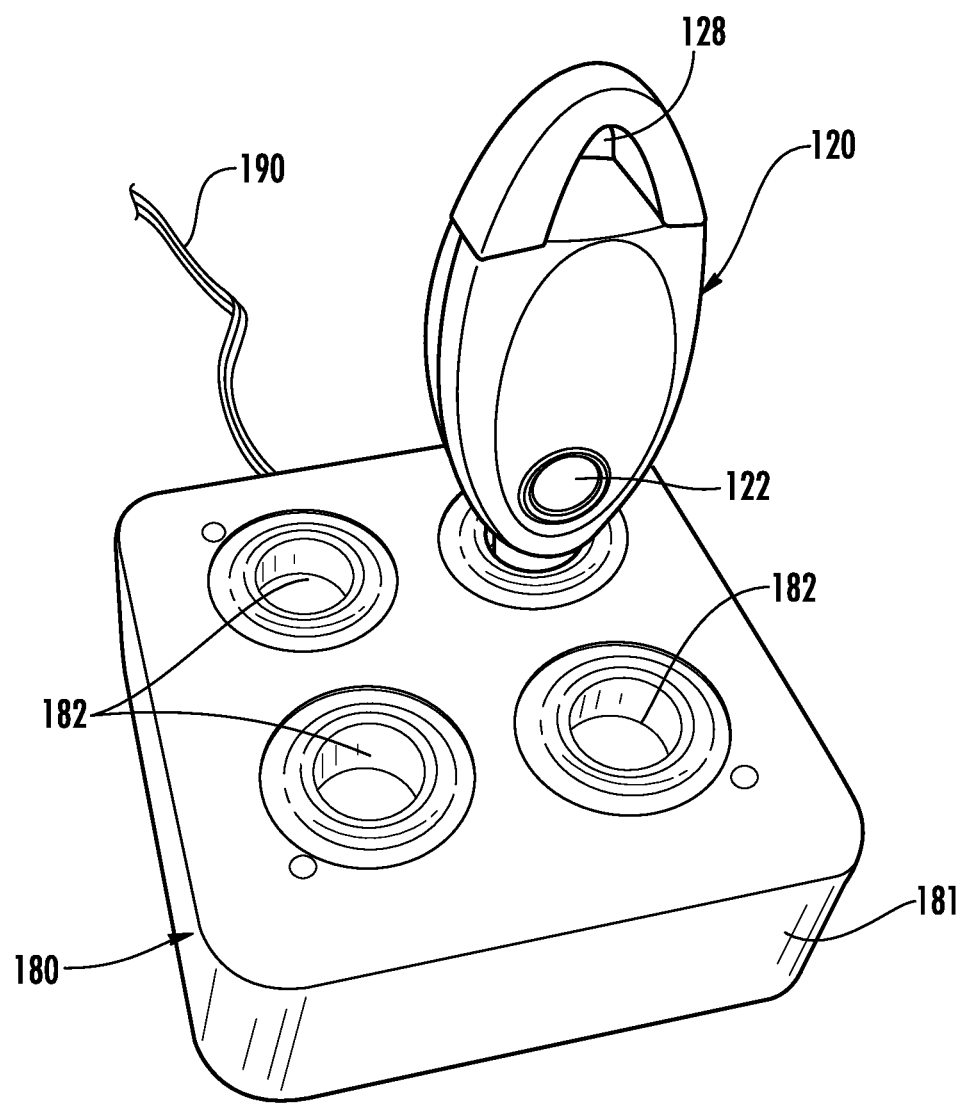
FIG. 11 is an enlarged view showing the programmable electronic key of FIG. 10 positioned on the charging station of FIG. 10 to recharge a power source disposed within the key.

As illustrated in FIG. 11, the security system and method may further comprise a charging station 180 for initially charging and subsequently recharging a rechargeable battery disposed within the security key 120 via inductive transfer. The charging station 180 comprises at least one charging port 182 sized and shaped to receive a security key 120. If desired, each charging port 182 may comprise mechanical or magnetic means for properly positioning and securely retaining the key 120 within the charging port. By way of example and without limitation, at least one, and preferably, a plurality of magnets (not shown) may be provided for positioning and retaining the key 120 within the charging port 182 of the charging station 180. However, as will be described further with reference to FIG. 17B, it is only necessary that the inductive transceiver of the security key 120 is sufficiently aligned with the corresponding inductive transceiver of the charging station 180 over a generally planar surface within the charging port 182. Thus, magnets are not required (as with charging station 80) to position, retain and maintain electrical contacts provided on the security key 120 in electrical contact with corresponding electrical contacts provided on the charging station 180. If desired, the charging station 180 may comprise an internal power source, for example, an extended-life replaceable battery or a rechargeable battery, for providing power to the key(s) 120 positioned within the charging port(s) 182. Alternatively, and as shown herein, charging station 180 may be operatively connected to an external power source by a power cord 190 having at least one conductor in a conventional manner.

Figure 12:
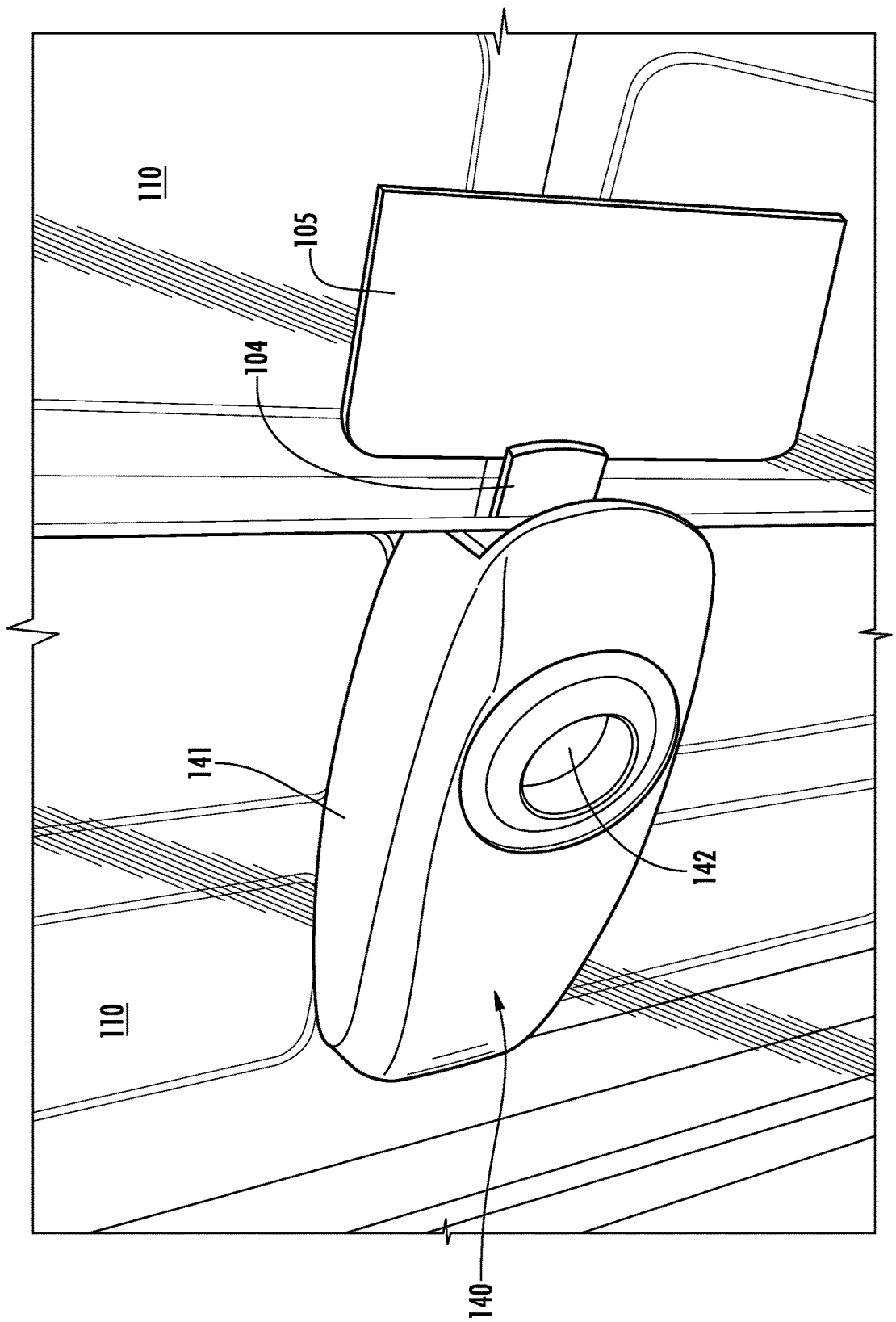
FIG. 12 is an enlarged view showing the security device of the system and method of FIG. 10.
Figure 13:
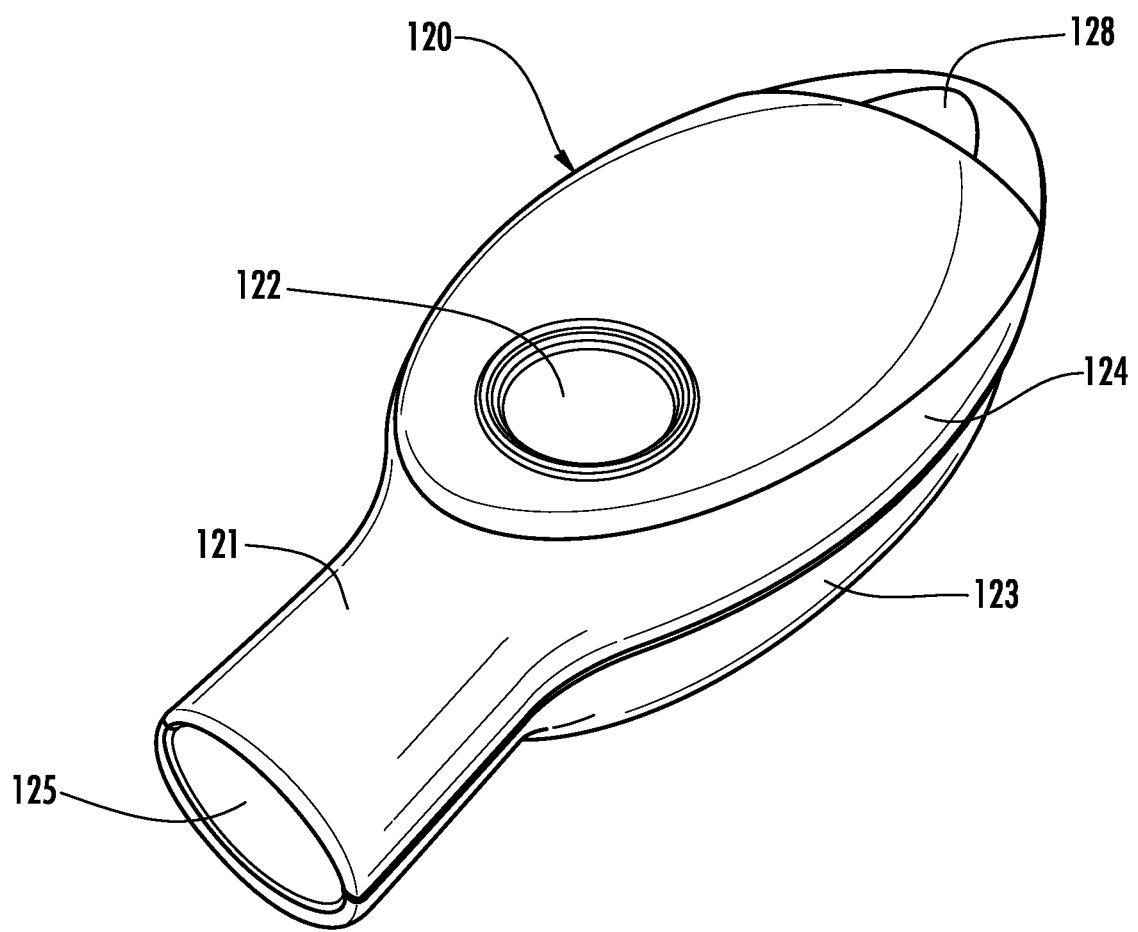
FIG. 13 is an enlarged view showing the programmable electronic key of the system and method of FIG. 10 in greater detail.

FIG. 12 shows the security device 140 with inductive transfer in greater detail. In a particular embodiment, a security device 140 with inductive transfer according to the invention may both receive electrical power from the security key 120 and communicate (e.g., transmit/receive) the SDC with the key by magnetic induction.

The cabinet lock 140 comprises a housing 141 sized and shaped to contain a logic control circuit (not shown) and an internal mechanical lock mechanism (not shown). A transfer port 142 formed in the housing 141 is sized and shaped to receive a transfer probe of the security key 120, as will be described. If desired, the transfer port 142 may comprise mechanical or magnetic means for properly positioning and securely retaining the key 120 within the transfer port. By way of example and without limitation, at least one, and preferably, a plurality of magnets (not shown) may be provided for positioning and retaining the key 120 within the transfer port 142 of the cabinet lock 140. However, as previously described with respect to the security key 120 and the charging port 182 of the charging station 180, it is only necessary that the inductive transceiver of the security key 120 is sufficiently aligned with the corresponding inductive transceiver of the cabinet lock 140 over a generally planar surface within the transfer port 42. Therefore, magnets are not required to position, retain and maintain electrical contacts provided on the security key 120 in electrical contact with corresponding electrical contacts provided on the cabinet lock 140. In the particular embodiment shown and described herein, data is transferred from the security key 120 to the cabinet lock 140 by wireless communication, such as infrared (IR) optical transmission as shown and described in the aforementioned U.S. Pat. No. 7,737,843. Power is transferred from the security key 120 to the cabinet lock 140 by induction across the transfer port 142 of the cabinet lock using an inductive transceiver disposed within a transfer probe of the key that is aligned with a corresponding inductive transceiver disposed within the cabinet lock. For example, the transfer probe of the security key 120 may comprise an inductive transceiver coil that is electrically connected to the logic control circuit of the key to provide electrical power from the internal battery of the key to an inductive transceiver coil disposed within the cabinet lock 140. The inductive transceiver coil of the cabinet lock 140 then transfers the electrical power from the internal battery of the key 120 to the mechanical lock mechanism disposed within the housing 141 of the cabinet lock. As previously mentioned, the power transferred from the key 120 is used to unlock the mechanical lock mechanism, for example utilizing an electric motor, DC stepper motor, solenoid, or the like, so that the cabinet lock 140 can be removed from the arm 104 of the lock bracket 105.

FIGS. 13-16 show the programmable electronic key 120 with inductive transfer in greater detail. As previously mentioned, the key 120 is configured to transfer both data and power to a security device 140 that comprises an electronic lock mechanism and a mechanical lock mechanism. Accordingly, the programmable electronic key 120 must be an active device in the sense that it has an internal power source sufficient to operate the mechanical lock mechanism of the security device 140. As a result, the programmable electronic key 120 may be configured to transfer both data and power from an internal source, such as a logic control circuit and a battery disposed within the key. The embodiment of the programmable electronic key 120 depicted herein is a security key with inductive transfer capability configured to be received within the transfer port 145 of the cabinet lock 140 shown in FIG. 12, as well as the programming port 62 of the programming station 60 (FIG. 2) and the charging port 182 of the charging station 180 (FIG. 11). The programmable electronic key 120 comprises a logic control circuit for performing a handshake communication protocol with the logic control circuit of the programming station 60 and for receiving the SDC from the programming station, as previously described. The logic control circuit of the programmable electronic key 120 further performs a handshake communication protocol with the logic control circuit of the security device 140 and transfers the SDC to the security device, as previously described. In a particular embodiment, a security key 120 with inductive transfer according to the invention may both transfer electrical power to a security device 140 and communicate the SDC with the security device by magnetic induction.

The programmable electronic key 120 comprises a housing 121 having an internal cavity or compartment that contains the internal components of the key, including without limitation the logic control circuit, memory, communication system and battery, as will be described. As shown, the housing 121 is formed by a lower portion 123 and an upper portion 124 that are joined together after assembly, for example by ultrasonic welding. The programmable electronic key 120 further defines an opening 128 at one end for coupling the key to a key chain ring, lanyard or the like. As previously mentioned, the programmable electronic key 120 further comprises a transfer probe 125 located at an end of the housing 121 opposite the opening 128 for transferring data and power to the security device 140. The transfer probe 125 is also operable to transmit and receive the handshake communication protocol and the SDC from the programming station 60, as previously described, and to receive power from the charging station 180, as will be described in greater detail with reference to FIG. 17A and FIG. 17B.

Figure 14:
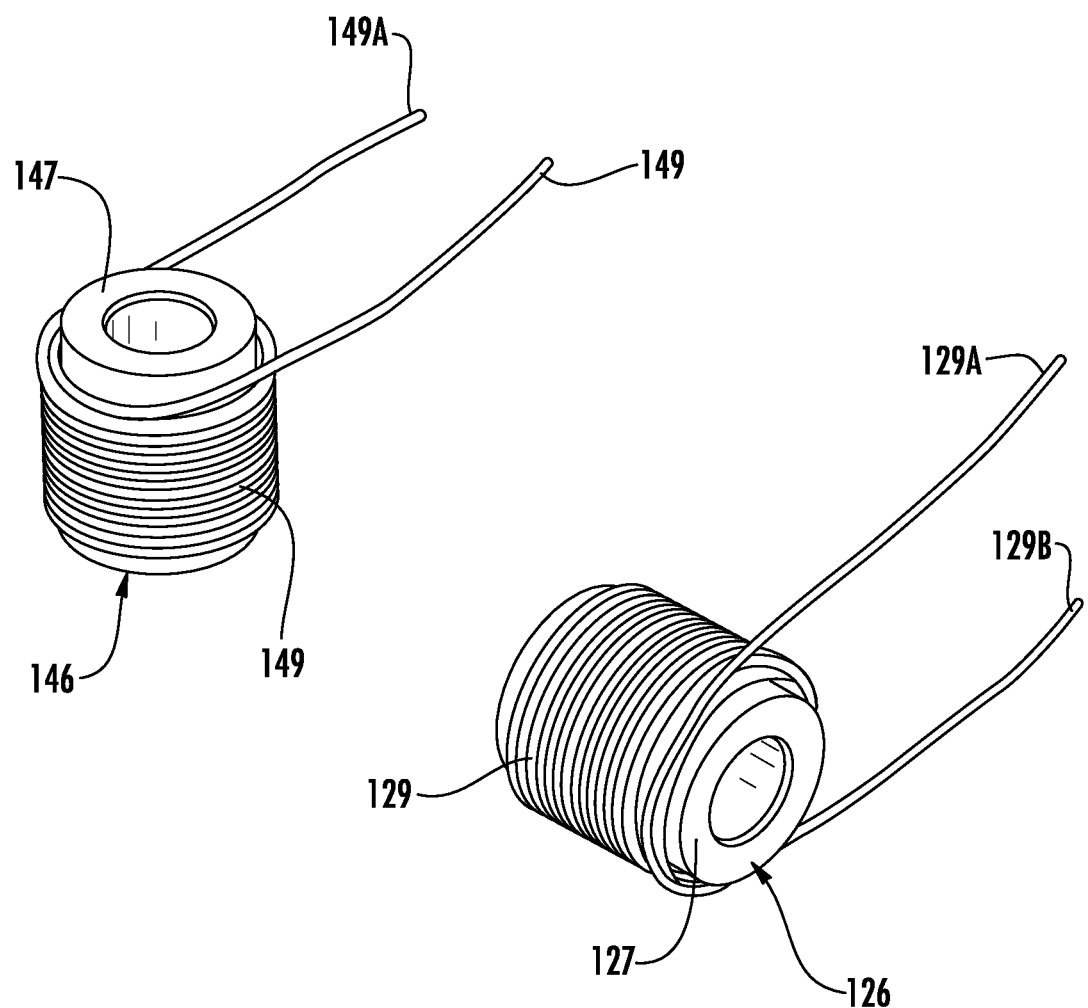
FIG. 14 is a perspective view showing a pair of matched coils for use with the programmable electronic key and the security device of FIG. 10.
Figure 15A:
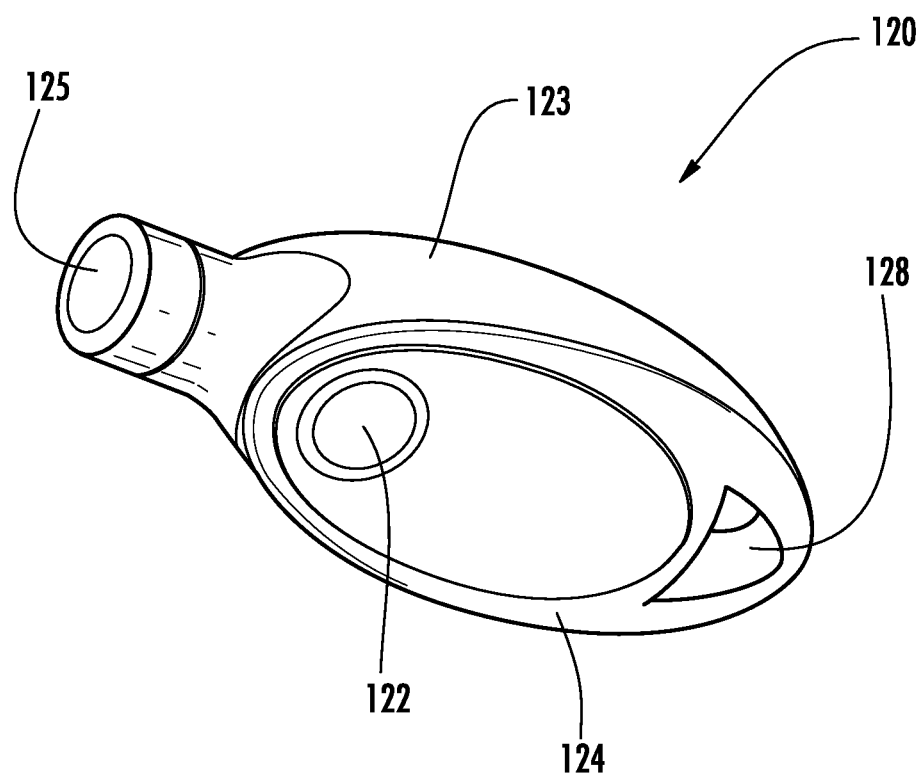
FIG. 15A is a perspective view of the programmable electronic key of FIG. 13.
Figure 15B:
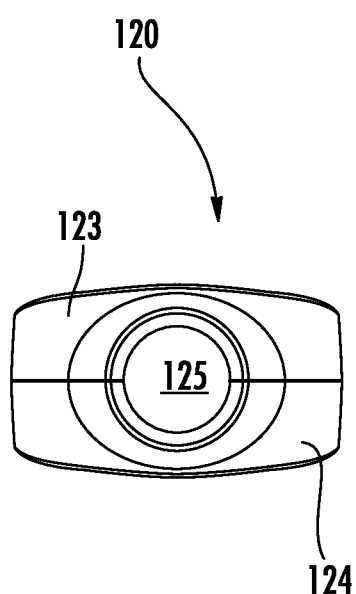
FIG. 15B is an end view of the programmable electronic key of FIG. 13.

FIG. 14 shows an embodiment of an inductive coil 126 having high magnetic permeability that is adapted to be disposed within the housing 121 of the electronic key 120 adjacent the transfer probe 125. As shown herein, the inductive coil 126 comprises a highly magnetically permeable ferrite core 127 surrounded by a plurality of inductive core windings 129. The inductive core windings 129 consist of a length of a conductive wire that is wrapped around the ferrite core. As is well known, passing an alternating current through the conductive wire generates, or induces, a magnetic field around the inductive core 127. The alternating current in the inductive core windings 129 may be produced by connecting the leads 129A and 129B of the conductive wire to the internal battery of the electronic key 120 through the logic control circuit. FIG. 14 further shows an inductive coil 146 having high magnetic permeability that is adapted to be disposed within the housing 141 of the security device (e.g., cabinet lock) 140 adjacent the transfer port 142. As shown herein, the inductive coil 146 comprises a highly magnetically permeable ferrite core 147 surrounded by a plurality of inductive core windings 149 consisting of a length of a conductive wire that is wrapped around the ferrite core. Placing the transfer probe 125 of the electronic key 120 into the transfer port 142 of the cabinet lock 140 and passing an alternating current through the inductive core windings 129 of the inductive core 126 generates a magnetic field within the transfer port of the cabinet lock in the vicinity of the inductive coil 146. As a result, an alternating current is generated, or induced, in the conductive wire of the inductive core windings 149 of inductive coil 146 having leads 149A and 149B connected to the logic control circuit of the cabinet lock 140. The alternating current induced in the inductive coil 146 of the cabinet lock 140 is then transformed into a direct current in a known manner, such as via a bridge rectifier on the logic control circuit, to provide direct current (DC) power to the cabinet lock. The DC power generated in the cabinet lock 140 by the inductive coil 126 of the electronic key 120, may be used, for example, to unlock a mechanical lock mechanism disposed within the housing 141 of the cabinet lock.

Figure 16:
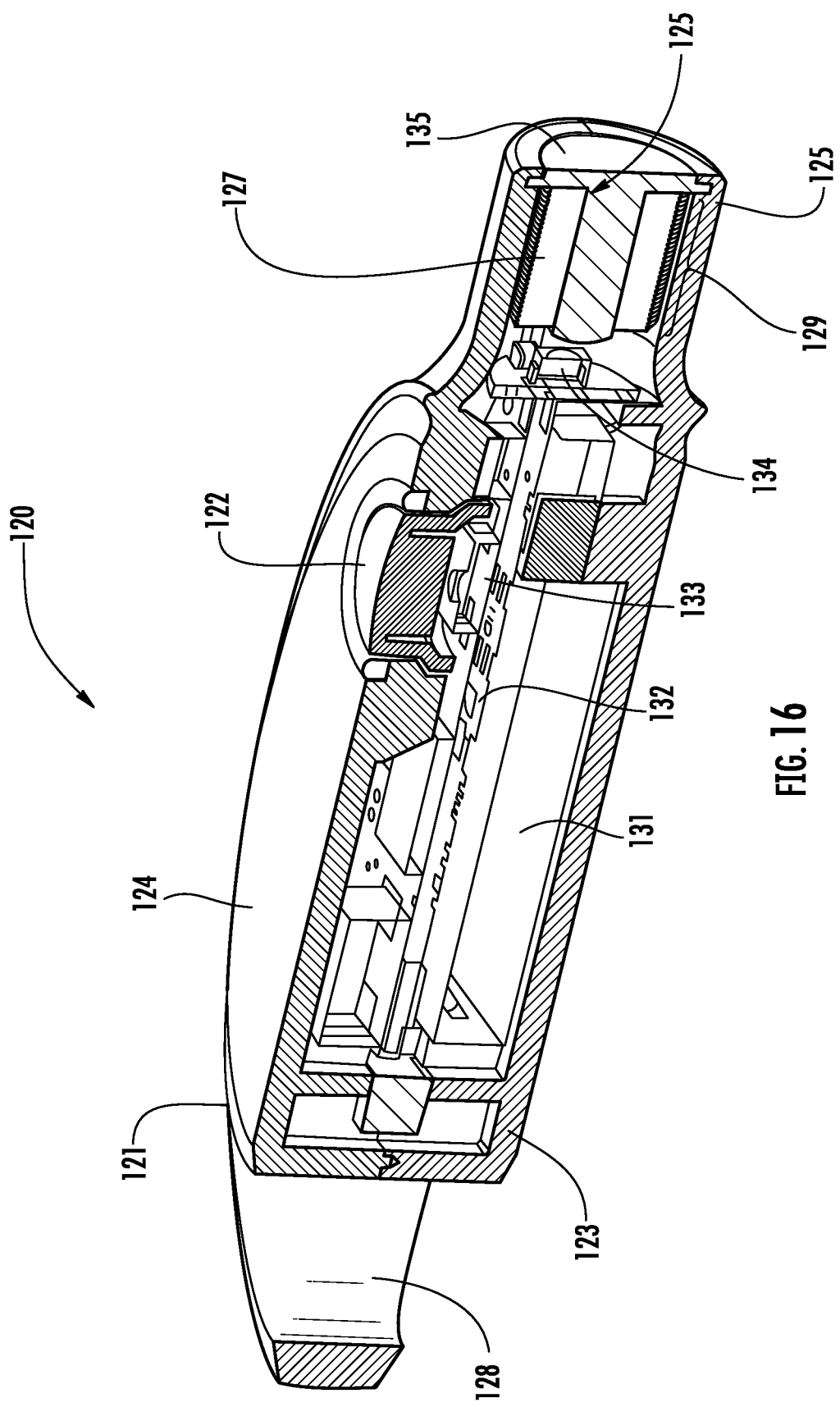
FIG. 16 is a perspective view showing a lengthwise cross-section of the programmable electronic key of FIG. 13.

As best shown in FIG. 16, an internal battery 131 and a logic control circuit, or printed circuit board (PCB) 132 are disposed within the housing 121 of the programmable electronic key 120. Battery 131 may be a conventional extended-life replaceable battery, but preferably, is a rechargeable battery suitable for use with the charging station 180. The logic control circuit 132 is operatively coupled and electrically connected to a switch 133 that is actuated by the control button 122 provided on the exterior of the key 120 through the housing 121. Control button 122 in conjunction with switch 133 controls certain operations of the logic control circuit 132, and in particular, transmission of the data (e.g., handshake communication protocol and SDC) between the key and the programming station 60, as well as between the key and the security device 140. In that regard, the logic control circuit 132 is further operatively coupled and electrically connected to a communication system 134 for transferring the handshake communication protocol and SDC data. As shown and described herein, the communication system 134 is a wireless infrared (IR) transceiver for optical transmission of data between the programmable electronic key 120 and the programming station 60, and between the key and the security device 140. As a result, the transfer probe 125 of the key 120 is provided with an optically transparent or translucent filter window 135 for emitting and collecting optical transmissions between the key 120 and the programming station 60, or between the key and the security device 140, as required. Transfer probe 125 further comprises inductive coil 126 (FIG. 14) comprising inductive core 127 and inductive core windings 129 for transferring electrical power to the security device 140 and/or receiving electrical power from the charging station 180 to charge the internal battery 131, as required. Accordingly, the leads 129A and 129B (FIG. 14) of the inductive coil 126 are electrically connected to the logic control circuit 132, which in turn is electrically connected to the battery 131, in a suitable manner, for example by conductive insulated wires or plated conductors. Alternatively, the optical transceiver 134 may be eliminated and data transferred between the programmable electronic key 120 and the security device 140 via magnetic induction through the inductive coil 126.

As noted above, one aspect of a programmable electronic key 120 according to the present invention, especially when used for use in conjunction with a security device 140 as described herein, is that the key does not require a physical force to be exerted by a user on the key to operate the mechanical lock mechanism of the security device. In addition, there is no required orientation of the transfer probe 125 of the programmable electronic key 120 relative to the charging port 182 of the charging station 180 or the transfer port 142 of the security device 140. Accordingly, any wear of the electrical contacts on the transfer probe 125, the charging port 182 or the transfer port 142 is minimized. As a further advantage, an authorized person is not required to position the transfer probe 125 of the programmable electronic key 120 in a particular orientation relative to the transfer port 142 of the security device 140 and thereafter exert a compressive and/or torsional force on the key to operate the mechanical lock mechanism of the device.

Figure 17A:
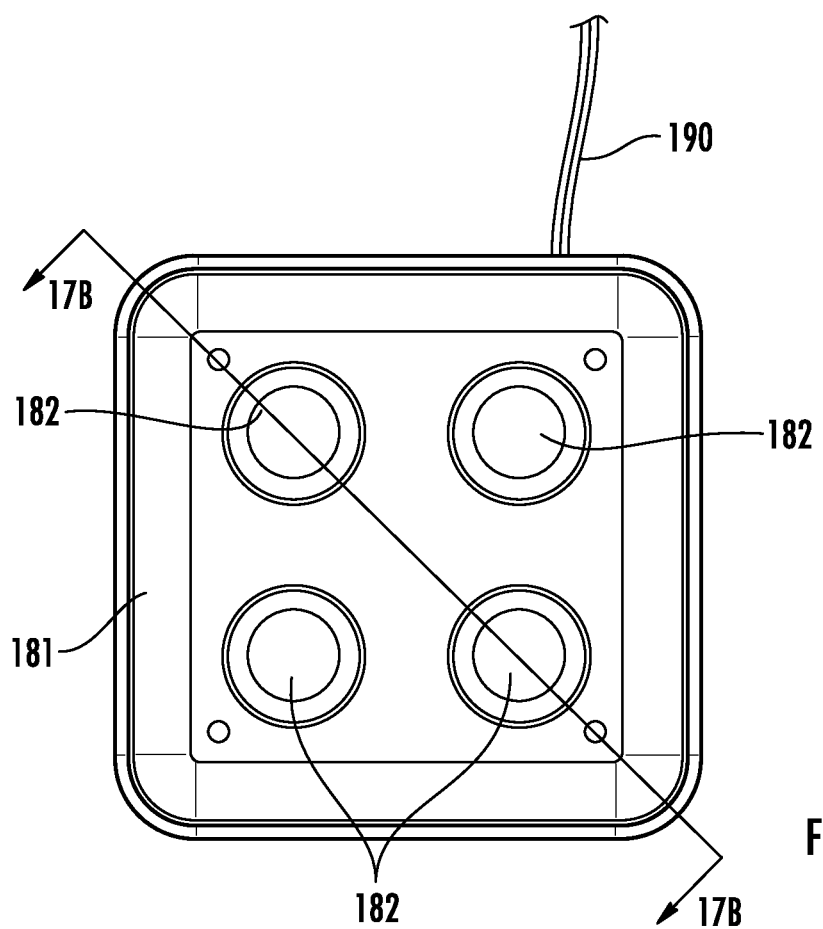
FIG. 17A is a top view showing the charging station of the system and method of FIG. 10.
Figure 17B:
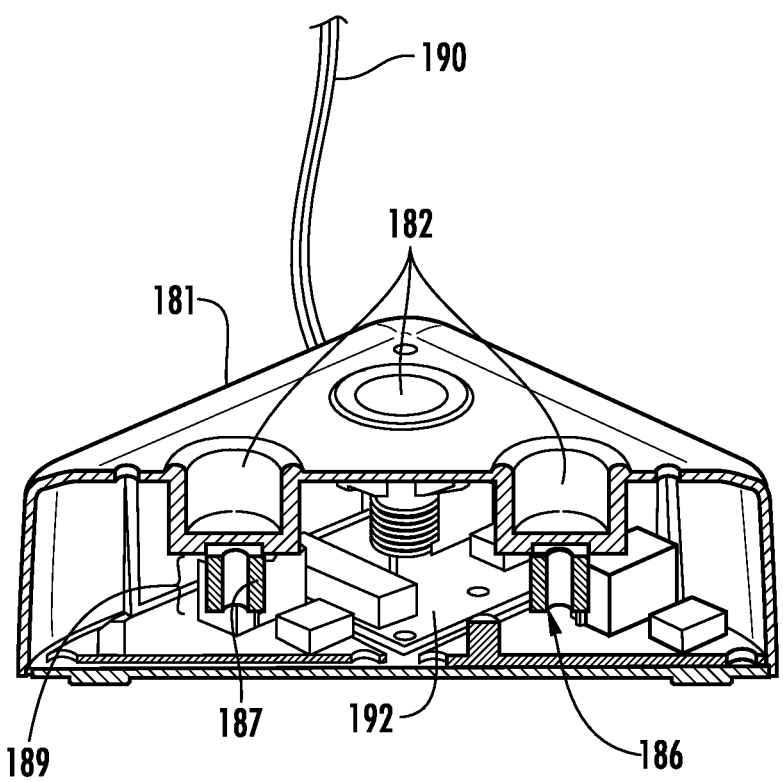
FIG. 17B is a perspective view showing a diagonal cross-section of the charging station of FIG. 17A taken along the line 17B-17B.

FIG. 17A and FIG. 17B show charging station 180 with inductive transfer capability in greater detail. As previously mentioned, the charging station 180 recharges the internal battery 131 of the security key 120. In certain instances, the charging station 180 also deactivates the data transfer and/or power transfer capability of the key 120 until the key has been reprogrammed with the SDC by the programming station 60. Regardless, the charging station 180 comprises a housing 181 for containing the internal components of the charging station. The exterior of the housing 181 has at least one charging port 182 formed therein that are sized and shaped to receive the transfer probe 125 of a programmable electronic key 120. As previously described, mechanical or magnetic means may be provided for properly positioning and securely retaining the transfer probe 125 within the charging port 182 such that the inductive coil 126 is in alignment with a corresponding inductive coil 186 (FIG. 17B) disposed within the housing 181 of the charging station 180 adjacent the charging port. As will be readily understood and appreciated, the inductive coil 186 adjacent the charging port 182 of the charging station 180 generates, or induces, an alternating current in the conductive wire of the inductive core windings 129 of inductive coil 126 that in turn provides DC power (for example, via a bridge rectifier on the logic control circuit 132) to charge the battery 131 of the programmable electronic key 120.

As best shown in FIG. 17B, housing 181 is sized and shaped to contain a logic control circuit, or printed circuit board (PCB) 192 that is electrically connected and operatively coupled to an inductive coil 186 adjacent each of the charging ports 182. In the manner previously described with respect to inductive coli 126 and inductive coil 146, each inductive coil 186 comprises an inductive core 187 surrounded by a plurality of inductive core windings 189 formed by a conductive wire having a pair of leads (not shown). When an alternating current is passed through the conductive wire of the inductive core windings 189 with the transfer probe 125 of the programmable electronic key 120 disposed in the charging port 182 of the charging station 180, the inductive coil 186 generates a magnetic field that induces an alternating current in the conductive wire of the inductive core windings 129 of the inductive coil 126 of the key. The alternating current in the inductive coil 126 is then transformed into DC power to charge the internal battery 131 of the programmable electronic key 120. As previously mentioned, charging station 180 may comprise an internal power source, for example, an extended-life replaceable battery or a rechargeable battery, for providing power to the key(s) 120 positioned within the charging port(s) 182. Alternatively, and as shown herein, the logic control circuit 192 of the charging station 180 is electrically connected to an external power source by a power cord 190 having at least one conductor. Furthermore, logic control circuit 192 may be operable for deactivating the data transfer and/or power transfer functions of the programmable electronic key 120, or alternatively, for activating the "timing out" feature of the key until it is reprogrammed or refreshed by the programming station 60.

In some embodiments, each electronic key 20, 120 is configured to store various types of data. For example, each key 20, 120 may store a serial number of one or more security devices 40, 140, the data and time of activation of the key, a user of the key, a serial number of the key, number of key activations, a type of activation (e.g., "naked" activation, activation transferring only data, activation transferring power, activation transferring data and power), and/or various events (e.g., a security device has been locked or unlocked). This information may be transmitted to a remote location or device (e.g., a backend computer) upon each activation of the key 20, 120 or at any other desired period of time, such as upon communication with a programming station 60 or other back-end device. Thus, the data transfer may occur in predetermined time intervals or in real time or automatically in some embodiments. In some cases, the programming station 60 may be configured to store the data and transfer the data to a remote location or device. Authorized personnel may use this data to take various actions, such as to audit and monitor key user activity, audit security devices 40, 140 (e.g., ensure the security devices are locked), etc. Moreover, such information may be requested and obtained on demand, such as from the programming station 60 and/or a remote device.

In other embodiments, the electronic key 20, 120 is configured to obtain data from a security device 40, 140. For example, the security device 40, 140 may store various data regarding past communication with a electronic key 20, 120 (e.g., key identification, time of communication, etc.), and when a subsequent electronic key communicates with the same security device, the data is transferred to the electronic key. Thus, the security device 40, 140 may include a memory for storing such data. In some cases, the security device 40, 140 includes a power source for receiving and storing the data, while in other cases, the power provided by the electronic key 20, 120 is used for allowing the merchandise security device to store the data. The electronic key 20, 120 may then communicate the data for collection and review, such as at a remote location or device. In some instances, communication between the electronic key 20, 120 and the programming station 60 may allow data to be pulled from the electronic key and communicated, such as to a remote location or device. In other cases, the electronic key 20, 120 may be configured to obtain data from security devices 40, 140, such as an identification of the security device, identification of the items contained within or by the security device, and/or the system health of the security device and/or the items. The electronic key 20, 120 may store the data and provide the data to a remote location or device upon communication with the programming station 60. As such, the electronic keys 20, 120 may be a useful resource for obtaining various types of data from the merchandise security devices 40, 140 without the need for wired connections or complex wireless networks or systems. In other embodiments, the security devices 40, 140 themselves may include wireless communication capability to allow for transmission of the data to a remote device or location.

In another embodiment, each electronic key 20, 120 may include a security code and a serial number for one or more security devices 40, 140. For example, a key 20, 120 may only be able to lock or unlock a security device 40, 140 where the security codes and the serial numbers match one another. In one example, each serial number is unique to a security device 40, 140 and could be programmed at the time of manufacture or by the retailer. Individual electronic keys 20, 120 may then be assigned particular serial numbers for authorized security devices 40, 140 (e.g., user 1 includes serial numbers 1, 2, 3; user 2 includes serial numbers 1, 4, 5). Each of the electronic keys 20, 120 may be programmed with the same security code using a programming station 60. In order to lock or unlock a merchandise security device 40, 140, the electronic key 20, 120 may communicate with a particular security device and determine whether the security codes and the serial numbers match. If the codes match, the electronic key 20, 120 then locks or unlocks the security device 40, 140.

Figure 18:
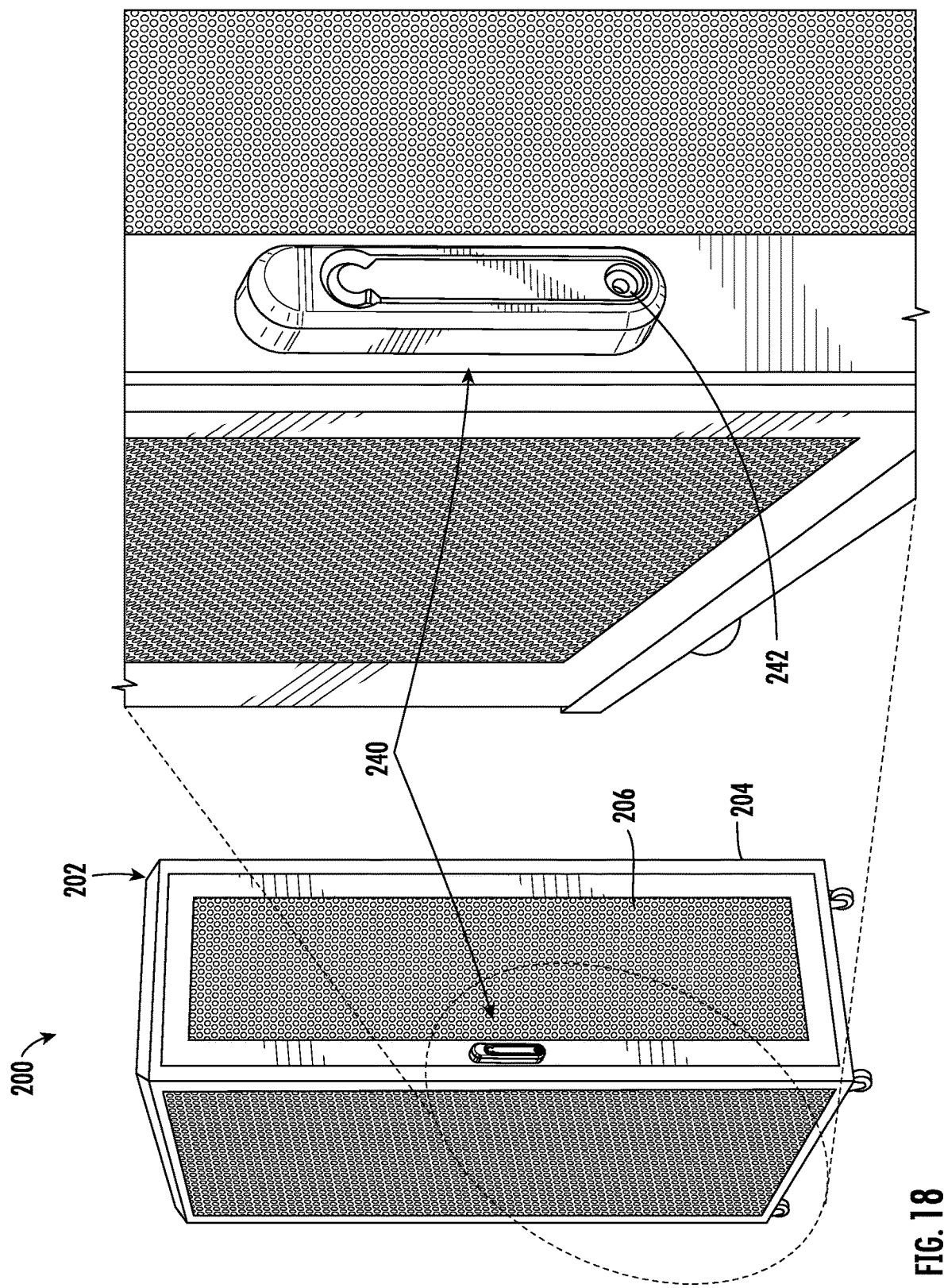
FIG. 18 illustrates a system comprising a server rack and a lock according to an embodiment of the invention.
Figure 19:
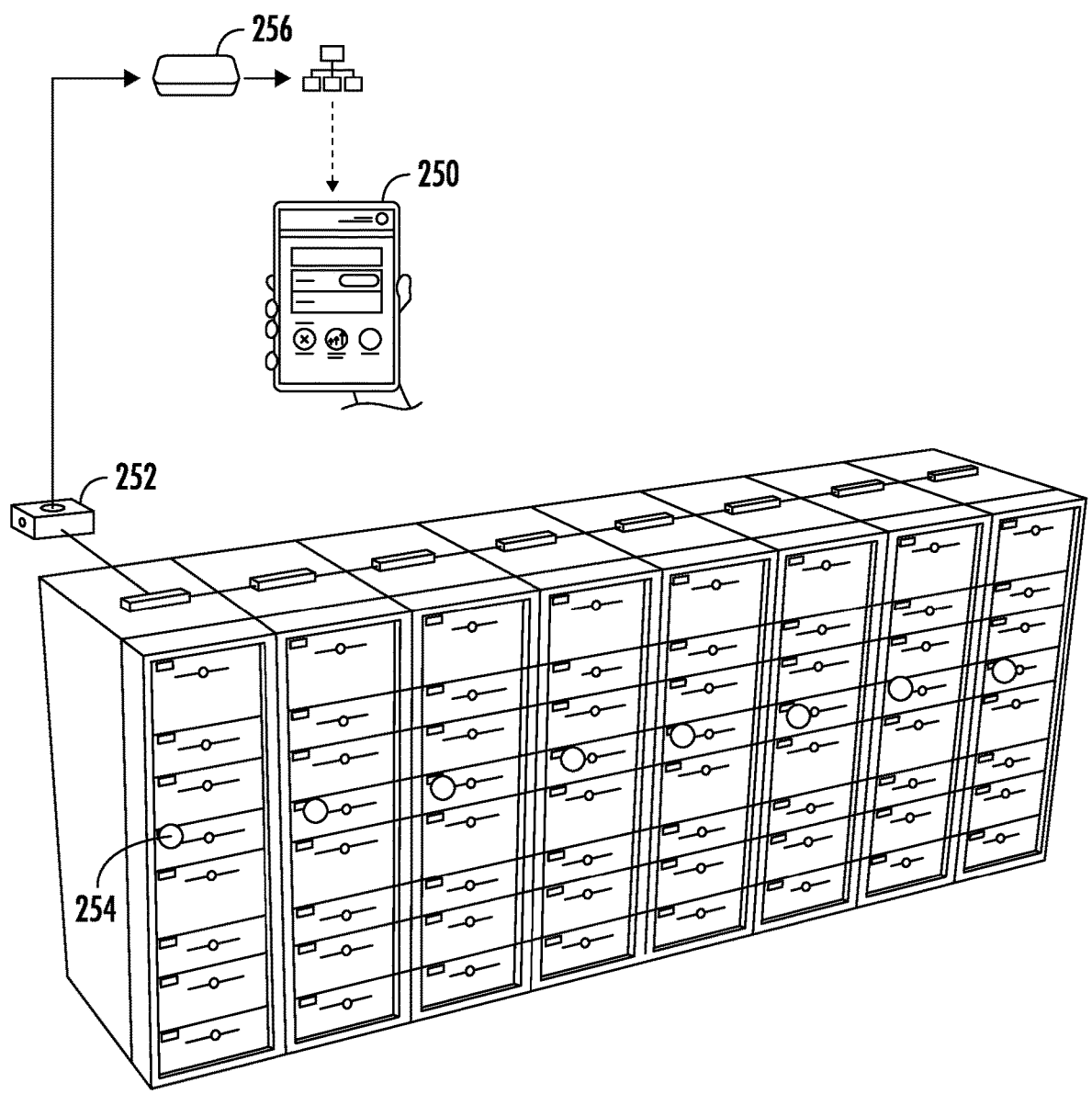
FIG. 19 illustrates a system comprising a server rack and a lock configured to communicate with a remote device according to an embodiment of the invention.
Figure 20:
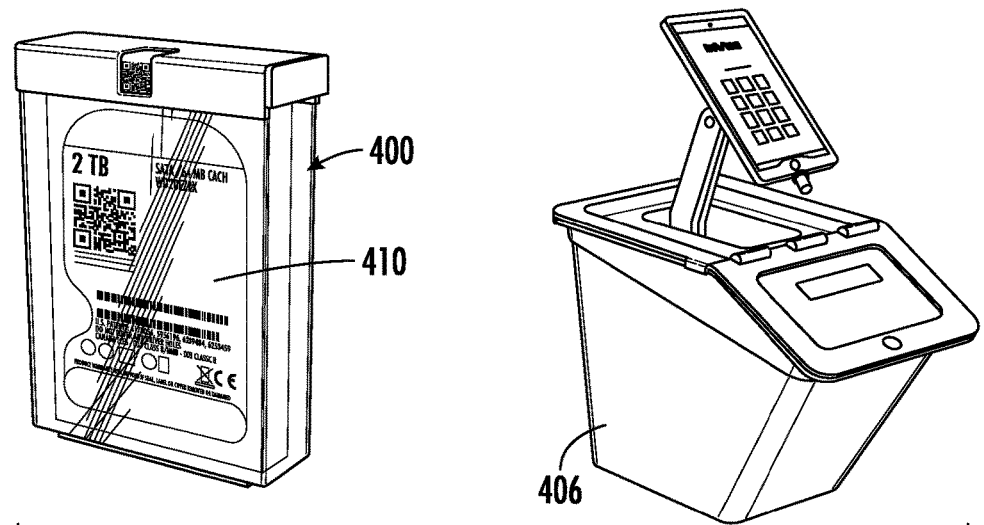
FIG. 20 is a perspective view of a lockable enclosure and a secure bin according to one embodiment.
Figure 21:
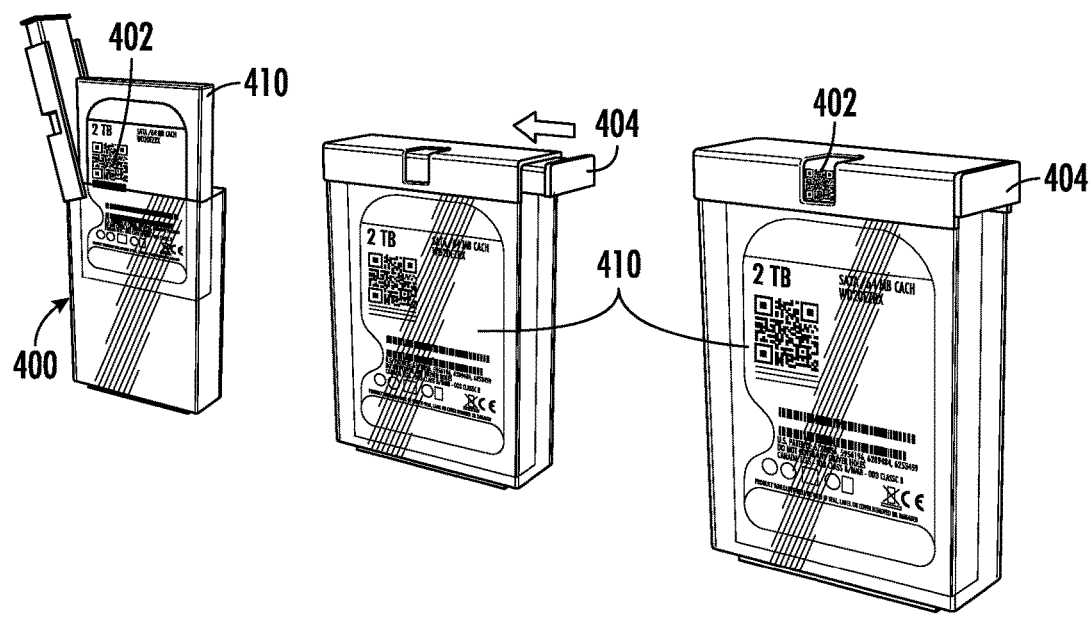
FIG. 21 are perspective views of the lockable enclosure shown in FIG. 20 showing the sequence of securing the media in the lockable enclosure according to one embodiment.
Figure 22:
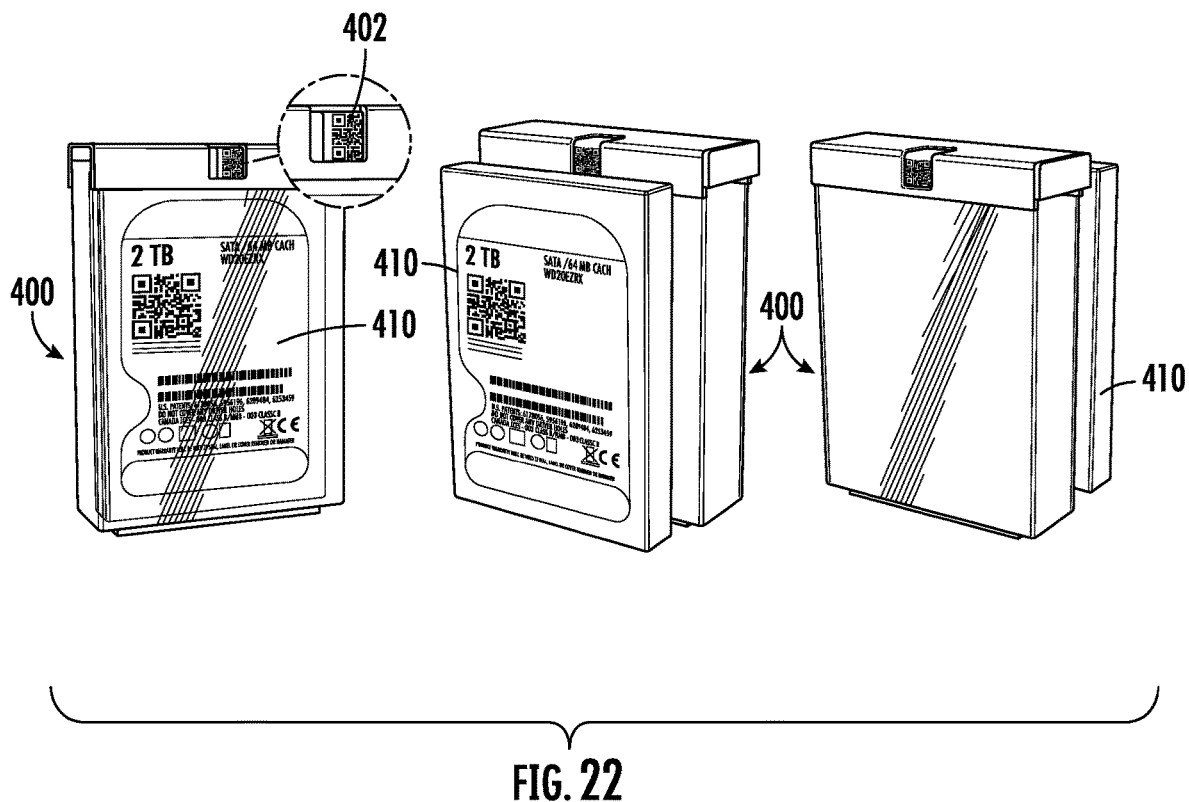
FIG. 22 are perspective views of the lockable enclosure and media shown in FIG. 20.
Figure 23:
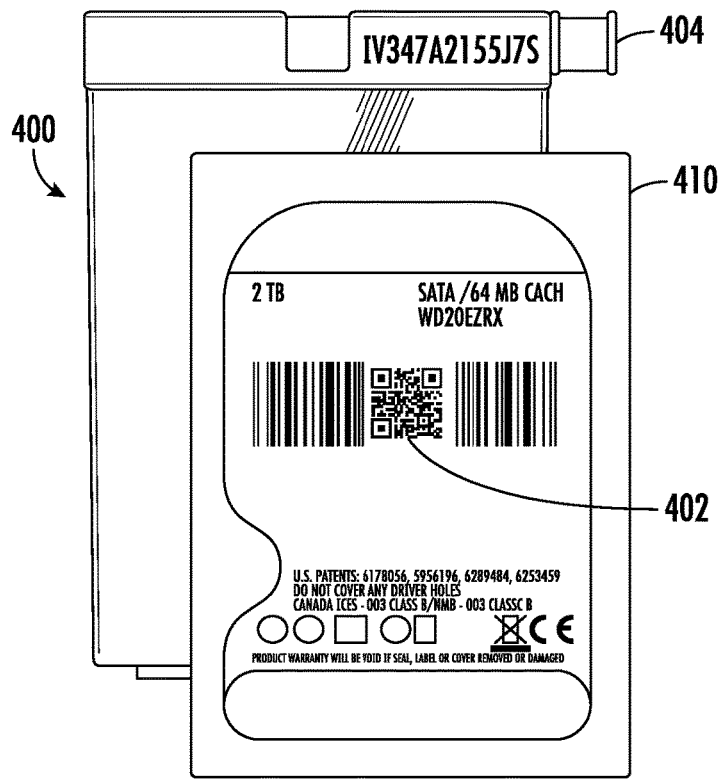
FIG. 23 is a front view of the lockable enclosure and media shown in FIG. 20.
Figure 24:
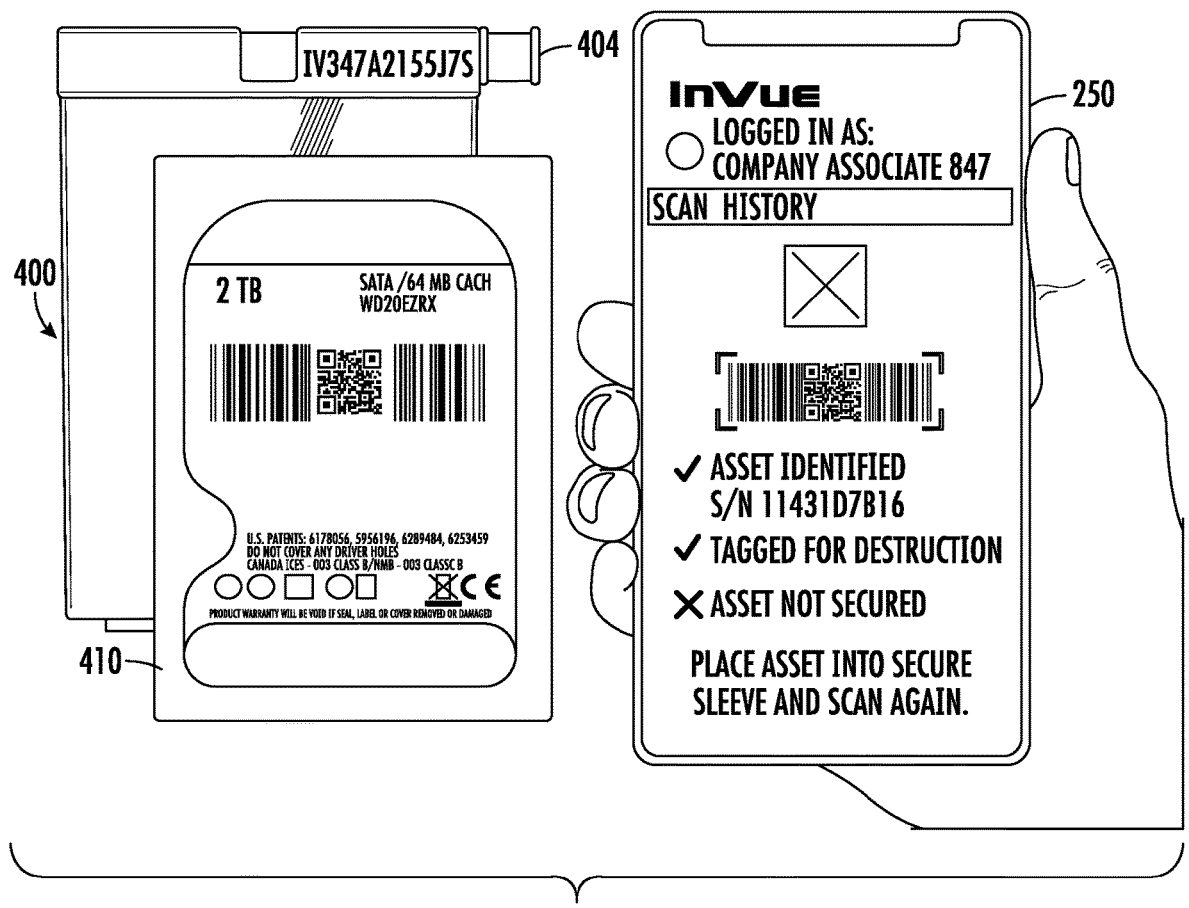
FIG. 24 is a front view of the lockable enclosure shown in FIG. 20 and a remote device prior to securing the media according to one embodiment.
Figure 25:
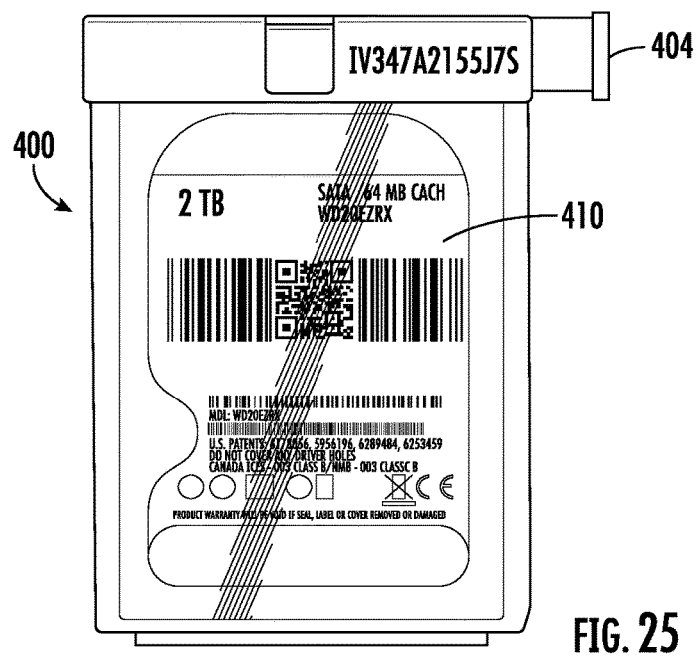
FIG. 25 is a front view of the lockable enclosure shown in FIG. 20 prior to locking the media therein according to one embodiment.
Figure 26:
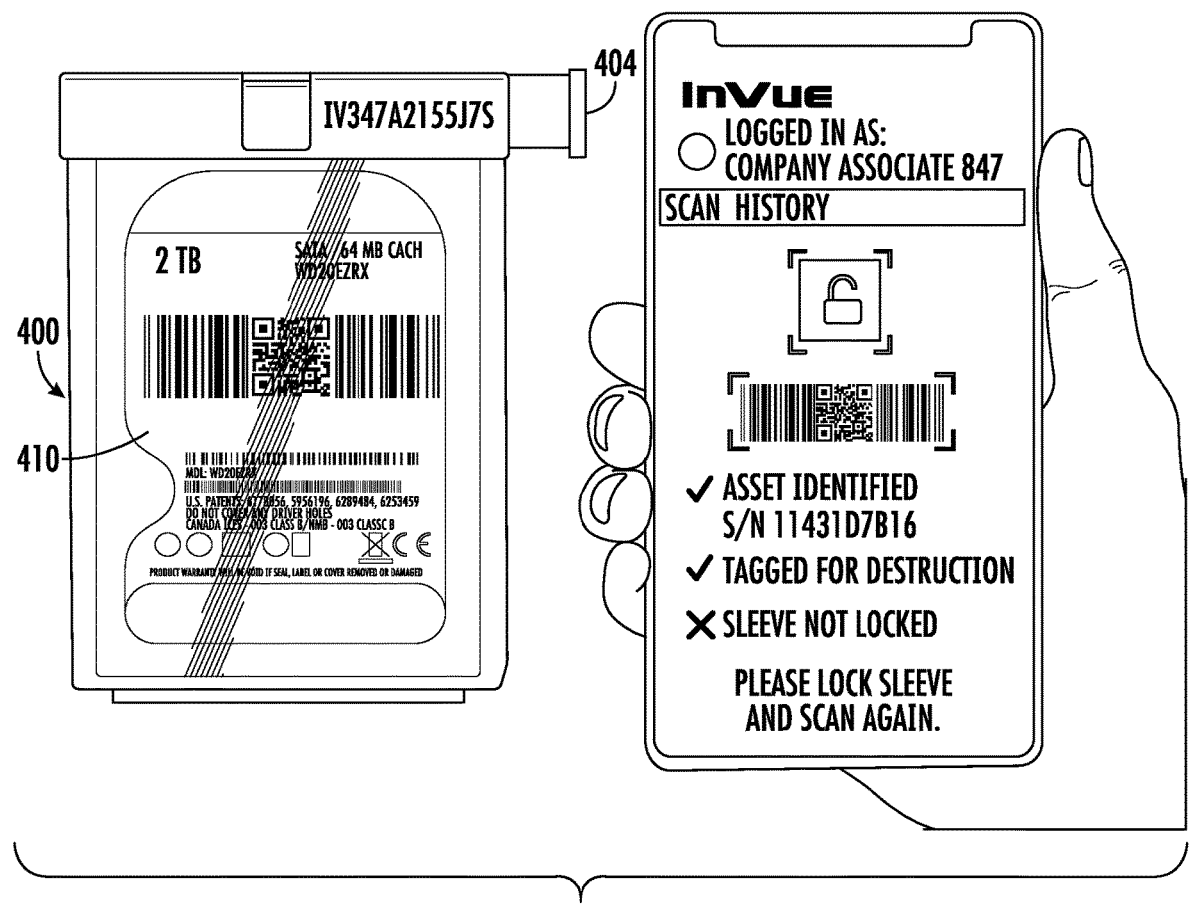
FIG. 26 is a front view of the lockable enclosure shown in FIG. 20 and a remote device prior to locking the lockable enclosure according to one embodiment.
Figure 27:
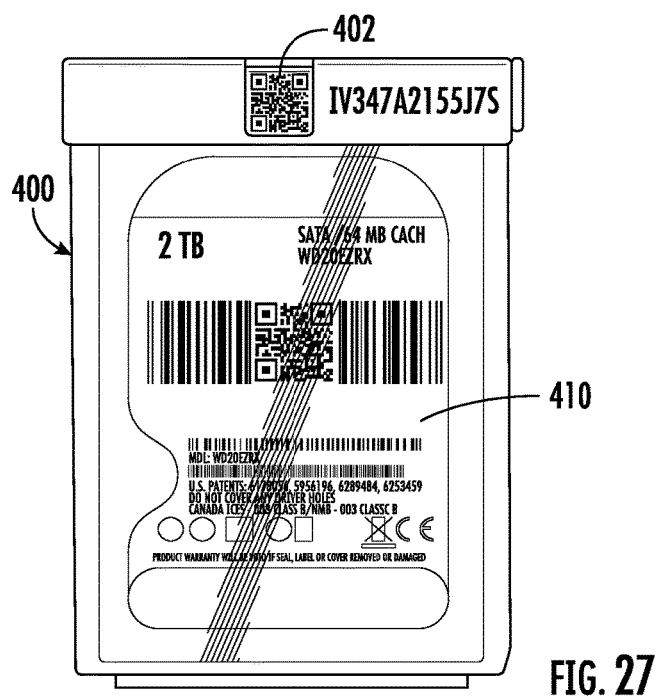
FIG. 27 is a front view of the lockable enclosure FIG. 20 with the media locked therein according to one embodiment.
Figure 28:
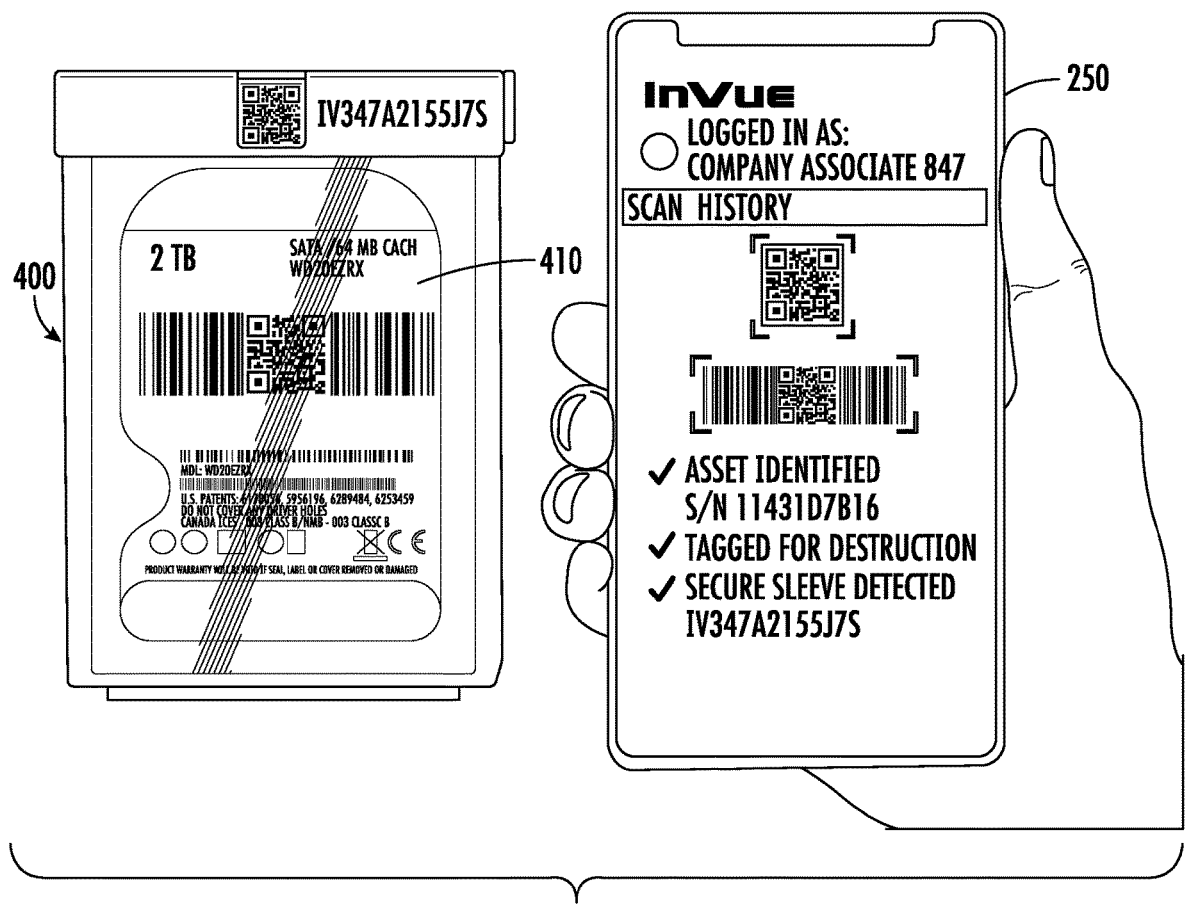
FIG. 28 is a front view of the lockable enclosure shown in FIG. 20 and a remote device after locking the lockable enclosure according to one embodiment.
Figure 29:
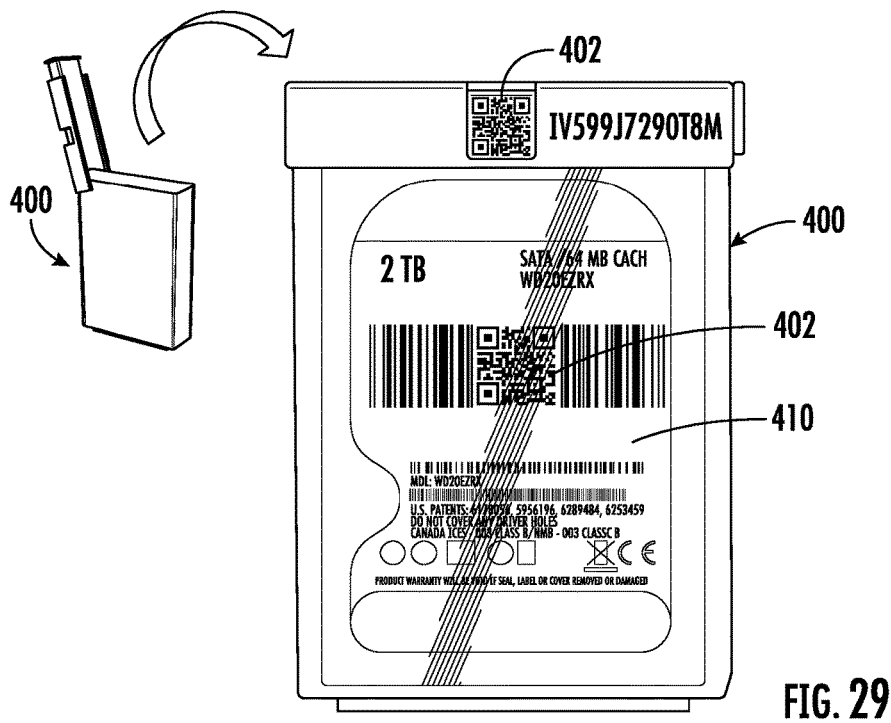
FIG. 29 is another front view of the lockable enclosure shown in FIG. 20.
Figure 30:
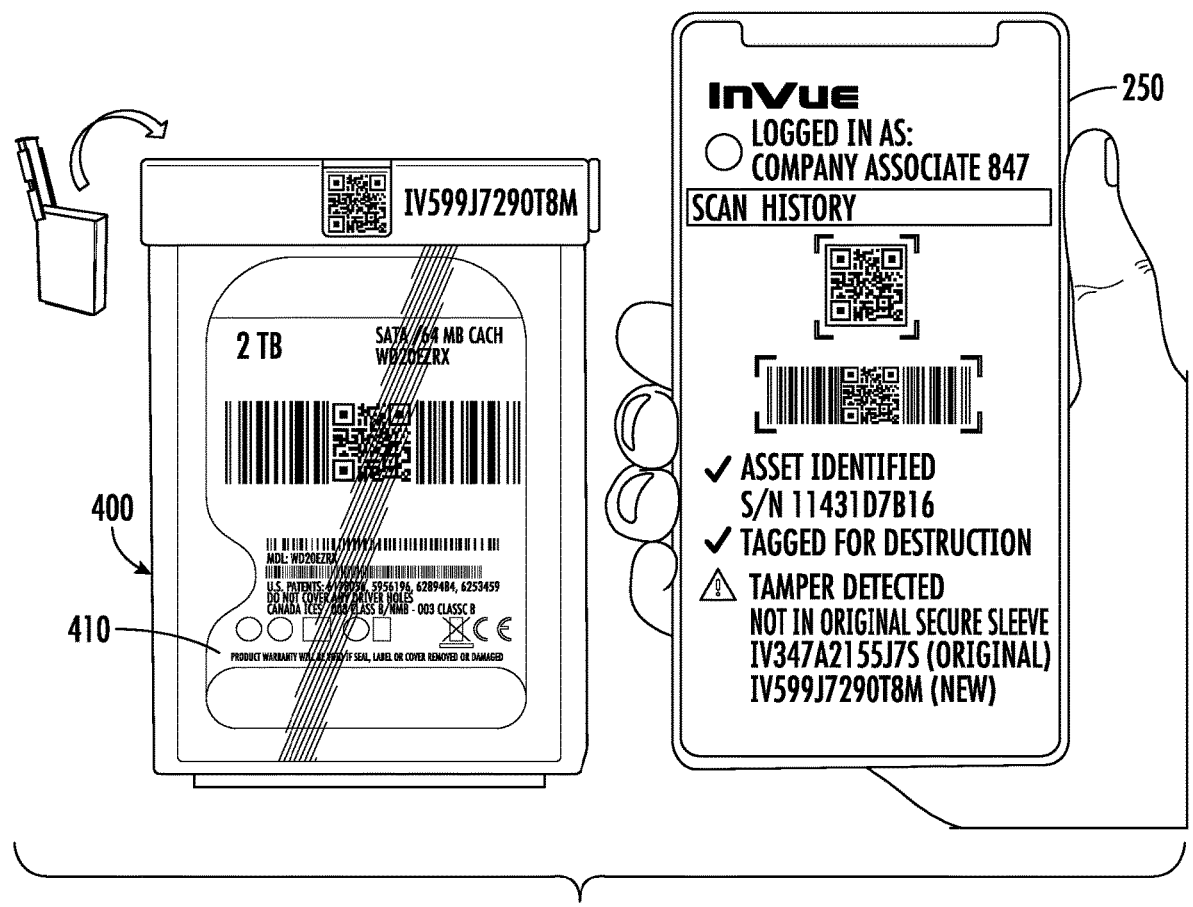
FIG. 30 is a front view of the lockable enclosure shown in FIG. 20 and a remote device after detecting a tamper attempt according to one embodiment.
Figure 31:
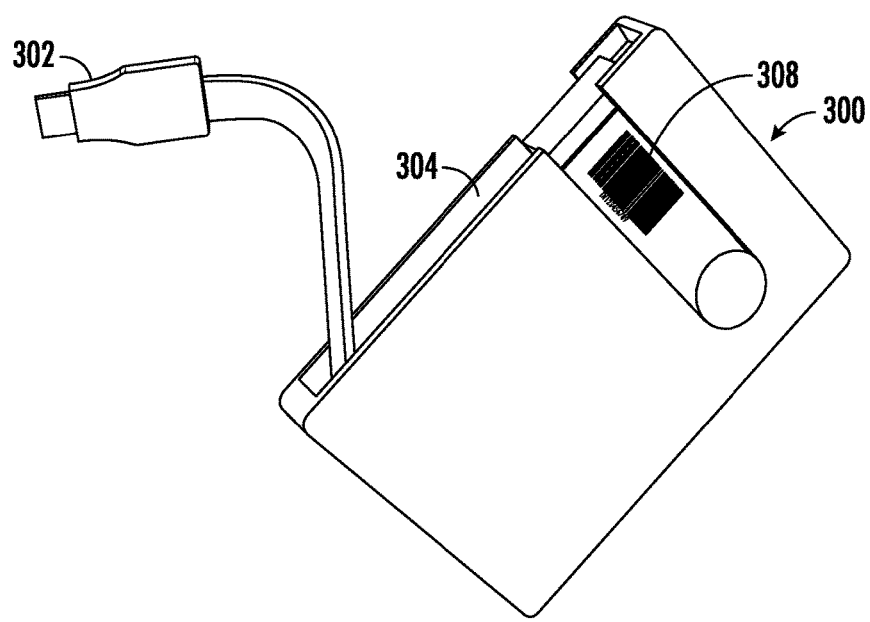
FIG. 31 is a perspective view of a USB drive according to one embodiment.

According to another embodiment, FIG. 18 illustrates a system 200 comprising a server rack 202 and a lock 240. In this example, the server rack 202 includes a cabinet 204 and a door 206 pivotably attached to the cabinet, although other types of server racks and fixtures may be used. The lock 240 is configured to lock the door 206 to the cabinet 204 such that the door is incapable of being opened when the lock is locked but is able to be opened when the lock is unlocked. FIG. 19 illustrates that in this embodiment, the lock 240 includes a latch 208 that is configured to engage the cabinet 204 to prevent the door 206 from opening when locked. The latch 208 may be any suitable mechanism configured to move between an engaged position with the cabinet 204 and a disengaged position whereby the latch is no longer in engagement with the cabinet.

In some embodiments, the lock 240 is configured to operate according to the various embodiment discussed above for the security devices 40, 140. For example, the lock 240 may be an electronic lock configured to be controlled by a key 20, 120 using power and/or data communication using various communication protocols. In the illustrated embodiment, the lock 240 may include a transfer port 242 that is configured to facilitate communication with a key 20, 120 as disclosed above. In other embodiments, the lock 240 may be configured to be operated using a combination of electrical and mechanical interaction.

In other embodiments, the key 20, 120 may be used for ensuring chain of custody. For example, the key 20, 120 may be configured to scan the rack or hardware contained within the rack (e.g., servers or hard drives). For example, each drive could have an NFC label attached thereto (or any other of a number of devices to be identified), and the key 20, 120 may be configured to read data on the NFC label. Scanning the NFC label may result in the key 20, 120 storing information stored on the label which may in turn be stored in the key for auditing purposes. When the technician opens the door 206, they may also be required to scan the drive they are removing, which could likewise be stored on the key 20, 120. In the event the server drives are to be destroyed, the key 20, 120 may also be configured to scan the drives at the destruction point for storing additional audit data. Thus, the key 20, 120 can facilitate acquiring more data about when and who accessed a drive, leading to a chain of custody for that drive.

In additional embodiments, the system 200 may include a security device to detect unauthorized access to a server rack 202. In one example, the security device may be configured to detect removal of a drive contained within the server rack 202.

In some embodiments, the security system 200 may include wireless communications for facilitating communication between its various components (e.g., electronic locks 254, programming stations, and/or keys 20, 120) and/or one or more remote devices 250. For example, FIG. 19 shows that the security system may include a monitoring device 252 configured to communicate with one or more electronic locks, keys, and a remote device 250. The monitoring device 252 may be any device (e.g., a controller, hub, gateway, computer, server, and/or cloud device) configured to communicate with one or more electronic locks and/or keys. For instance, the monitoring device 252 may be a hub configured to communicate with a plurality of electronic locks and/or keys. In other cases, the monitoring device 252 may be a computer (e.g., tablet, laptop, or desktop computer) that is configured to communicate with one or more electronic locks and/or keys and/or one or more hubs 256 to facilitate data transfer. It is understood that any number of monitoring devices 252 may be employed in the system. The electronic locks, keys, and/or the monitoring device 252 may include wireless communications circuitry for communicating with one another using any desired communications protocol (e.g., Bluetooth, LoRa, Wi-Fi, radiofrequency, etc.). The electronic locks, keys, and monitoring device 252 may be located remotely from one another (e.g., the electronic locks may be located in a data center, while the monitoring device may be at a location that is not in the data center). In some cases, the monitoring device 252 may be located at some fixed location in proximity to one or more electronic locks (e.g., attached to a server rack). In other instances, the electronic locks and/or keys and the monitoring device 252 may communicate over a cloud network. In some embodiments, the electronic locks and the monitoring device 18 are electrically connected via hard wiring, and the monitoring device may have wireless communications circuitry for communicating with other monitoring devices or remote devices 250.

The monitoring device 252 may further be configured to facilitate communication with one or more remote devices 250 (e.g., a smartphone or tablet) for providing notification regarding various events and/or data. For example, data such as a time, date, server ID, lock ID, key ID, user, etc. of access may be stored by the locks and/or keys and communicated between the electronic locks, keys, and/or monitoring devices to the remote device 250 (e.g., an authorized access attempt). Such communication could occur, for instance, over one or more wireless communication protocols. For instance, a private local network may be used to facilitate communication between the electronic locks, keys, and a monitoring device 18 (e.g., via the LoRa network), and public network could be sent to the remote device 250 (e.g., via a cloud network). In other embodiments, the electronic locks and/or the monitoring device 252 may be configured to generate an alarm signal should an unauthorized access attempt be detected. In some embodiments, reports may be generated at the remote device 250 which may be used to collect and manage data regarding each of the electronic locks and/or keys.

It is generally understood that data centers may use data or media drives (e.g., USB, SD, Compact Flash, or SSD) to transfer software, firmware, code and other digital data between computer systems including various components. These drives are often one time use in that they are destroyed (e.g., shredded) at the end of the process so that there is minimum opportunity for the data on them to be intercepted by nefarious actors. There are several current issues with this process, one of which is that data drives are often small and not suited to be used in the destruction devices used on typical hard drives. For example, the hard drive may be placed on a conveyor belt for purposes of drive destruction that may have gaps that a data drive could fall through. Often the hard drives have a bar code or QR code that is scanned to confirm destruction. A data drive is small and may not have sufficient space for a code that is easily read by the scanners. Also, intermediate storage, such as from the server rack to the destruction machine, might be set up to accommodate typical hard drive sizes, but not smaller data drives. Thus, there exists a need for a data drive to work within the parameters of these existing destruction systems. In some embodiments, the data drives disclosed herein may include similar features as those described in U.S. application Ser. No. 17/845,075, filed on Jun. 21, 2022, entitled Data Center Security Systems and Methods, the disclosure of which is incorporated herein by reference in its entirety.

FIGS. 31-34 show various embodiments of a USB drive 300. In some embodiments, the size of the USB drive 300 (or other media device or drive) matches the size of a typical solid-state drive (SSD) drive, which is the most commonly used in rack systems and destruction machines. These SSD cases are approximately 100×70×15 (mm), but other sizes could be viable depending on the machine in use. Thus, the USB drive 300 may include a case or housing that is the same or substantially similar to the size of a conventional SSD drive. Ensuring that the USB drive 300 is the same size as an SSD case allows the USB drive to be handled in the same manner as SSD drives are typically handled and with at least the same level of security. In some cases, the USB drive 300 may be housed or integrated with an SSD case in order to maintain the ability to plug the USB connector into a wide variety of devices. It may not be viable to simply put a connector on the side of this SSD case, although this may be done in some cases. In one embodiment, a USB connector 302 is coupled to the USB drive 300, such as via a short cable having a connector extending from the case. In one example, this connector 302 may be configured to be removably engaged with the drive 300 such that it does not increase the overall dimensions of the case. For instance, the USB drive 300 may include a slot or other recess 304 configured to receive the connector 302 and associated cable therein (e.g., compare FIG. 31 to FIG. 33). In other cases, the USB connector 302 may be configured to move relative to the SSD case between a retracted position relative to the case and an extended position relative to the case to thereby allow connection to the computer system. In one embodiment, the USB electronic components are disposed inside the USB drive, not on the outside of the case or in the connector at the end of the cable.

Another possible issue with current techniques for use of USB drives is data security of USB drives while in the possession of a technician performing maintenance at the data center. A USB drive is very easily plugged into any computer system, and there are even small handheld devices that can copy the data of a USB drive easily. In an ideal implementation, the USB drive would be inaccessible by anyone other than the technician, and the technician would also be tracked as to when he/she was moving data to and from the drive.

Data security of the USB drives can be addressed in different ways. In one embodiment, the USB drive 300 may be mechanically disabled. This can be done by preventing the USB connector 302 from communicating to the USB components inside the SSD case. This may be accomplished by a cutting device on a slider that the technician could use once the job is complete. The slider could cut anywhere along the electric path from the USB connector the PCB inside the case. The cutter could also cut through a pathway on the PCB to break the connection. Finally, the slider may be configured to move into contact with a location on the circuit board to create a short and thereby render the USB drive useless. The slider may have a one-way latch or mechanism that once moved into position, it could not be physically moved back to its initial position.

In other embodiments, techniques may be used destroy the USB drive's 300 circuit with electricity. For instance, a fuse could be used on one of the circuit lines on the PCB of the USB drive that will blow when a high voltage is applied to it. Alternately, voltage that is above specification could be applied directly to the pins of a microchip, causing it to burn up. There are several ways this power could be applied. The USB connector 302 could be configured to connect to a special device that delivers high current through the connector. Alternately, power could be delivered wirelessly from a device (e.g., through a pick-up coil). In order to not have accidental destruction, a two-factor intent would be beneficial. For example, pushing a button on the USB drive 300 or other actuator while presenting the voltage injection could be used for such a purpose.

In another embodiment of the invention, the USB drive 300 is incapable of being used by the technician until the USB drive is successfully activated or otherwise authenticated. In one example, a security key may be used to activate a USB drive. A mechanical key could be used in some cases, but an electronic key may have additional benefits. The electronic key may take many different forms such as those discussed above, as well as an RFID badge, an NFC reader, a device with IR transceivers, etc. In one example, an NFC reader is configured to communicate an activation signal. This activation signal could be writing a bit to the NFC tag, or a wireless or wireless signal delivered directly to the USB components within the USB drive. In this example, each USB drive may have an NFC tag with a unique serial number or other identifier.

Figure 32:
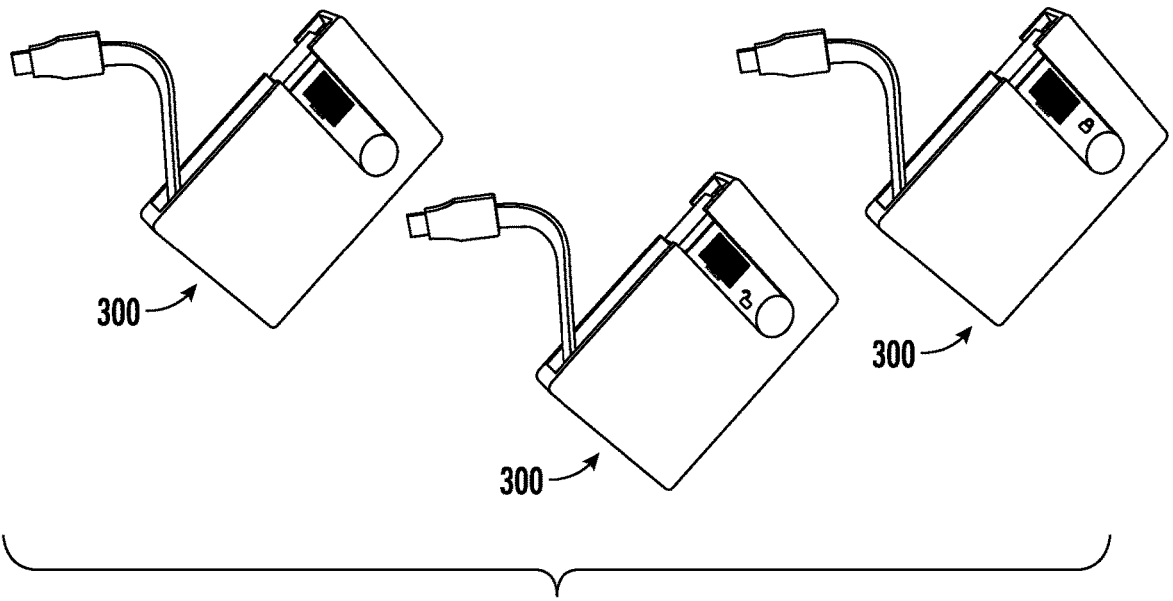
FIG. 32 are perspective views of the USB drive shown in FIG. 31 in different states.
Figure 33:
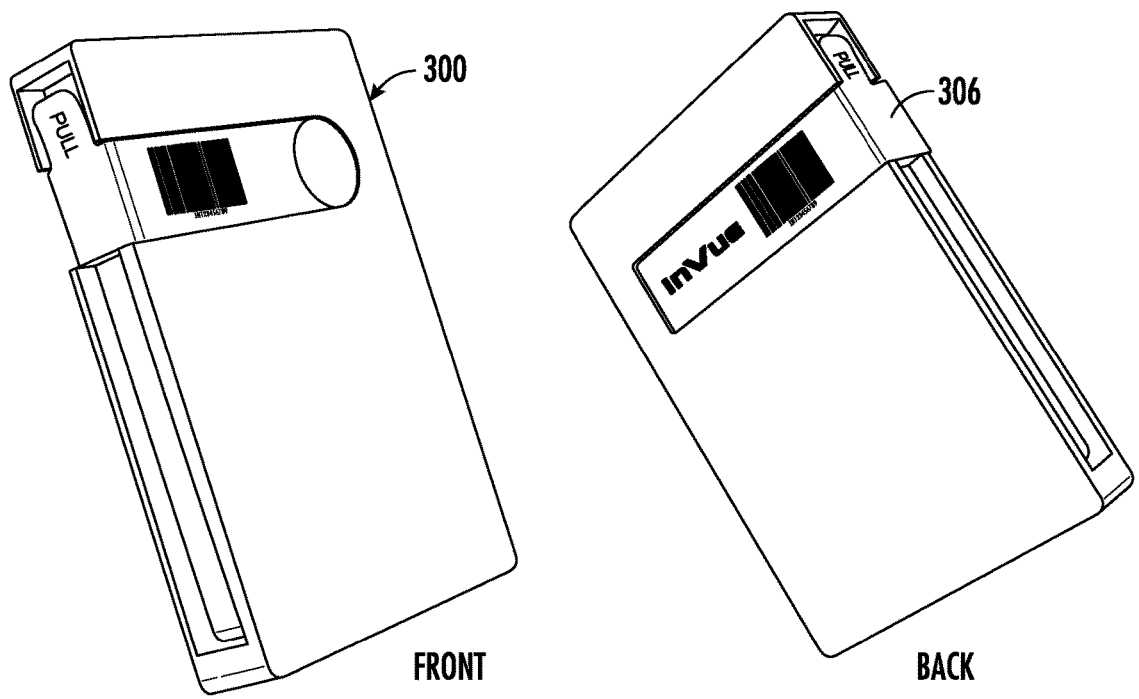
FIG. 33 are perspective views of the USB drive shown in FIG. 31 prior to removal of the USB connector according to one embodiment.
Figure 34:
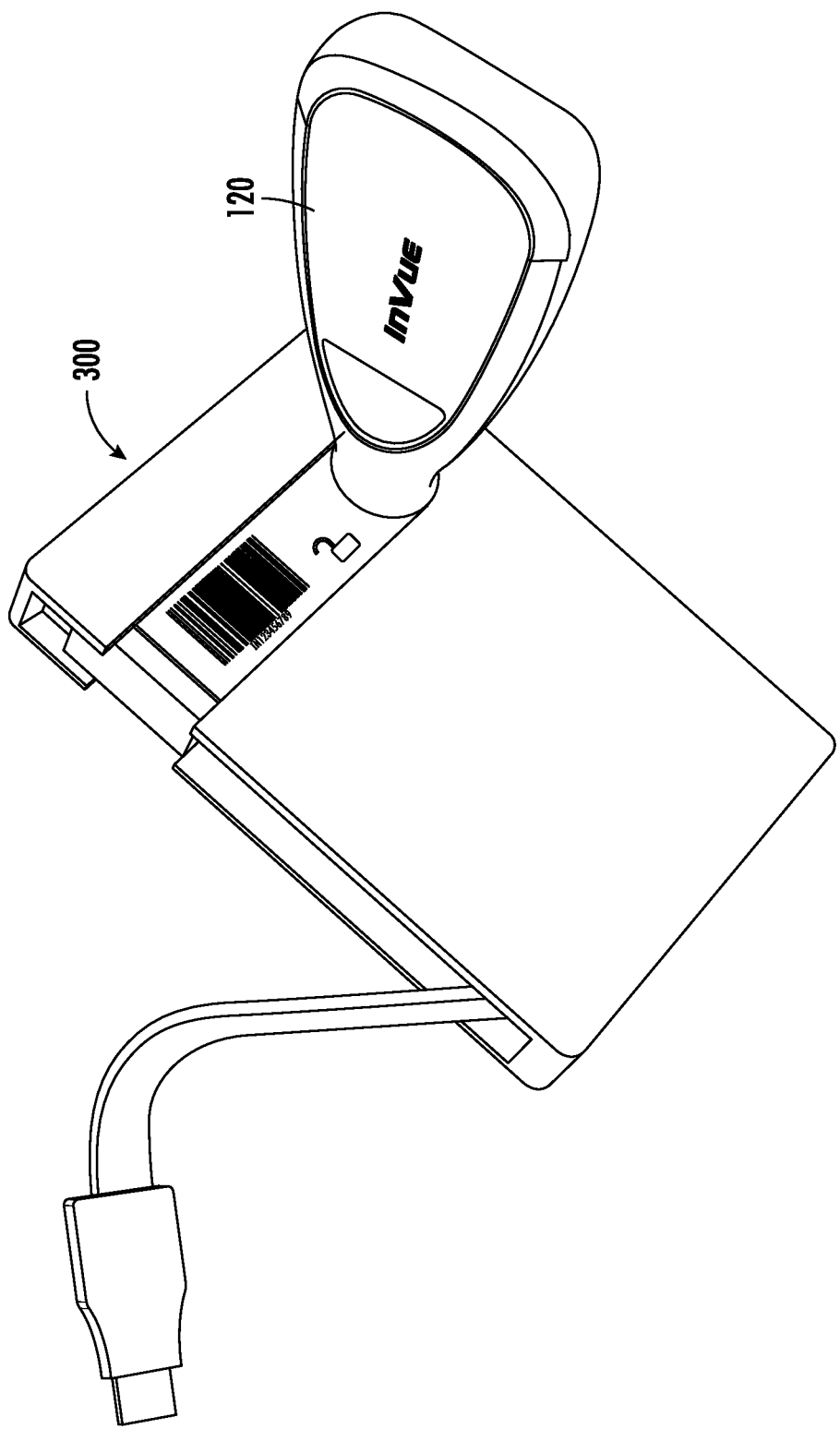
FIG. 34 is a perspective view of the USB drive shown in FIG. 31 in communication with an electronic key according to one embodiment.
Figure 35:
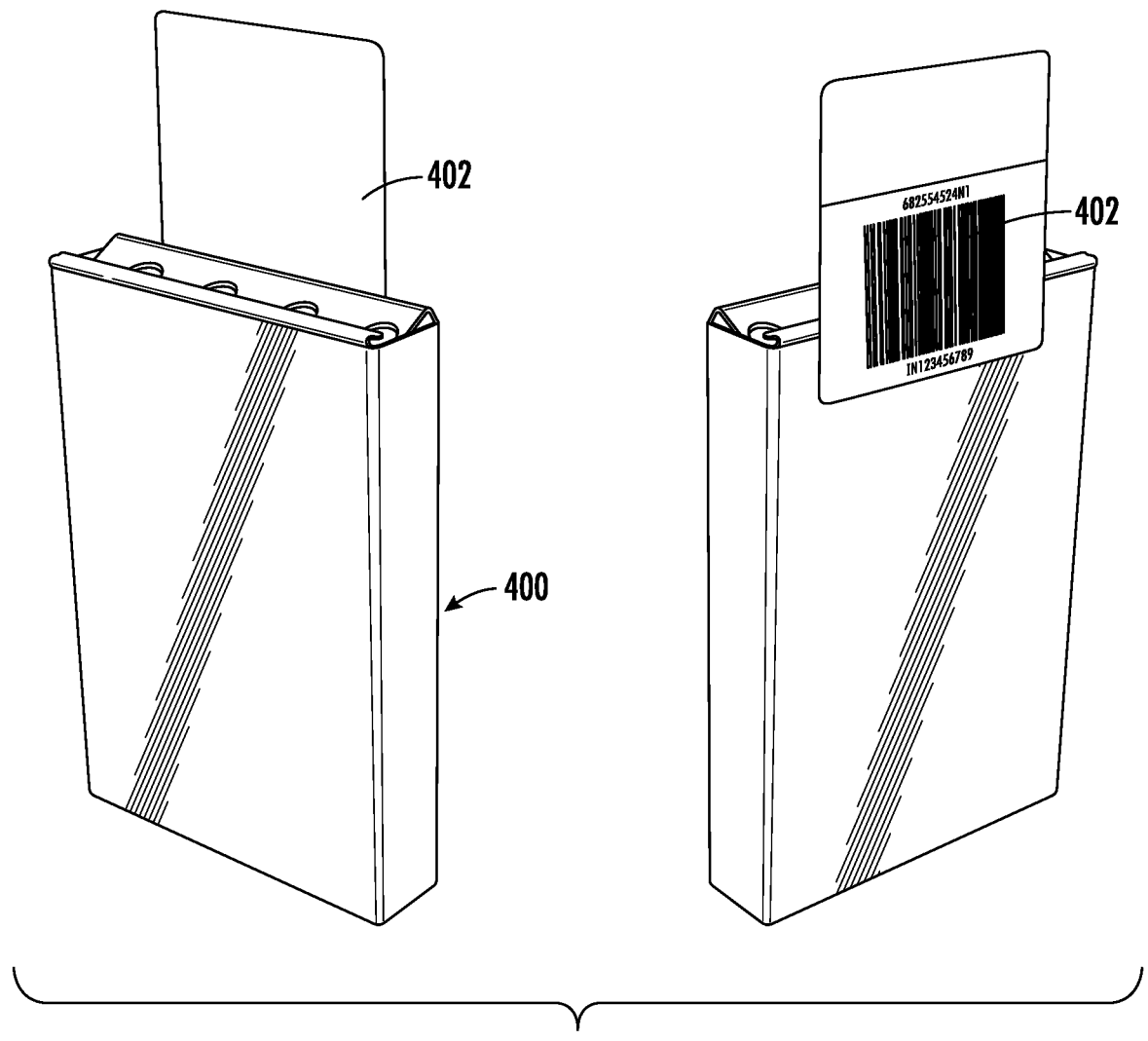
FIG. 35 show perspective views of a lockable enclosure according to another embodiment.
Figure 36:
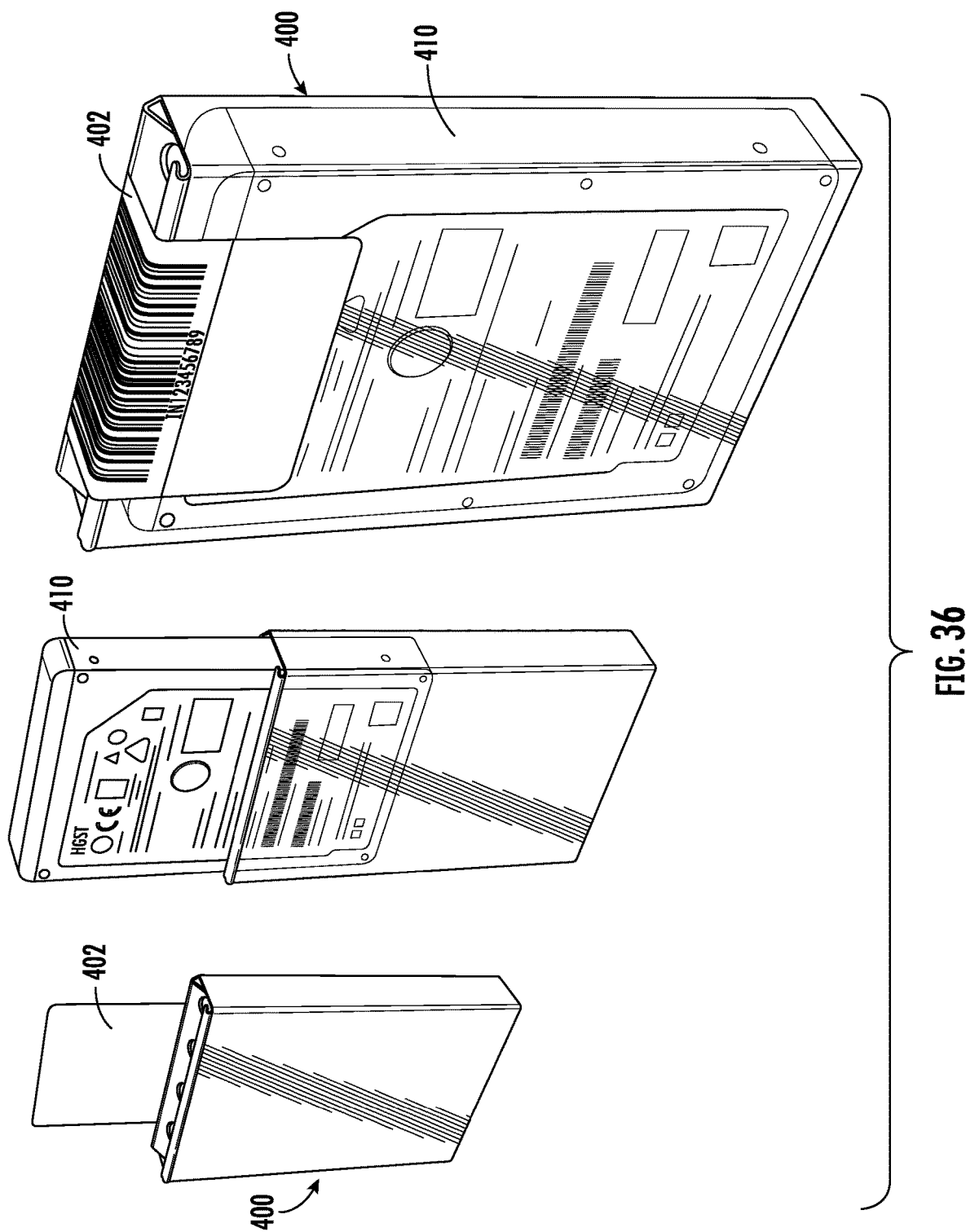
FIG. 36 are perspective views of the lockable enclosure shown in FIG. 35 showing the sequence of securing the media in the lockable enclosure according to one embodiment.

As noted above, the key may be electronic key 20, 120. The electronic key 20, 120 may be authenticated for the particular user using various authentication techniques, which would grant the user permissions to use the USB drives 300. In operation according to one embodiment, the USB drive defaults to a disabled mode. Once the USB drive 300 is plugged into a port of the server component and receives power, the electronic key 20, 120 may be used to authenticate the user and then enable the drive, such as via a socket on the USB drive housing. The USB drive 300 may then latch "ON" so long as it remains powered. FIG. 32 shows various modes of operation where the USB drive is disabled, then authenticated for use, and then subsequently disabled. Alternatively, the key 20, 120 may be presented to the USB drive 300 prior to connection with the port of the server component in order to enable the USB drive. When the USB drive 300 is unplugged from the USB port, it may be configured to automatically return to a disabled mode. Thus, the technician would be required to authenticate the USB drive 300 at every computer component the drive is connected into. In addition to authentication, the electronic key 20, 120 may be configured to read the NFC tag (or another identifier 308 such as a UPC code) from the drive and then deliver that information along with the identity of the key owner to a remote device 250. In this way, the use of the drive 300 can be tracked and audited at every usage. In some cases, the USB drive 300 may include a seal 306 or the like that is configured to be removed prior to use and accessing the connector 302 (see, e.g., FIG. 33) so that the technician knows that the USB drive is unused. Because the computer systems within the data center are also connected, the USB connection can be confirmed on both sides of the transaction (i.e., by the electronic key 20, 120 and also by the server component the drive 300 was plugged into). Thus, any nefarious behavior can quickly be discovered. If, for example, an electronic key 20, 120 reported that a drive 300 was authenticated and in use, but the component did not report being connected to the drive, the implication is that the drive was plugged into an unauthorized device and thus the data may have been compromised. Various forms of authentication between the USB drive 300 and the electronic key 20, 120 may be used, such as any of the techniques (or combinations thereof) disclosed above. For instance, the electronic key 20, 120 may be configured to provide power to the USB drive which allows the USB drive to communicate with the component of the server rack. Moreover, the USB drive 300 may include a transfer port 42, 142 similar to that described above to facilitate communication with an electronic key 20, 120.

As noted above, various components within a data center may be destroyed to prevent authorized access to such components and data stored thereon. For instance, conventional destruction may occur by physically destroying the components (e.g., shredding) However, there is no definitive way to confirm that the components have indeed been destroyed and what happened prior to destruction since it is a technician who is tasked with destroying the components without any accurate chain of custody. In the embodiments discussed where a key is required to enable a USB drive for use, destruction may not be required since the USB drive is unusable without a key. In other embodiments, chain of custody may be improved by employing lockable enclosures 400 or secure sleeves that may include an identifier 402 (e.g., QR code) (see, e.g., FIGS. 20-30). For example, the lockable enclosures may have a one-way latch 404 that prevents the enclosures from being unlocked after the latch is moved to a latched position. It is understood that the one-way latch may take many forms, such as that shown in FIGS. 35-38, or alternatively any number of engagement members (e.g., one-way snaps, detents, or the like) that prevent media 410 from being removed once received by the lockable enclosure 400. For example, the one-way latch may include one or more engagement members 408 configured to engage with one another when the latch is closed, such as by rotating relative to one another from an open position to a closed, engaged position. In other examples, the lockable enclosure 400 may be configured to receive the media 410 in such a way that the media cannot be removed without damaging or destroying the lockable enclosure and/or media.

Figure 37:
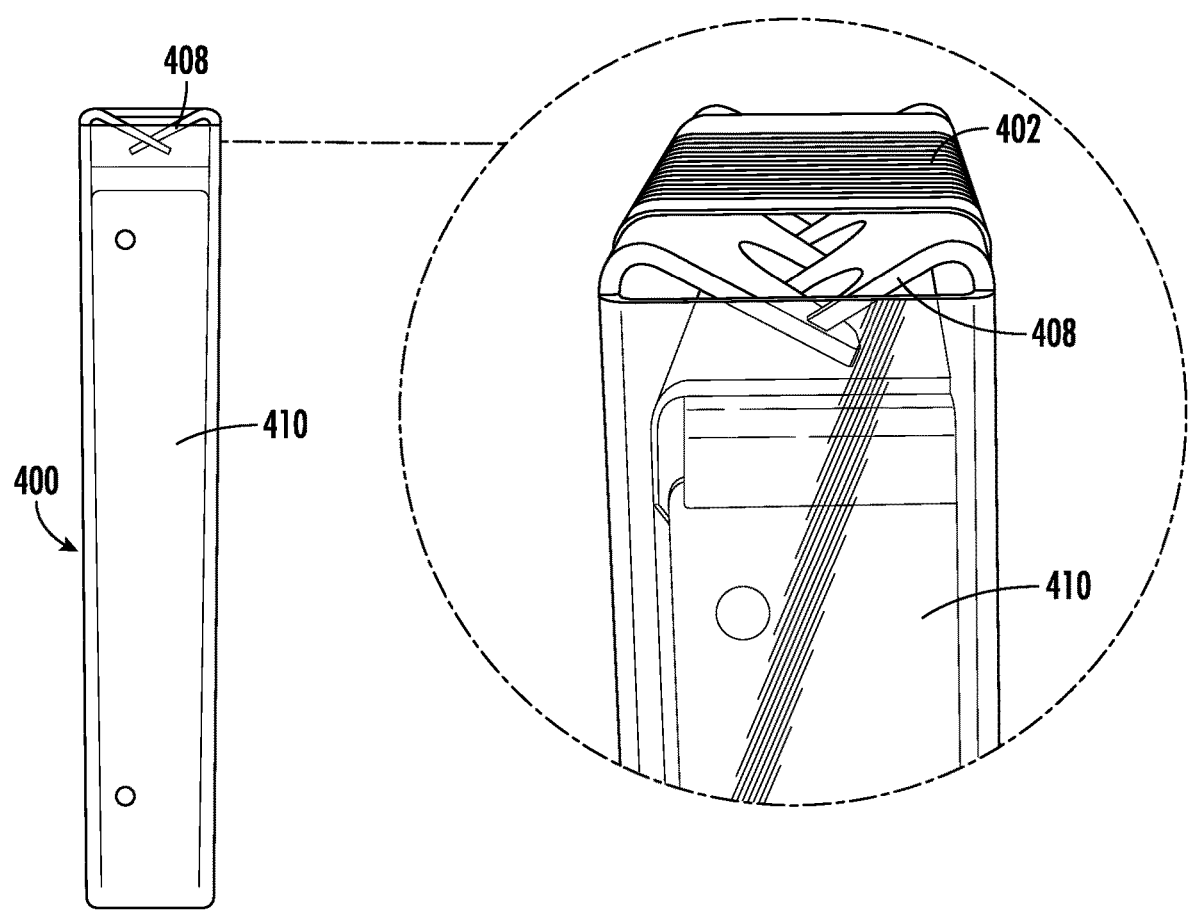
FIG. 37 are side views of the lockable enclosure shown in FIG. 35.
Figure 38:
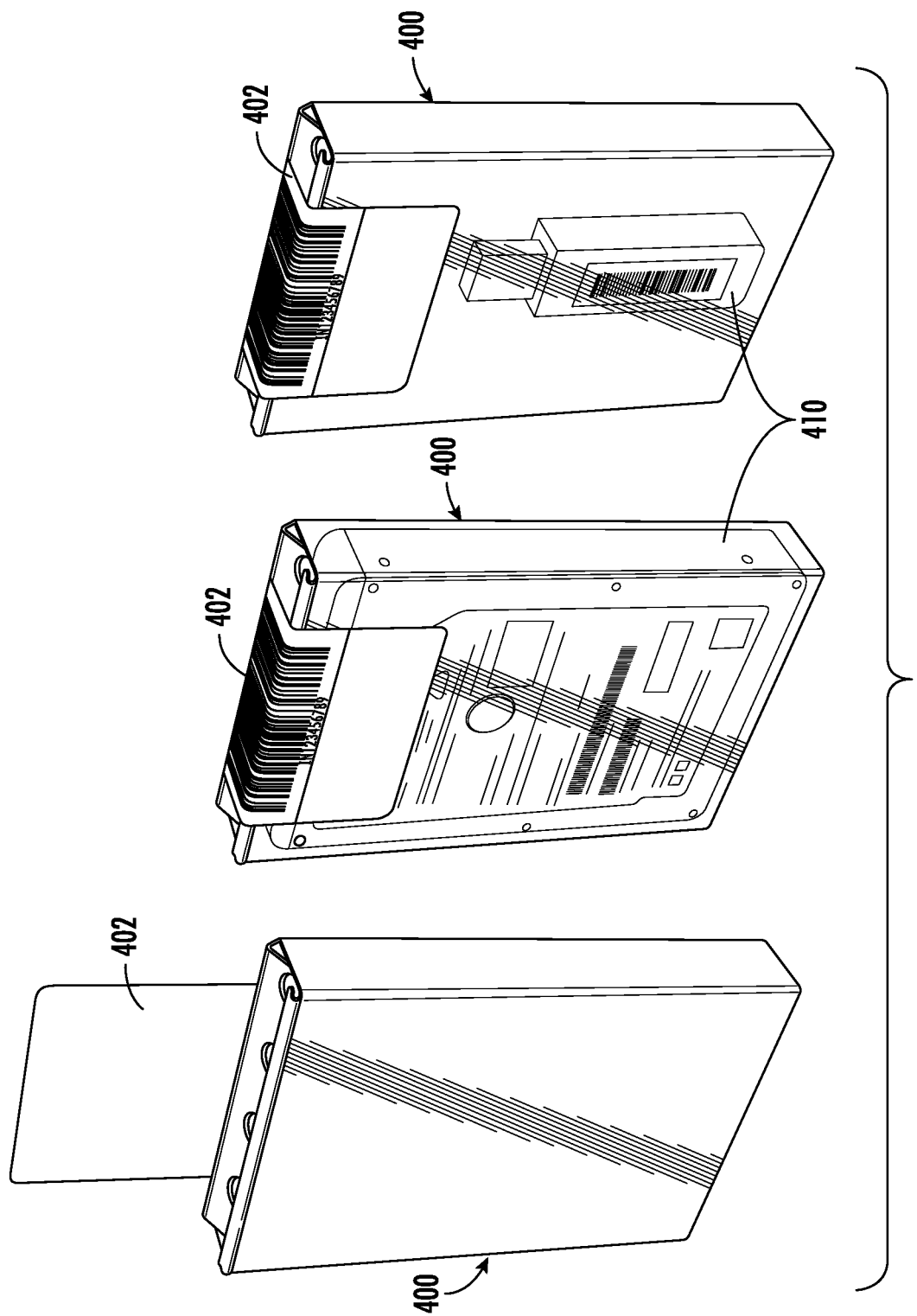
FIG. 38 are perspective views of the lockable enclosure shown in FIG. 35 showing the sequence of securing the media in the lockable enclosure according to one embodiment.

Moreover, the identifier may also take many forms, such as a label with a QR or UPC code, which may be placed over the one-way latch (see, e.g., FIG. 37). Thus, identifier may be located in such a way that attempting to open the one-way latch may damage the identifier. The identifier may only be accessible when the lockable enclosure is successfully latched in some embodiments (e.g., compare FIG. 26 to FIG. 27). In other cases, a key 20, 120 may be used to lock the enclosure. The identifier of both the lockable enclosure and the media 410 (e.g., SSD or USB drive) may then be required to be scanned or photographed together before the lockable enclosure is confirmed as being secure and ready to be destroyed. If the media is moved to a different lockable enclosure, scanning the enclosure's identifier and the media's identifier may reveal that a possible tamper has taken place. In one embodiment, the lockable enclosures may be required to be inserted within a secure bin 406 (see, e.g., FIG. 20). This secure bin may include access control as well, such as to log when a particular lockable enclosure is inserted therein. In some instances, the lockable enclosures are single use and may be destroyed along with the media. In other cases, the lockable enclosures may be "smart" and reusable, such as where the enclosures are configured to communicate with an electronic key. In this example, the lockable enclosure may be configured to be unlocked to remove the media at the time of destroying the media. In some cases, a scanner station may be used to unlock the lockable enclosure, remove the media, and destroy the media.

Figure 39:
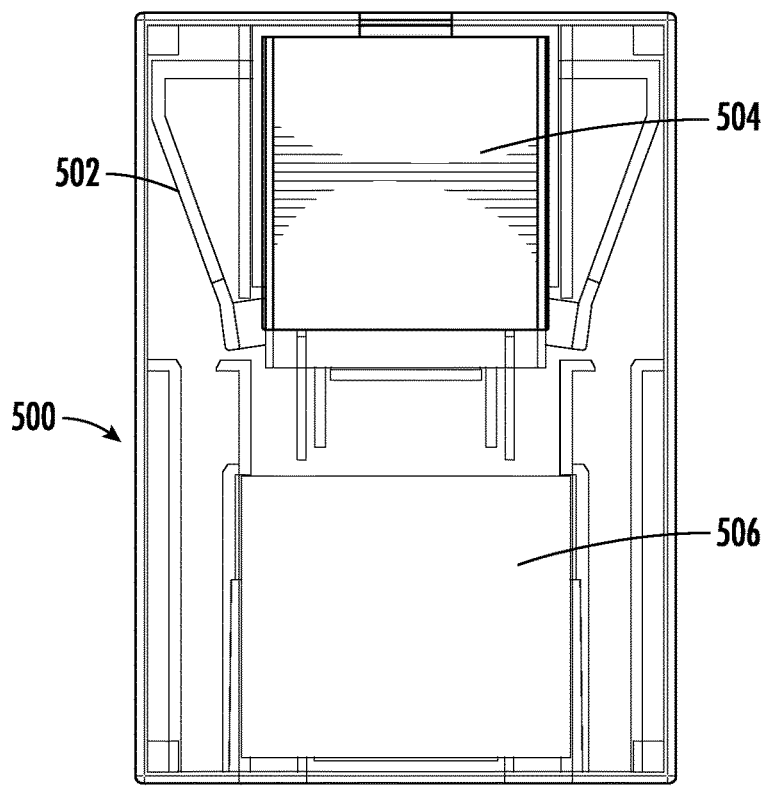
FIG. 39 is an elevation view of a lockable enclosure according to one embodiment.
Figure 41:
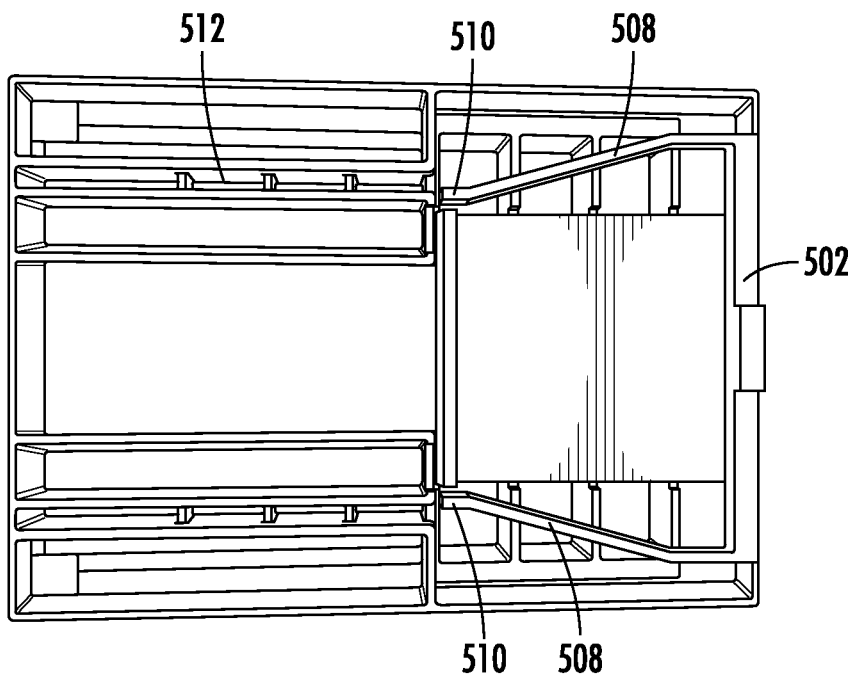
FIG. 41 is an elevation view of a lockable enclosure with a latch in a first position according to one embodiment.
Figure 42:
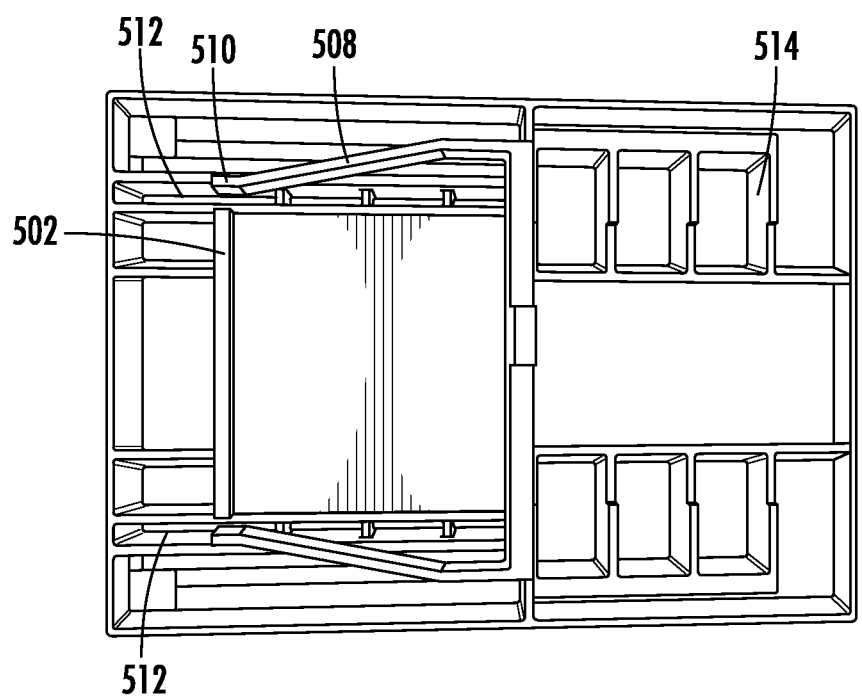
FIG. 42 is an elevation view of the lockable enclosure shown in FIG. 41 with the latch in a second position.

FIG. 39 illustrates another embodiment of a lockable enclosure 500, sometimes referred to as a secure sleeve or case. In general, the lockable enclosure 500 is configured to retain a new data or media drive prior to the old data drive being discarded with the lockable enclosure. For example, the old data drive 504 may be a drive removed from a server rack that is to be replaced with a new data drive 506. The lockable enclosure 500 may be configured to operate in a one-in-one-out fashion such that a new data drive cannot be accessed until the old data drive is secured within the enclosure. Thus, in some embodiments, the new data drive cannot be dispensed until the old data drive is secure. This one-in-one-out configuration may also allow the technician to easily determine which data drive is old and which is new. FIG. 39 illustrates that the lockable enclosure 500 includes a housing that contains a latch 502 configured to slide or otherwise move within the housing. The lockable enclosure 500 may house the latch 502 therein such that the latch is unable to be removed. The lockable enclosure 500 may be formed of a clear polymeric material (e.g., polycarbonate) and may be formed of one or more components, such as an upper housing and a lower housing that are attached to one another, such as in a permanent manner (e.g., via ultrasonic welding). Comparing FIGS. 41 and 42 (a portion of the housing has been removed for illustration), it is shown that the latch 502 may be configured to slide between a first position for receiving a data drive and a second position within the lockable enclosure 500 for dispensing a data drive.

Figure 43:
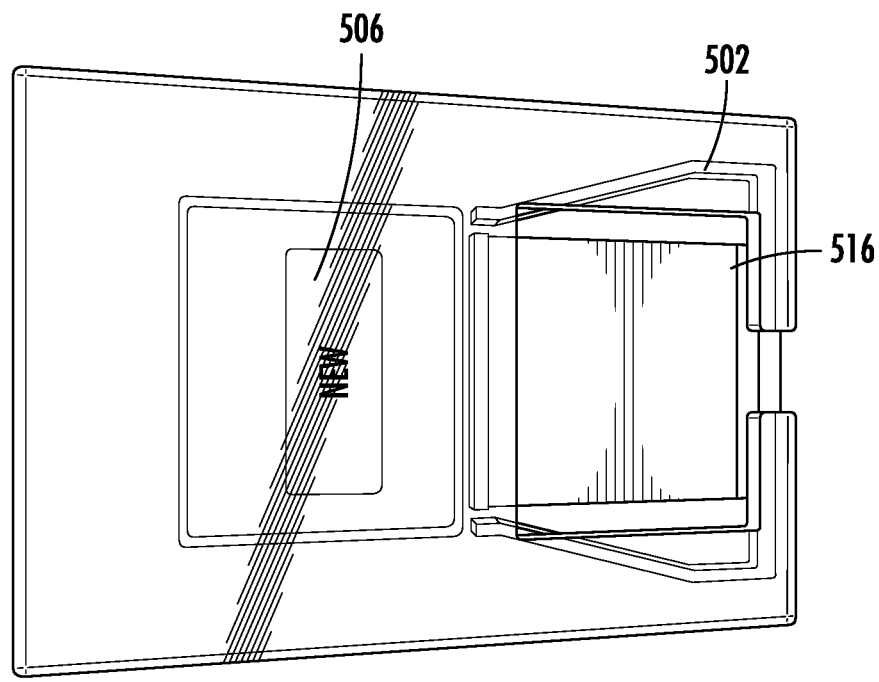
FIG. 43 is an elevation view of the lockable enclosure shown in FIG. 41 with the latch in a first position and housing a new media drive.
Figure 44:
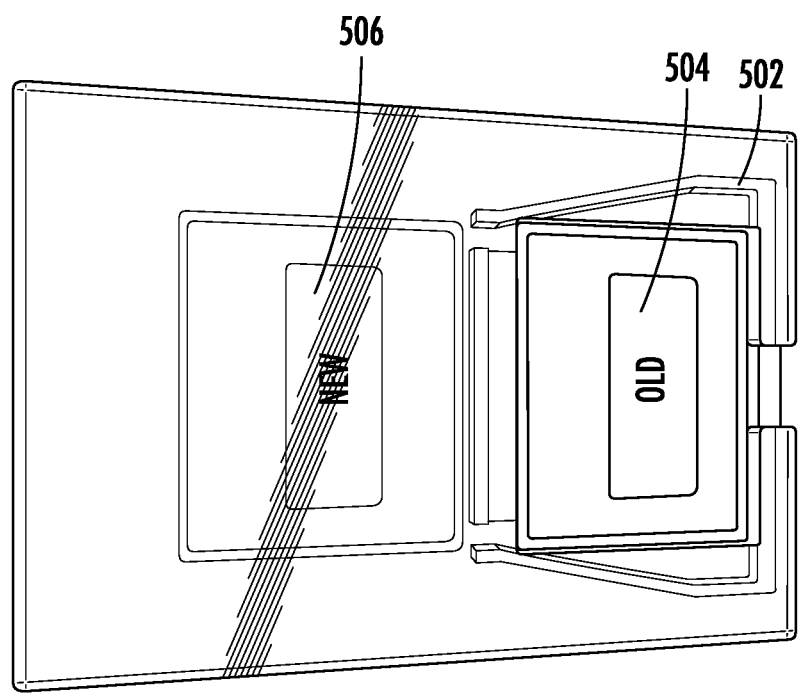
FIG. 44 is an elevation view of the lockable enclosure shown in FIG. 41 with the latch in a first position and after receiving an old media drive.

In one embodiment, the latch 502 may be configured to receive an old data drive 504 therein (see FIG. 44), and the lockable enclosure 500 may be configured to house a new data drive 506 therein (see FIG. 43). Thus, the lockable enclosure 500 may include a new data drive 506 that is already present, which may for example be provided during manufacturing and assembly of the lockable enclosure. The latch 502 may include one or more flexible members 508 (e.g., a pair) configured to be biased when the old data drive 504 is inserted therein. The flexible members 508 may include tines or like engagement members 510 at a free end thereof that are configured to align with and engage one or more corresponding slots or channels 512 defined in the lockable enclosure 500. In this way, the engagement members 510 are configured to slide within the slots 512. In some cases, the engagement members 510 may be incapable of engaging the slots 512 until a data drive has been inserted within the latch 502. Thus, the latch 502 may be incapable of sliding within the lockable enclosure 500 until a data drive is inserted. For example, insertion of a data drive within the latch 502 may cause the flexible members 508 to bias outwardly to align the engagement members 510 with the slots 512 when a data drive with the appropriate width is inserted therein. In certain aspects, the latch 502 may be capable of sliding in only one direction and cannot be slid in an opposite direction. The lockable enclosure 500 may include one or more ribs 514 that are configured to block the latch 502 from sliding in an opposite direction. As such, embodiments of the present invention may provide features that make defeating the lockable enclosure 500 difficult, such as attempted picking of the lockable enclosure. In this example, two tools would be needed to engage the flexible members 508 so as to align them with the slots 5120 to defeat the lockable enclosure 500 which may be difficult to accomplish.

Figure 45:
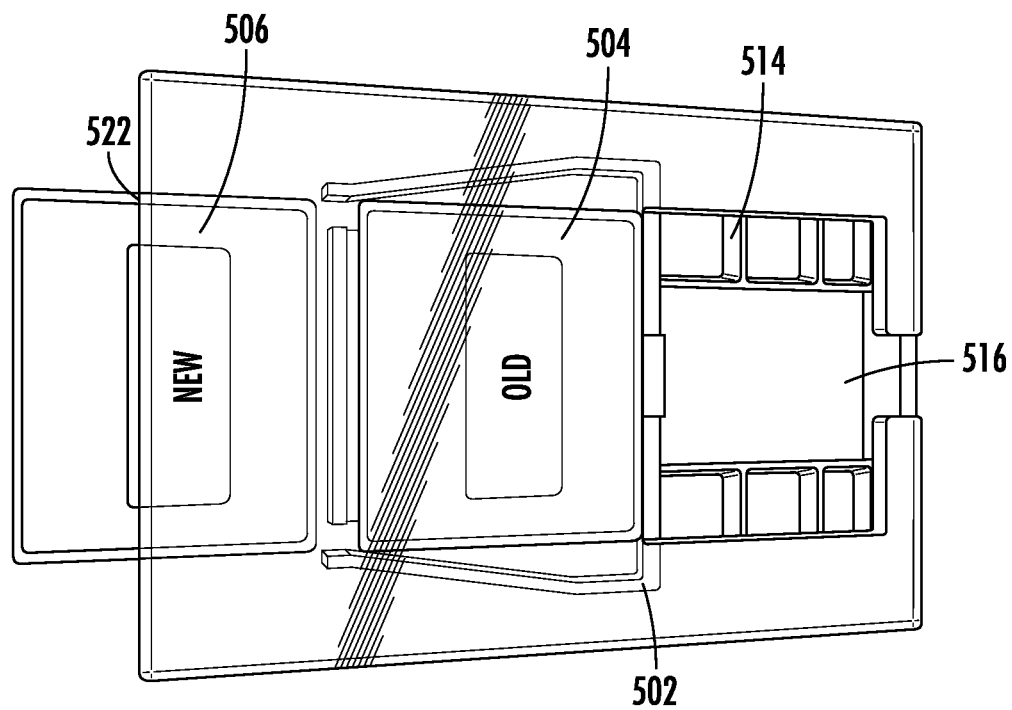
FIG. 45 is an elevation view of the lockable enclosure shown in FIG. 41 with the latch in a second position for dispensing the old media drive.
Figure 46:
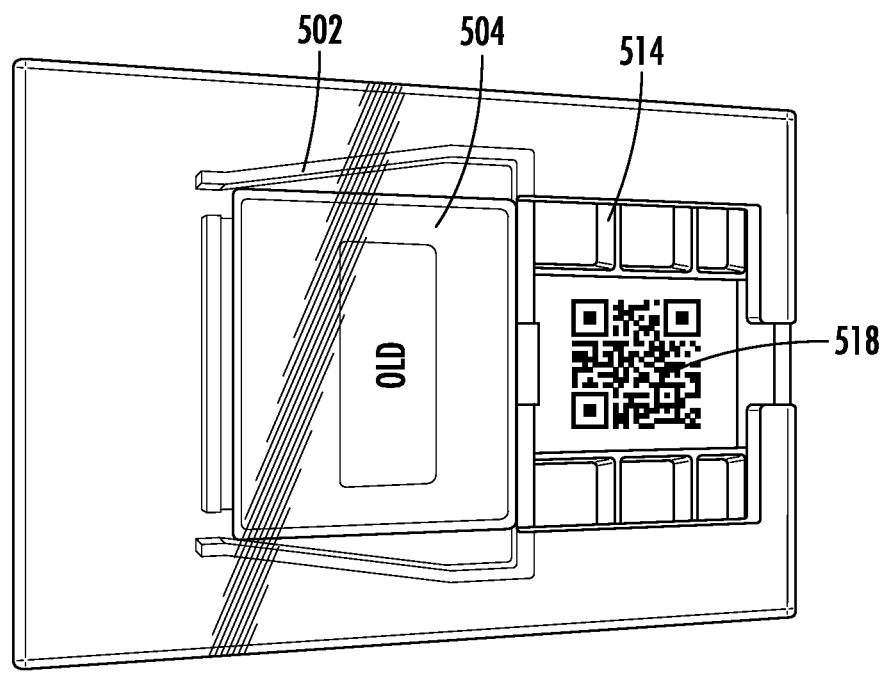
FIG. 46 is an elevation view of the lockable enclosure shown in FIG. 41 with the latch in the second position and housing the old media drive.

FIG. 43 shows an example of a new data drive 506 positioned within the lockable enclosure 500. The lockable enclosure 500 may define an opening 516 configured to receive an old data drive 504 therein. When the old data drive 504 is inserted, a user is able to push the latch 502 in a direction towards the new data drive 506. As the latch 502 progresses within the lockable enclosure 500, the new data drive 506 is pushed out of an opening defined in the lockable enclosure (see. FIG. 45). As noted above, the latch 502 cannot be reversed and moved in an opposite direction. Moreover, the latch 502 may be configured to surround the data drive 504 such that any electrical contacts or pins on the data drive are incapable of being accessed once the data drive is inserted therein. In this way, the contacts of the data drive 504 cannot be accessed by an unauthorized person. Once the new data drive 506 has been removed (see FIG. 46), the old data drive 504 is retained within the lockable enclosure 500 and cannot be removed without damaging the enclosure. In some cases, the lockable enclosure 500 and old data drive 504 retained therein may be destroyed as discussed above. The old data drive 504 may be held in place within the lockable enclosure 500 by any number of means, such as for example, a friction fit, crush ribs, breakable tines or any other means that prevents the data drive from being removed. In some instances, the old data drive 504 may be recessed into the lockable enclosure 500, and the lockable enclosure may have a tight fit around the data drive such that it is difficult to access or remove the data drive using tools or fingers or by impact to the outside of the enclosure. In some embodiments, sliding the latch 502 from the first position to the second position may reveal a UPC, QR, barcode, serial number, or like identifier 518 for identifying the lockable enclosure 500 (see FIG. 46) and in some cases correlating the lockable enclosure with the old data drive 506 for chain of custody, as described above.

Figure 40:
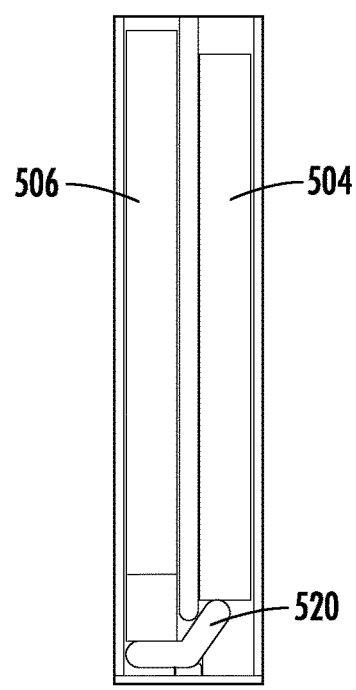
FIG. 40 is a side view of a lockable enclosure according to one embodiment.

Although embodiments of the present invention describe a latch 502 that is configured to slide within the lockable enclosure 500, it is understood that different configurations may be employed utilizing a one-in-one-out feature. For example, FIG. 40 shows an embodiment of a lockable enclosure 500 that employs a cam 520 configured to rotate. Thus, in some cases, the latch may be a cam or other rotatable mechanism. In this design, the cam 520 may be configured to rotate by the act of inserting the old data drive 504, and the rotation would cause the new data drive 506 to be dispensed. Similar to the embodiments disclosed above, a latch with engagement members may be configured to prevent the cam from rotating unless a data drive with the correct width is inserted into the lockable enclosure. Moreover, it is understood that any number of types and sizes of data drives may be used in different embodiments. For instance, rather than an old data drive and a new data drive being positioned end-to-end to one another, the drives could be configured to placed such that one data drive overlies the other data drive or that the drives are configured to slide relative to one another in an overlying manner.

Figure 47:
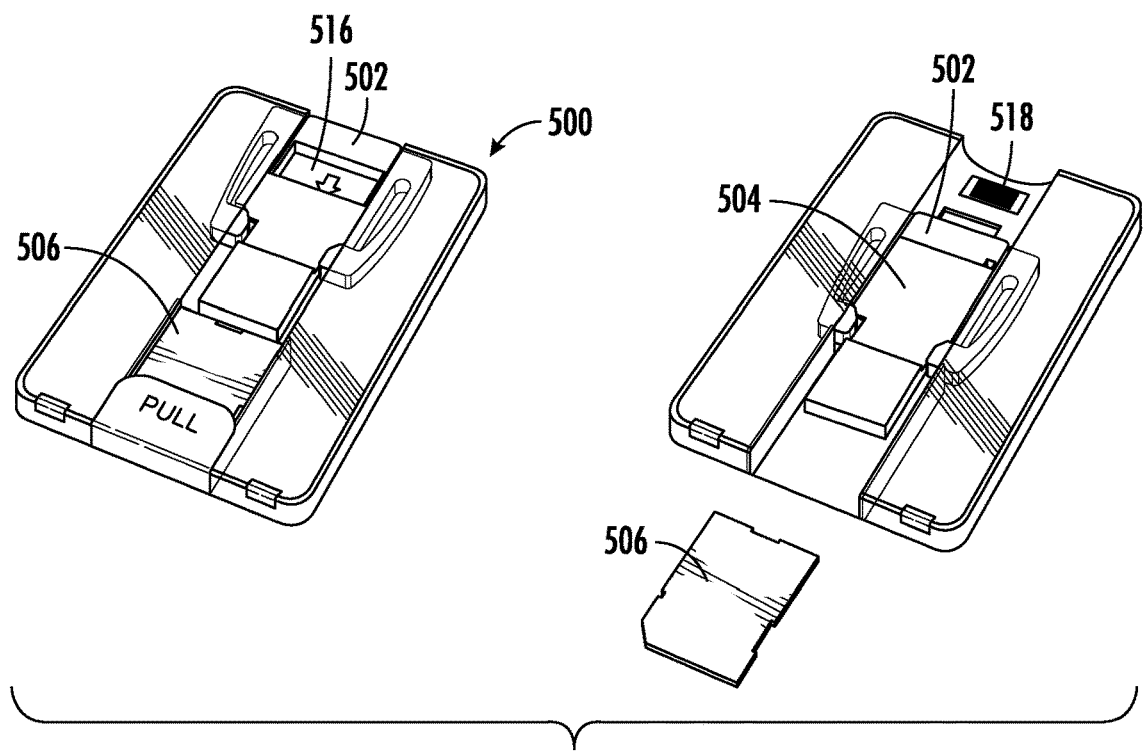
FIG. 47 are perspective views of a lockable enclosure in a first position and a second position for dispensing a new media drive according to one embodiment.
Figure 48:
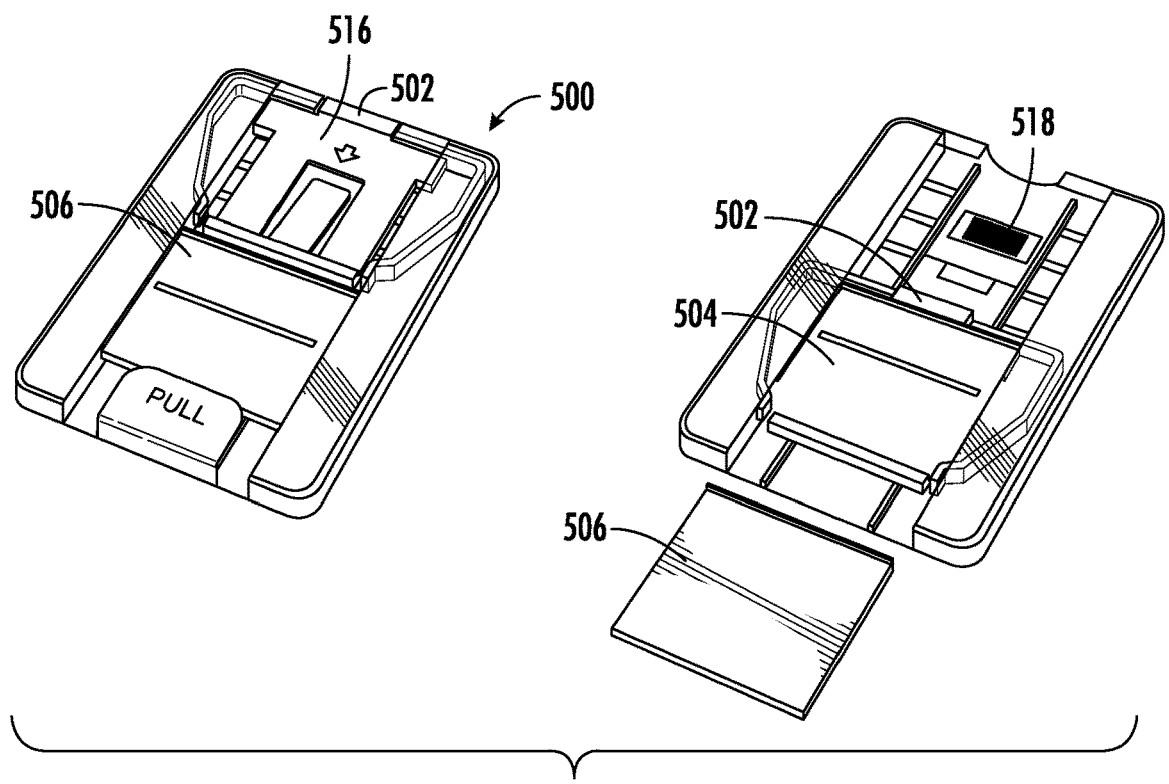
FIG. 48 are perspective views of a lockable enclosure in a first position and a second position for dispensing a new media drive according to one embodiment.
Figure 49:
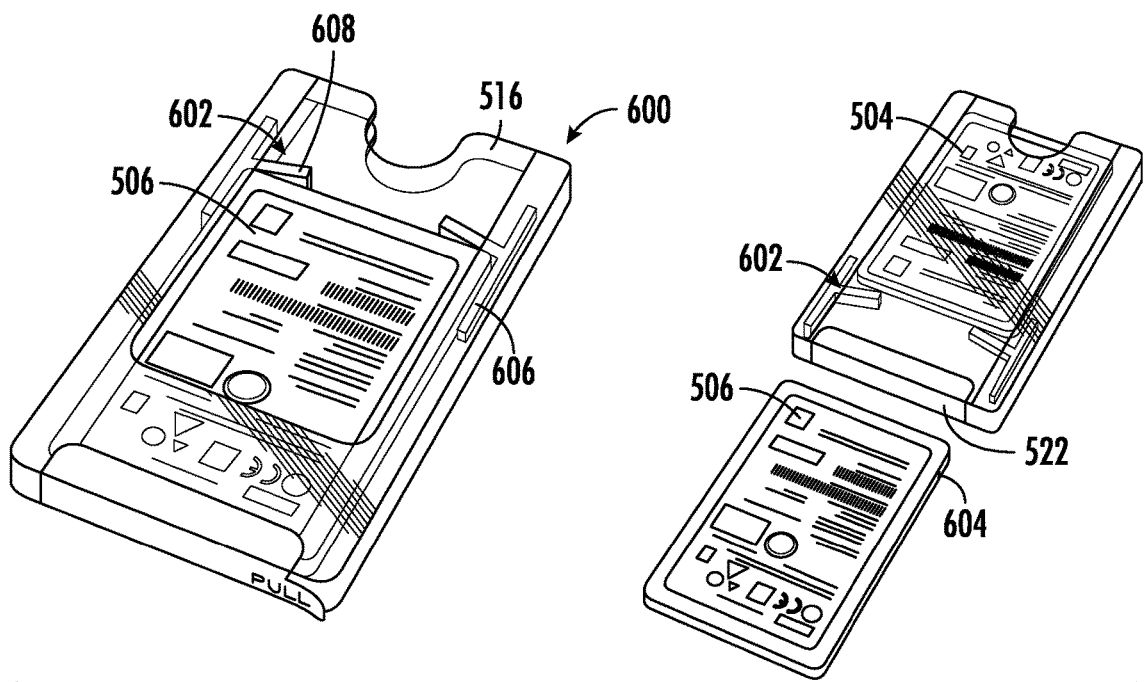
FIG. 49 are perspective views of a lockable enclosure in a first position and a second position for dispensing a new media drive according to one embodiment.
Figure 50:
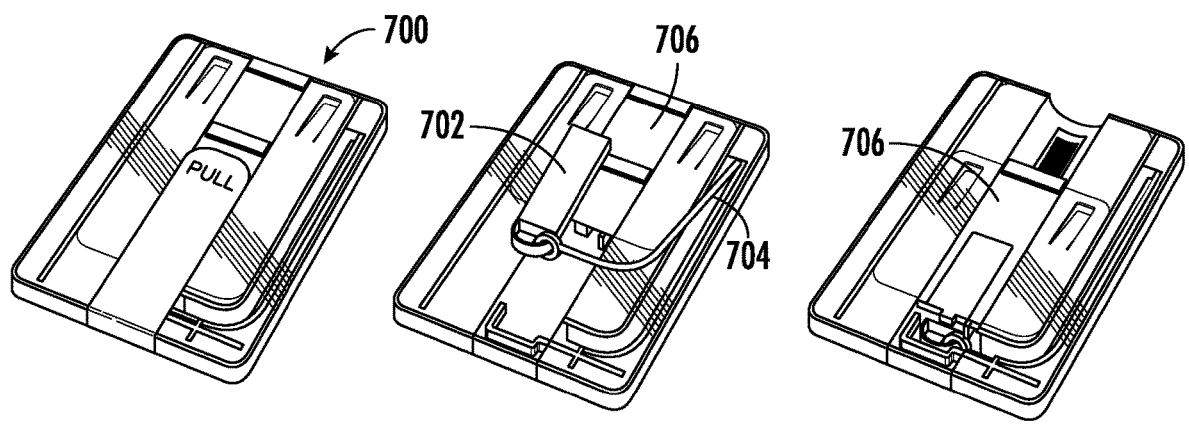
FIG. 50 are perspective views of a lockable enclosure in a first position and a second position for securing a data drive according to one embodiment.

FIGS. 47-50 illustrate additional embodiments of the present invention. In this regard, FIG. 47 shows an embodiment of a lockable enclosure suitable for a compact flash drive, FIG. 48 shows an embodiment of a lockable enclosure suitable for an SD card, FIG. 49 shows an embodiment of a lockable enclosure suitable for a SSD drive, and FIG. 50 shows an embodiment of a lockable enclosure suitable for an USB drive. FIGS. 47-48 include features similar to the lockable enclosure 500 described above with respect to the embodiments of FIGS. 41-46.

FIG. 49 illustrates an alternative embodiment for a lockable enclosure 600. In this embodiment, the lockable enclosure 600 may also operate similar to that described above (i.e., one-in-one out) but is configured for use with larger data drives without necessarily increasing the size of the lockable enclosure. The latch 602 may be configured to engage one or more engagement members 604 on the data drive 506 itself (e.g., holes defined on opposite sides of an SSD drive). Thus, the latch 602 may include engagement members 606 that are configured to engage the engagement members 604 of the data drive 506. As before, when an old data drive 504 is inserted within the housing, the latch 602 is configured to move within the housing to dispense the new data drive 506. In some cases, the latch 602 includes a pair of movable members 608 that are configured to move when an old data drive 504 is inserted within the housing. The movable members 608 may be spring biased towards an engaged position with the data drive 506 in some instances. The engagement members 606 may be operably engaged with the movable members 608 such that as the old data drive 504 is inserted within the housing, the movable members move to disengage the engagement members 604, 606 from one another. In one embodiment, the new data drive 506 may be configured to be partially displaced from the housing while the engagement members 604, 606 are still engaged with one another. Thus, even though the new data drive 506 may be partially positioned outside the housing, the user is incapable of removing the new data drive until the old data drive 504 is fully positioned within the housing due to engagement between the latch 602 and the housing. In some embodiments, the latch 602 may be configured to engage the engagement members 604 of the data drive 504 when the data drive is inserted within the housing so that the old data drive is incapable of being backed out or otherwise removed from the housing. In some cases, the movable members 608 may be configured to pivot between engaged and disengaged positions with the new data drive 506, such as via sliding of the latch 602 relative to the housing as the old data drive 506 is inserted within the housing. In other embodiments, the movable members 608 may be flexible and configured to flex between engaged and disengaged positions.

Moreover, FIG. 50 shows an embodiment of a lockable enclosure 700. In this embodiment, the data drive 702 may be configured to be housed within the housing in a first position in which the data drive is able to be removed. Thus, a user is able to freely remove the data drive 702 for use. In addition, the data drive 702 may be tethered to the housing, such as via a cable 704, wire, or the like. For example, a cable 704 may be attached to the data drive 702 at one end and attached to the housing at an opposite end. When the data drive 702 is ready to be discarded, the data drive 702 is configured to be reinserted within the housing in a second position. The second position may be a different position than the first position, e.g., the data drive may sit lower within the housing in the second position compared to the first position. In the second position, a latch 706 is configured to be moved to secure the data drive 702 within the housing. In some cases, the latch 706 is incapable of being moved relative to the housing when the data drive 702 is in the first position. Thus, in the second position, the data drive 702 may be incapable of being removed from the housing without damaging the lockable enclosure 700 or the data drive.

Figure 51A:
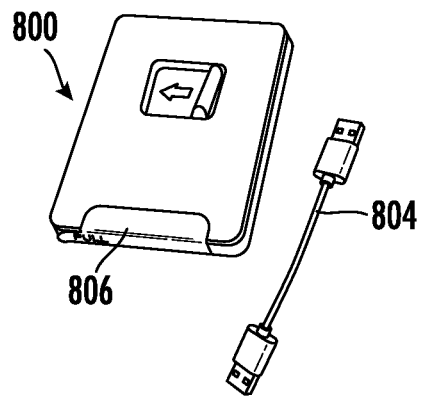
FIGS. 51A-C are perspective views of a lockable enclosure according to another embodiment of the invention.
Figure 51B:
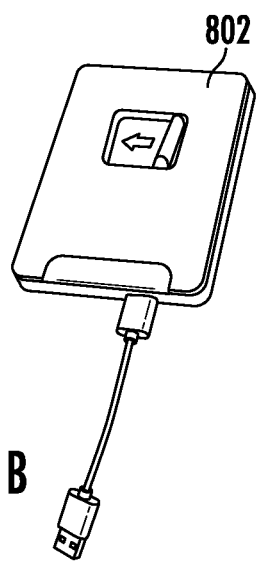
Figure 51C:
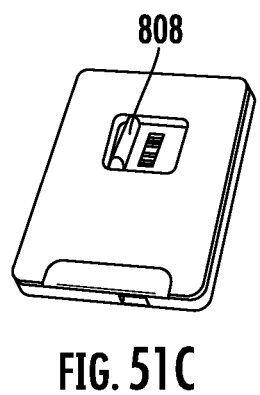
Figure 52:
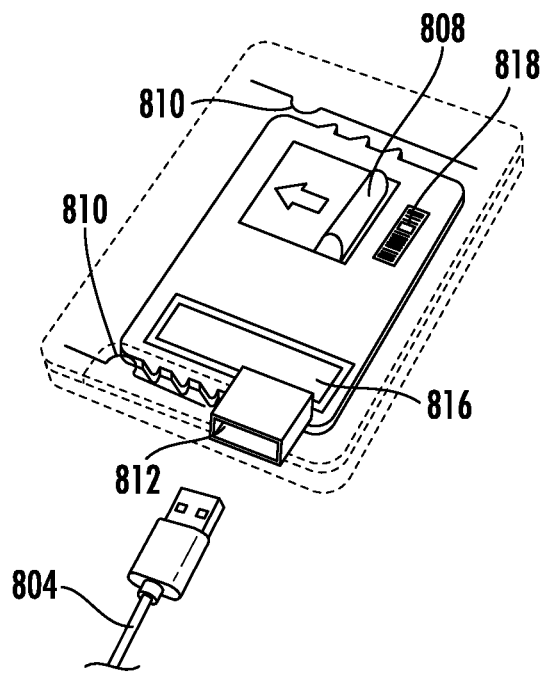
FIG. 52 is another perspective view of the lockable enclosure shown in FIGS. 51A-C showing the internal components of the lockable enclosure.

FIGS. 51-52 show another embodiment of a lockable enclosure 800. In this particular embodiment, the lockable enclosure 800 may be configured to house a data drive 802 or function itself as a data drive. For instance, the lockable enclosure 800 may be in the form factor of a data drive (e.g., an SSD drive) and include circuitry 816 for such functionality (e.g., PCB, memory, etc.). This may be advantageous for data centers wishing to process different data drives in the same manner. In this way, the lockable enclosure 800 may have the form factor of a first type of data drive (e.g., an SSD drive), but allow access to another type of data drive (e.g., a USB-drive). This may be accomplished by including a port or jack 812 for connection to an external data device (e.g., a cable 804) that is configured to connect to the lockable enclosure 800. Thus, the port 812 may be in electrical communication with the circuitry 816. In some cases, the circuitry 816 may include an internal port (e.g., a USB port) that is configured to connect to a data drive (e.g., a USB-drive) and be housed within the lockable enclosure 800 such that the internal port facilitates communication with the cable 804 via port 812 (e.g., between two USB-drives). As such, a technician may be configured to use the lockable enclosure 800 to access different types of data drives. As shown in FIG. 51, the lockable enclosure 800 may include a pull tab 806 or the like (e.g., a removable label) that is configured to be removed for accessing the port 812 for cable 804. After use of the cable 804 to access a data drive and transfer data to or from the memory of the lockable enclosure 800, the technician may then move a sliding mechanism, such as an actuator 808, slider, tray, or the like, to reveal a UPC code or like identifier 818 that can be used to record use of the lockable enclosure 800. In some cases, the actuator 808 may be configured to move between a first position that allows access to the cable port 812 and a second position that blocks access to the cable port (see, e.g., FIG. 52). In other words, when the actuator 808 has been moved to the second position, the cable port 812 is no longer accessible. Of course, this could be accomplished in a number of ways, such as that shown in FIG. 52 where one or more engagement members 810 defined on the actuator 808 and the housing are configured to engage with one another and prevent the actuator from moving from the second position back to the first position. Moreover, it is understood that various forms of actuators 808 or mechanisms may be used, such as an actuator configured to move entirely within the lockable enclosure 800, or a mechanism configured to move within the lockable enclosure from a position at least partially outside of the lockable enclosure to a position internal to the lockable enclosure. In either case, the actuator 808 or other mechanism may be configured to move from a first position where the port 812 is accessible to a second position where the port is inaccessible.

Figure 53B:
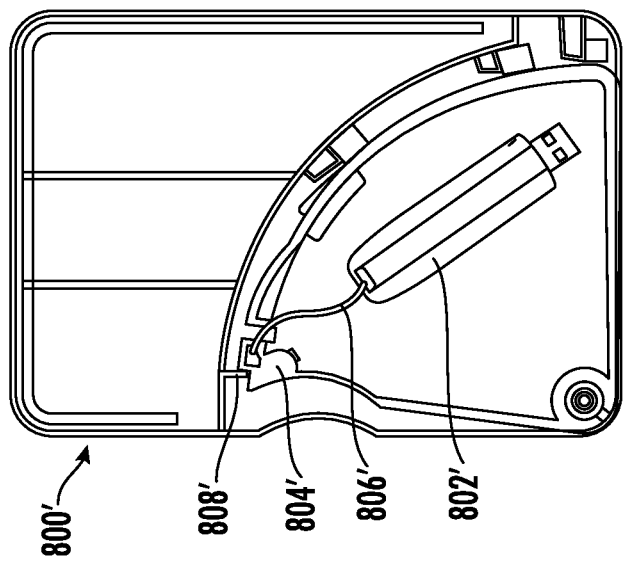
FIGS. 53A-B are elevation views of a lockable enclosure according to another embodiment of the invention.
Figure 53A:
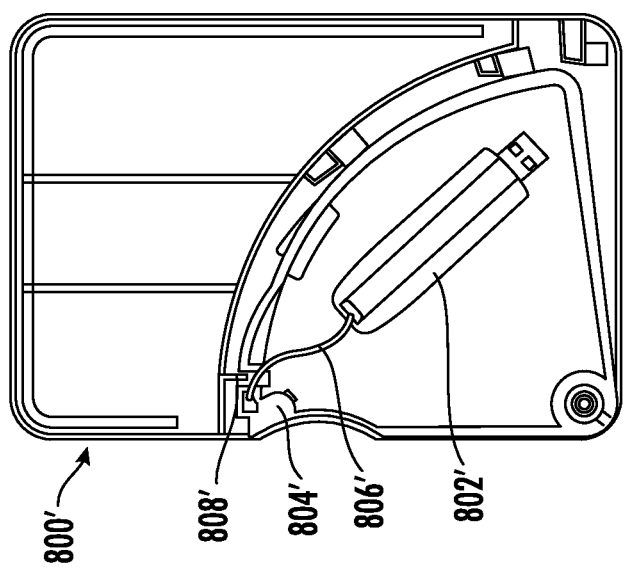
Figure 54C:
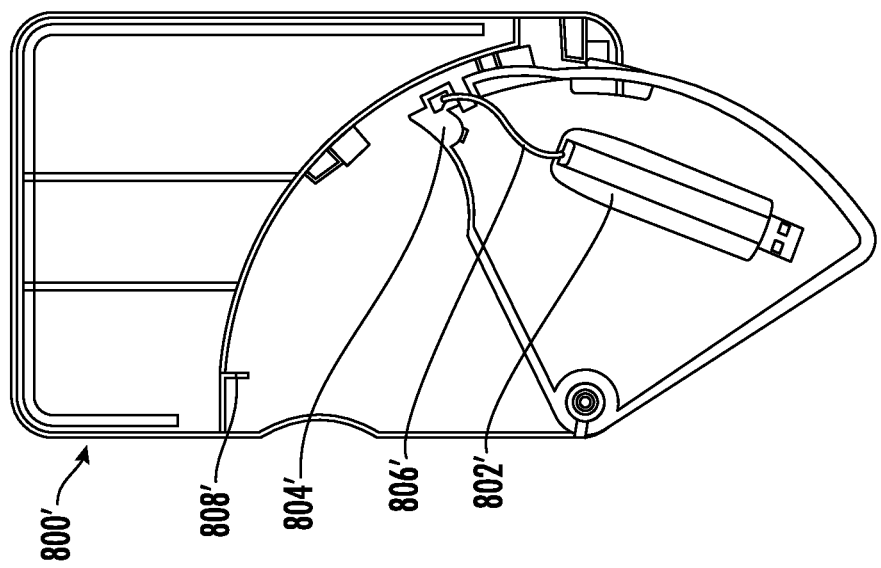
FIGS. 54A-C are additional elevation views of the lockable enclosure shown in FIGS. 53A-B showing a tray configured to move to allow access to a USB-drive.
Figure 54B:
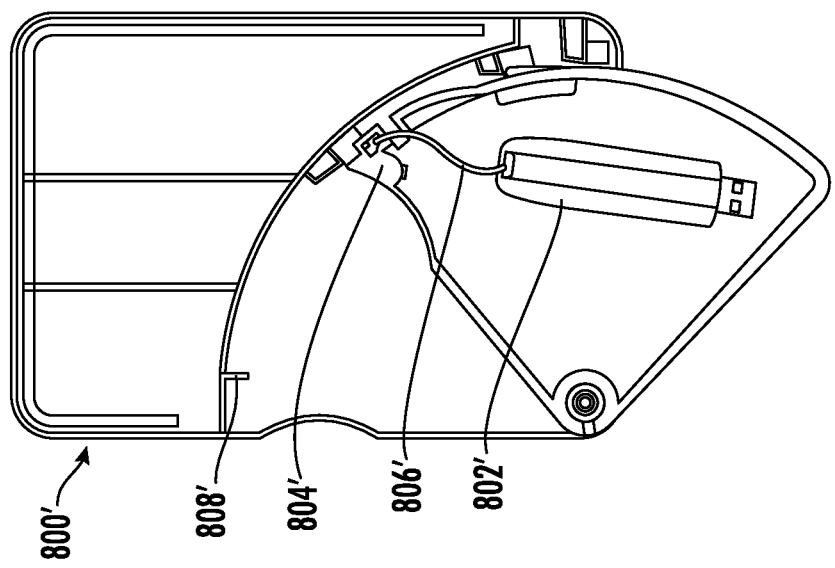
Figure 54A:
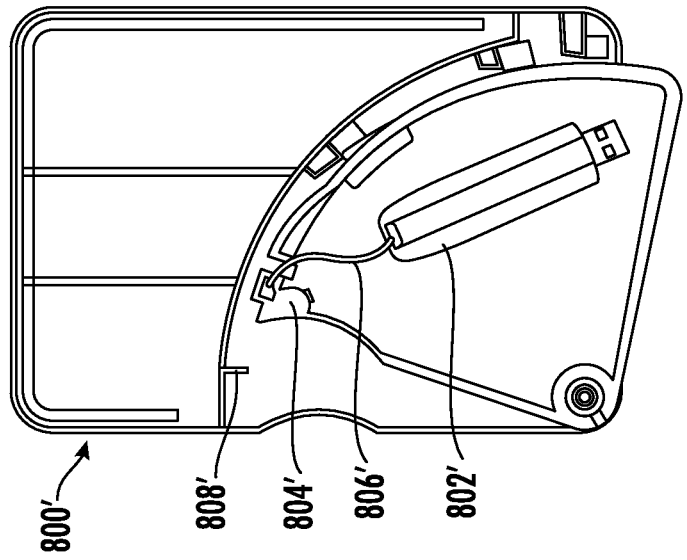

FIGS. 53-54 show another embodiment of a lockable enclosure 800'. In this particular embodiment, the lockable enclosure 800' may be configured to secure a USB-drive 802' (although other data drives may be secured in this manner). In this example, the lockable enclosure 800' includes a tray 804' that is configured to move between an initial position located within the lockable enclosure 800' to a secure position also located within the lockable enclosure 800'. For example, the tray 804' may be configured to rotate or slide between the initial position within the lockable enclosure 800 and a position external to the lockable enclosure. In the non-limiting example shown in FIGS. 53-54, the tray is configured to rotate in a clockwise direction. In the initial (or first) position, the tray 804' is configured to pivot out of an opening defined in the lockable enclosure 800' to allow access to the USB drive 802' in a second position. Continued rotation of the tray 804' allows the tray to reenter the housing through a second opening and to be secured therein in the secure (or third) position, such as via one or more engagement members 808' that block the tray from further rotation. Thus, the USB-drive 802' is no longer accessible after moving to the secure position. Of course, the tray 804' may be configured to reenter the housing through the same opening that it exited in other embodiments.

The USB-drive 802' may be attached to the tray 804' with a tether 806'. The tether 806' allows the technician to use the USB-drive 802', even in tight spaces, without being encumbered. Once the tray 804' is moved outside of the lockable enclosure 800', the tray may be configured to be prevented from being positioned back into the lockable enclosure 800' without the USB drive 802' being placed back in place. This can be accomplished in a number of ways such as the tray 804' and housing pinching or otherwise restricting the tether 806' and thus prohibiting the tray from closing. Alternatively, the tether 806' may be a length that causes the USB-drive 802' itself to block the tray from closing without the USB-drive being inside the tray. In some cases, a first UPC code or other identifier may be provided on the lockable enclosure 800' and/or a second UPC code or other identifier may be revealed in the secure position on. Thus, a scanning system may be employed to determine if the tray 804' had been cycled between the initial position and the secure position.

The foregoing has described several embodiments of systems, devices, locks, keys, devices, computer storage mediums, and methods. Although embodiments of the present invention have been shown and described, it will be apparent to those skilled in the art that various modifications thereto can be made without departing from the spirit and scope of the invention. Accordingly, the foregoing description is provided for the purpose of illustration only, and not for the purpose of limitation.

That which is claimed is:

1. A lockable enclosure for a data drive, the lockable enclosure comprising:
a housing containing data drive circuitry;

a port electrically connected to the data drive circuitry and configured to connect to an external data device for transferring data from or to the data drive circuitry; and a mechanism movable relative to the housing and configured to move within the housing between a first position whereby the port is accessible for connection to the external data device to a second position whereby the port is inaccessible and incapable of connecting to the external data device, wherein the mechanism is configured to move in only one direction within the housing from the first position to the second position, and wherein the mechanism is incapable of being moved from the second position to the first position without damaging or destroying the housing.

2. The lockable enclosure of claim 1, wherein the data drive circuitry is USB-circuitry, and wherein the port is a USB-port.

3. The lockable enclosure of claim 1, wherein each of the housing and the mechanism comprises one or more engagement members for preventing the mechanism from moving from the second position to the first position.

4. The lockable enclosure of claim 1, further comprising an identifier for identifying the lockable enclosure, and wherein the identifier is only visible when the mechanism has been moved to the second position.

5. The lockable enclosure of claim 1, wherein the housing is formed of a clear polymeric material.

6. The lockable enclosure of claim 1, wherein the mechanism is configured to slide from the first position to the second position.

7. The lockable enclosure of claim 1, wherein the data drive circuitry comprises a printed circuit board and a memory.

8. The lockable enclosure of claim 1, wherein a size of the housing matches a size of a solid-state drive (SSD) drive.

9. The lockable enclosure of claim 1, wherein the external data device is a cable.

10. The lockable enclosure of claim 1, wherein the external data device is a computer system.

11. The lockable enclosure of claim 1, wherein the port is configured to removably connect to the external data device in the first position.

12. The lockable enclosure of claim 1, wherein the data drive circuitry further comprises a memory.

13. A lockable enclosure for a data drive, the lockable enclosure comprising:

a housing containing data drive circuitry, the data drive circuitry comprising a printed circuit board;

a port electrically connected to the printed circuit board and configured to connect to an external data device for transferring data from or to the data drive circuitry; and a mechanism movable relative to the housing and configured to move within the housing between a first position whereby the port is accessible for connection to the external data device to a second position whereby the port is inaccessible and incapable of connecting to the external data device, wherein the mechanism is configured to move in only one direction within the housing from the first position to the second position, and wherein the mechanism is incapable of being moved from the second position to the first position without damaging or destroying the housing.

14. The lockable enclosure of claim 13, wherein the data drive circuitry is USB-circuitry, and wherein the port is a USB-port.

15. The lockable enclosure of claim 13, wherein each of the housing and the mechanism comprises one or more engagement members for preventing the mechanism from moving from the second position to the first position.

16. The lockable enclosure of claim 13, further comprising an identifier for identifying the lockable enclosure, and wherein the identifier is only visible when the mechanism has been moved to the second position.

17. The lockable enclosure of claim 13, wherein the mechanism is configured to slide from the first position to the second position.

18. A method for securing a data drive, the method comprising:

providing a housing containing data drive circuitry, the housing comprising a port electrically connected to the data drive circuitry; and connecting an external data device to the port for transferring data from or to the data drive circuitry; and moving a mechanism relative to the housing between a first position whereby the port is accessible for connection to the external data device to a second position whereby the port is inaccessible and incapable of connecting to the external data device, wherein moving comprises moving the mechanism in only one direction within the housing such that the mechanism is incapable of moving from the second position to the first position without damaging or destroying the housing.

19. The method of claim 18, wherein moving comprises sliding the mechanism.

20. The method of claim 18, further comprising removing the external data drive from the port prior to moving the mechanism from the first position to the second position.

* * * * *